United States Patent
Suyama et al.

(10) Patent No.: US 7,336,244 B2
(45) Date of Patent: Feb. 26, 2008

(54) OPTICAL DEVICE AND THREE-DIMENSIONAL DISPLAY DEVICE

(75) Inventors: Shiro Suyama, Tokyo (JP); Munekazu Date, Saitama (JP); Shigeto Kohda, Tokyo (JP); Kinya Kato, Saitama (JP); Shigenobu Sakai, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 153 days.

(21) Appl. No.: 10/782,979

(22) Filed: Feb. 23, 2004

(65) Prior Publication Data
US 2004/0164927 A1  Aug. 26, 2004

Related U.S. Application Data

(62) Division of application No. 10/011,638, filed on Dec. 11, 2001, now Pat. No. 6,714,174, which is a division of application No. 08/784,353, filed on Jan. 16, 1997, now Pat. No. 6,469,683.

(30) Foreign Application Priority Data

| Jan. 17, 1996 | (JP) | .................................... 8-006011 |
| Mar. 5, 1996 | (JP) | .................................... 8-047654 |
| May 1, 1996 | (JP) | .................................... 8-110632 |
| Jul. 11, 1996 | (JP) | .................................... 8-182222 |
| Jul. 31, 1996 | (JP) | .................................... 8-202244 |
| Aug. 30, 1996 | (JP) | .................................... 8-229717 |

(51) Int. Cl.
   *G09G 5/00* (2006.01)
(52) U.S. Cl. .............................. 345/6; 345/690; 348/51
(58) Field of Classification Search ............... 345/4,
   345/6–9, 32, 87, 99, 205, 212, 690; 349/62,
   349/64, 95, 15; 348/42, 51, 55; 359/478,
   359/559
See application file for complete search history.

(56) References Cited

U.S. PATENT DOCUMENTS 4,037,929 A   7/1977  Bricott et al.

(Continued)

FOREIGN PATENT DOCUMENTS

JP   54-101344   9/1979

(Continued)

OTHER PUBLICATIONS

Susumu Sato et al., "Variable-Focus Liquid-Crystal Fresnel Lens," *Science Research Expenditure Subsidy Research Results Report*, No. 59850048 (pp. 626-628), 1985.

(Continued)

*Primary Examiner*—Amr A. Awad
*Assistant Examiner*—Tom V Sheng
(74) *Attorney, Agent, or Firm*—Venable LLP; Michael A. Satori; Catherine M. Voorhees

(57) ABSTRACT

An optical device includes a transparent material layer having a desired curved surface configuration, a layer including a variable refractive index material having a dielectric constant anisotropy, at least two transparent electrodes arranged to sandwich the transparent material layer and the variable refractive index material, and a driving device supplying a voltage including driving frequencies f1 and f2 between the transparent electrodes. The difference $\Delta \in$ in the dielectric constant of the variable refractive index material due to the anisotropy is positive at one of the driving frequencies and negative at the other driving frequency.

17 Claims, 67 Drawing Sheets

U.S. PATENT DOCUMENTS

| | | | |
|---|---|---|---|
| 4,564,267 A | | 1/1986 | Nishimoto |
| 4,670,744 A | * | 6/1987 | Buzak .......................... 345/6 |
| 4,729,640 A | | 3/1988 | Sakata |
| 4,729,641 A | | 3/1988 | Matsuoka et al. |
| 4,781,440 A | | 11/1988 | Toda |
| 4,822,145 A | | 4/1989 | Staelin |
| 4,834,512 A | * | 5/1989 | Austin .......................... 345/6 |
| 5,047,847 A | | 9/1991 | Toda et al. |
| 5,155,607 A | * | 10/1992 | Inoue et al. ................... 349/89 |
| 5,299,037 A | * | 3/1994 | Sakata .......................... 349/1 |
| 5,493,427 A | | 2/1996 | Nomura et al. |
| 5,519,533 A | | 5/1996 | Normura et al. |
| 5,583,677 A | * | 12/1996 | Ito et al. ..................... 349/118 |
| 5,594,843 A | | 1/1997 | O'Neill |
| 5,631,665 A | | 5/1997 | Takizawa et al. |
| 5,644,416 A | * | 7/1997 | Morikawa et al. ............ 349/86 |
| 5,781,165 A | | 7/1998 | Tabata |
| 5,790,086 A | | 8/1998 | Zelitt |
| 5,828,487 A | * | 10/1998 | Greening et al. ........... 359/466 |
| 5,880,883 A | * | 3/1999 | Sudo .......................... 359/462 |
| RE37,219 E | * | 6/2001 | Takahara et al. .............. 349/92 |
| 6,243,055 B1 | | 6/2001 | Fergason |
| 6,259,450 B1 | | 7/2001 | Chiabrera et al. |
| 6,940,473 B2 | * | 9/2005 | Suyama et al. ................ 345/6 |

FOREIGN PATENT DOCUMENTS

| | | |
|---|---|---|
| JP | 54-101345 | 9/1979 |

OTHER PUBLICATIONS

Masakatsu Higa et al., "A High-Speed and High-Contrast Liquid-Crystal Shutter Array Using Dual-Frequency Addressed Birefringence Mode," *SID International Symposium, Digest of Technical Papers*, Baltimore, MD (pp. 25-28), May 1989.

* cited by examiner (IN THE CASE OF SINE WAVE)

(IN THE CASE OF RECTANGULAR WAVE)

(IN THE CASE OF SINE WAVE)

(IN THE CASE OF RECTANGULAR WAVE)

FREQUENCY f31

FREQUENCY f32

WEIGHT (IN THE CASE OF SINE WAVE)

NO VOLTAGE SUPPLY (IN THE CASE OF SINE WAVE)

NO VOLTAGE SUPPLY (IN THE CASE OF RECTANGULAR WAVE)

OPTICAL DEVICE AND THREE-DIMENSIONAL DISPLAY DEVICE

CROSS REFERENCE TO RELATED APPLICATIONS

This application is a divisional application of application Ser. No. 10/011,638 filed Dec. 11, 2001 now U.S. Pat. No. 6,714,174, which is a divisional application of application Ser. No. 08/784,353, filed on Jan. 16, 1997 now U.S. Pat. No. 6,469,683. The disclosure of the above-referenced patent applications, as well as that of each U.S. and foreign patent and patent application identified in the specification of the present application, is incorporated herein by reference.

BACKGROUND OF THE INVENTION

1. Field of the Invention

The present invention relates to an optical device which can periodically or sequentially vary an optical property of the optical device, such as the focal length of a lens, the deflection angle of a prism, the divergence angle of a lenticular lens and so on.

Further, the present invention relates to a three-dimensional display device and its driving method. More specifically, the present invention relates to a technology effectively applicable to an apparatus for displaying a two-dimensional image to be displayed on a two-dimensional display device in a three-dimensional fashion.

2. Description of the Related Art

Most of the conventional optical devices are passive optical devices. The kinds of active optical devices whose optical properties can be varied by voltage or the like are quite limited. Amongst them, as an optical device employing a material having a variable refractive index, there is a liquid crystal lens disclosed in Science Research Expenditure Subsidy Research Results Report No. 59850048 (1984).

FIG. 1 shows the construction of such a liquid crystal lens. The liquid crystal lens having optical properties to be varied by voltage or the like shown in FIG. 1 is constructed with a planar convex lens 1 formed of a polymer, glass or the like, a transparent electrode formed on the surface of the planar concave lens 1, an alignment layer formed of a polyimide or the like on the transparent electrode 2, a liquid crystal 4 (ordinary nematic liquid crystal having an anisotropy of its dielectric constant which is not reversed by difference of frequency), an opposite substrate 5 opposite to these components, a transparent electrode 6 formed on the opposite substrate 5, an alignment layer 7 formed of polyimide or the like on the transparent electrode 6, and a driving device for driving these components. Here, the alignment layers 3 and 7 are in a homogeneous alignment condition for aligning the liquid crystal 4 substantially in parallel.

In the condition where no voltage is applied between the transparent electrodes 2 and 6, the liquid crystal 4 is aligned to be substantially parallel to the alignment layers 3 and 7 by the action of the alignment layers 3 and 7. In this case, an incident light beam 11 that is polarized parallel to the alignment direction is subject to an extraordinary refractive index of the liquid crystal 4. Thus, for example, the liquid crystal 4 appears to have a large refractive index in comparison with the planar concave lens 1 so that the entire optical device serves as a planar convex lens to cause convergence as an output light beam 12.

On the other hand, in the condition where an appropriate voltage is applied between the transparent electrodes 2 and 6, the liquid crystal 4 is aligned to be perpendicular to the electrode 2 and 6. In this case, the incident light beam 11 is subject to the ordinary refraction of the liquid crystal 4. Therefore, for example, the liquid crystal 4 appears to have substantially the same refractive index as the planar concave lens. Then, the entire optical device merely serves as glass plate to output a light beam 13 having substantially the same direction as the incident light beam 11.

Even in such a conventional optical device, it has been possible to sequentially vary an optical property, e.g. focal length, of the planar convex lens depending upon an applied voltage. One example of this relationship is illustrated in FIG. 2.

However, the conventional optical device has the following detects. Alignment of the liquid crystal 4 in the condition where no voltage is applied, is performed only by an anchoring force of the alignment layers 3 and 7. In such a optical device, since the liquid crystal 4 has a large thickness of several hundreds μm or more, a drawback has been encountered in that a resumption timing upon driving is delayed significantly by several seconds, as shown in FIG. 3. Furthermore, even if the applied voltage is increased, the resumption timing can be hardly improved. Therefore, currently, there is no effective method for shortening a resumption period.

As set forth above, when the liquid crystal 4 is aligned only by the anchoring force of the alignment layers 3 and 7, molecules 4a of the liquid crystal 4 may be aligned along a curved surface of the planer concave lens in a portion located in the vicinity of the transparent electrode 2, as shown in FIG. 4. Therefore, alignment of a part of the liquid crystal tends to be inclined, so that the refractive index to be sensed by the incident light beam becomes closer to the refractive index of the planar concave lens, thereby making the amount of variation of the optical property smaller. Furthermore, there is a disadvantage in that distribution of the variation amount of the optical property depends on the position with respect to the lens.

Further, since the transparent electrode 2 is formed on the surface of the planar concave lens 1, when the voltage is applied, an electric field perpendicular to its surface is established in the vicinity of the transparent electrode 2 so that the liquid crystal 4 may be aligned perpendicularly to the surface thereof. As a result, there arises an inclination of the alignment of a part of the liquid crystal 4 to form a region where the refractive index sensed by the incident light beam is significantly different from the refractive index of the planar concave lens 1. Thus, the incident light beam which should pass through without any deflection substantially, is locally deflected.

Furthermore, in the case where the surface configuration of the planar concave lens 1 is more complicated, particularly when it has deep grooves or sharp projections, it becomes difficult to uniformly form the transparent electrode, so that a circuit breakage or high resistance is liable to occur.

Additionally, in such case, an alignment process of the alignment layers for aligning the liquid crystal, such as a rubbing process and the like, becomes difficult. Further, the distance between the transparent electrodes varies at different positions as is clear from FIG. 1. Despite this fact, since an equal voltage is applied to all positions of the transparent electrodes, degradation of insulation, short circuits, etc. are liable to occur in a narrow region.

As set forth above, the conventional active optical device employing a material having a variable refractive index encounters various practical drawbacks or shortcoming in production and driving.

SUMMARY OF THE INVENTION

It is an object of the present invention to provide an optical device which can be driven at high speed, achieves high uniformity, is easy to fabricate, and can vary an optical property sequentially, periodically in an active manner.

According to the present invention, there is an optical device comprising:

a transparent material layer having a desired curved surface configuration;

a layer including a variable refractive index material having a dielectric constant anisotropy and having a property in which a sign of a difference $\Delta\in$ in dielectric constant due to the anisotropy is reversed at driving frequencies f1 and f2;

at least two transparent electrodes arranged to sandwich the transparent material layer and the layer including the variable refractive index material; and a driving device supplying a voltage including the driving frequencies f1 and f2 between the transparent electrodes.

The optical device according to the invention enables high speed operation by varying the refractive index by varying the frequency of a voltage which is applied to the variable refractive index material in order to vary an optical property of the device. Furthermore, since the force of the electric field can be always used, the speed can be made higher by increasing the electric field.

In addition, in the optical device according to the invention, the force of the electric field can be varied by the variable refractive index material, and since the transparent electrodes are not provided on the side of the variable refractive index material of the transparent material layer, the optical device is hardly influenced by the surface configuration of the transparent material layer, compared to the prior art device, regardless of the condition of the variable refractive index material. Therefore the amount of variation of the optical property can be easily made uniform. Since the transparent electrodes are not provided on the side of the variable refractive index material of the transparent material layer in the optical device according to the present invention, it becomes unnecessary to form a film to meet the shape of a complicated surface configuration to facilitate fabrication of the optical device, compared to the prior art device. Furthermore, since the transparent electrodes are not provided on the side of the variable refractive index material of the transparent material layer, the distance between the transparent electrodes can be maintained substantially the same, and the transparent material layer is always present between the transparent electrodes, degradation of insulation, shorts, and so on hardly occur.

Further, by replacing one of the transparent electrodes with an electrode reflecting at least a part of the incident light beam, an active mirror, half mirror or various other types of optical devices for varying an optical property can be realized.

According to the present invention, there is an optical device comprising:

a layer including a variable refractive index material having dielectric constant anisotropy and having a property to reverse signs of a difference of dielectric constant $\Delta\in$ due to anisotropy at driving frequencies f1 and f2;

at least two transparent electrodes arranged to sandwich the layer including the variable refractive index material; and a driving device applying a voltage, in which voltages from V1 to VN respectively having respective primary frequencies f1 to fN (N≧2) are superimposed, between the transparent electrodes.

According to the present invention, there is an optical device comprising:

a layer of transparent material having a desired curved surface configuration;

a layer including a variable refractive index material having a positive or negative dielectric constant anisotropy;

at least two transparent electrodes arranged to sandwich the layer of the transparent material and the layer including the variable refractive index material; and a driving device for always supplying a voltage substantially equal to or greater than an amplitude of a voltage establishing static and vertical alignment in the variable refractive index material.

As set forth above, the optical device according to the present invention has a driving device which can always supply the voltage having an amplitude equal to or greater than the voltage, at which the variable refractive index material is statistically aligned to generate electrofluid motion in the molecules of the liquid crystal to change the refractive index of the variable refractive index material in such a way that the orientation of the liquid crystal molecules vary in synchronism with a frequency twice that of the frequency of the voltage applied, between the state where the orientation of the liquid crystal molecules is perpendicular or parallel to the electrode and the state where the orientation of the liquid crystal molecules is slightly inclined from the former state. Therefore, the optical device according to the present invention can vary the optical property at a high speed, sequentially, periodically and uniformly. Furthermore, it becomes unnecessary to process the film to meet a complicated surface configuration, and the fabrication can be facilitated.

According to the present invention, there is a three-dimensional display device for forming a three-dimensional image from two-dimensional images on a display portion, comprising:

a layer of a transparent material having a desired curved surface configuration;

a layer of a variable refractive index material having a refractive index varying in accordance with a voltage applied thereto;

at least two transparent electrodes arranged to sandwich the layer of the transparent material and the layer including the variable refractive index material;

an imaging position shifting portion for shifting an imaging position of the two-dimensional image displayed on the display portion;

a synchronizing portion for synchronizing an updating period of the two-dimensional image displayed on the display portion with a shifting period of the imaging point of the imaging position shifting portion; and a driving portion for driving the imaging point shifting portion by applying a voltage to the at least two transparent electrodes in accordance with an output from the synchronizing portion.

The three-dimensional display device according to the present invention decomposes the three-dimensional image into two-dimensional images (depth sample images) belonging to planes set at a predetermined interval in a depth direction of an image pick-up position for displaying the images in a predetermined sequence on the display portion, and the imaging position of the image to be displayed on the display portion is varied by the imaging portion shifting portion. Here, the image displayed on the display portion and the imaging position are synchronized by the synchronizing portion so that the observer may view the image displayed on the display portion as a three-dimensional image.

According to the present invention, there is a driving method of driving a three-dimensional display device including a display portion for displaying two-dimensional images, an imaging point shifting portion disposed between the display portion and an observer, a synchronizing portion for synchronizing an updating period of the two-dimensional images displayed on the display portion with a shifting period of the imaging point of the imaging point shifting portion, and a driving portion for driving the imaging point shifting portion, the a driving method comprising the steps of:

outputting a plurality of driving signals of an output voltage VN (N≧2) having frequency fN as a primary frequency for a predetermined period of time assigned to each of the driving signals in a predetermined sequence to drive the imaging point shifting portion in the driving portion; and updating and displaying the two-dimensional images in a predetermined sequence on the display portion in the synchronizing portion.

According to the present invention, there is a driving method of driving a three-dimensional display device including a display portion for displaying two-dimensional images, an imaging point shifting portion disposed between the display portion and an observer, a synchronizing portion for synchronizing an updating period of the two-dimensional images displayed on the display portion with a shifting period of the imaging point of the imaging point shifting portion, and a driving portion for driving the imaging point shifting portion, the a driving method comprising the steps of in the driving portion:

generating a driving signal of a predetermined output voltage in which a frequency fN (N≧2) is superimposed;

applying the driving signal to the imaging position shifting portion;

varying the output voltage in a predetermined sequence in accordance with a synchronization signal of the synchronizing portion; and in the synchronization portion:

outputting a synchronization signal in the synchronization portion when updating two-dimensional images to be displayed on the display portion.

In the foregoing three-dimensional display device, there appears a phantom image of the image on the back side or inside which should be hidden. Therefore, it can be useful only for reproducing a wire frame like three-dimensional image, in practice. The invention makes it possible to display the real three-dimensional image display in this case.

According to the present invention, there is a three-dimensional display device comprising:

a phantom three-dimensional display device for displaying a phantom three-dimensional image; and a shutter device formed by a shutter element for controlling a light transmittance, the shutter device being located at a position where the phantom three-dimensional image is reproduced or a position optically equivalent to the position. According to the three-dimensional display device, the shutter element of the shutter device, interrupts the incident light beam or scatters the light beam while the phantom image on the back side as viewed from the observer is being reproduced. By this display device, many of the visual cues to depth perception can be satisfied and the natural three-dimensional image with no phantom phenomenon can be reproduced in the form of motion picture.

According to the present invention, there is a three-dimensional display device comprising:

a phantom three-dimensional display device for displaying a phantom three-dimensional image; and a shutter device formed by a shutter element for controlling a light transmittance, the phantom three-dimensional image being a real image, and the shutter element being a photoreactive element for lowering a light transmittance in a real image region at the position of the shutter element in accordance with an imaging light beam of the real image.

According to the present invention, there is a head-mount display device comprising:

two display devices corresponding to left and right eyes and each including a two-dimensional display device and an optical device having a variable focal length; and a control device for controlling the two-dimensional display device and the optical device having a variable focal length, the display devices being mounted to left and right eyes, and the control device synchronously driving the two-dimensional display device and the optical device to perform three-dimensional display.

The head-mount display device according to the present invention is worn on respective left and right eyes of a human being so that the human being or viewer can view display images on the two-dimensional display devices through the optical device of variable focal length. Then, by varying the focal length of the optical device, the virtual image position of the display image of the two-dimensional display device is varied in the depth direction. According to this display device, visual cues to depth perception, such as binocular disparity, convergence, and focus of the eyes in stereoscopy can be satisfied with no discrepancy and the natural three-dimensional image with no phantom phenomenon can be reproduced at a high speed.

BRIEF DESCRIPTION OF THE DRAWINGS

The present invention will be understood more fully from the detailed description given herebelow and from the accompanying drawings of the preferred embodiments of the invention, which, however, should not be taken to be eliminative to the present invention, but are for explanation and understanding only.

In the drawings.

DESCRIPTION OF THE PREFERRED EMBODIMENTS

The present invention will be described hereinafter in detail by way of the preferred embodiments of the present invention with reference to the accompanying drawings. In the following descriptions, numerous specific details are set forth in order to provide thorough understanding of the present invention. It will be obvious, however, to those skilled in the art that the present invention may be practiced without these specific details. In other instance, well-known structures are not shown in detail in order to avoid unnecessarily obscuring the present invention.

At first, the preferred embodiments of an optical device according to the present invention will be discussed hereinafter. While the descriptions will be given hereinafter by way of embodiments mainly employing a fresnel lens structure as a surface of a layer of a transparent material, it is evident that similar effects should be expected in the case of a convex lens, a concave lens, a prism array, a lens array, a lenticular lens, a diffraction grating or combinations thereof.

The embodiments set forth hereinafter mainly employ a liquid crystal as a variable refractive index material, but equivalent effects should be expected even when other material having frequency dependency in anisotropy of dielectric constant is used.

Furthermore, in the following embodiments the refractive index of liquid crystal is substantially equal to that of the transparent material when the liquid crystal is aligned substantially perpendicular to a transparent electrode. However, evidently, similar effects should be expected even when the refractive index of a liquid crystal is substantially equal to that of the transparent material when the liquid crystal is aligned substantially parallel to the transparent electrode or when the liquid crystal is aligned at a given angle with the transparent electrode.

Furthermore, in the following embodiments, the refractive index of the liquid crystal is substantially greater than that of the transparent material, but it is clearly possible to expect similar effects even in the case where the refractive index of the liquid crystal is substantially smaller than that of the transparent material or the case where the refractive index of the transparent material falls within a variation range of the refractive index of the liquid crystal.

(First Embodiment of the Optical Device)

Figure 1:
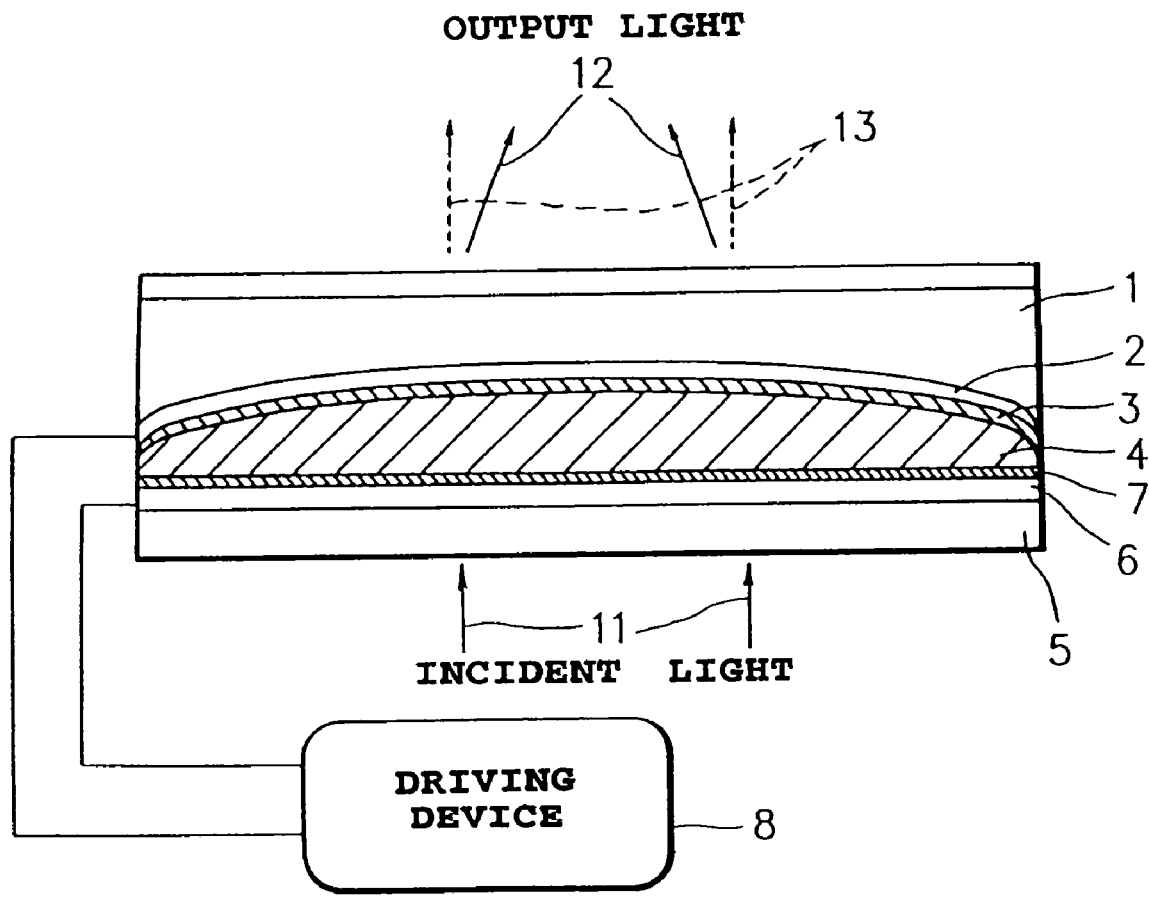
FIG. 1 is an illustration showing the construction of one example of a conventional liquid crystal lens.
Figure 2:
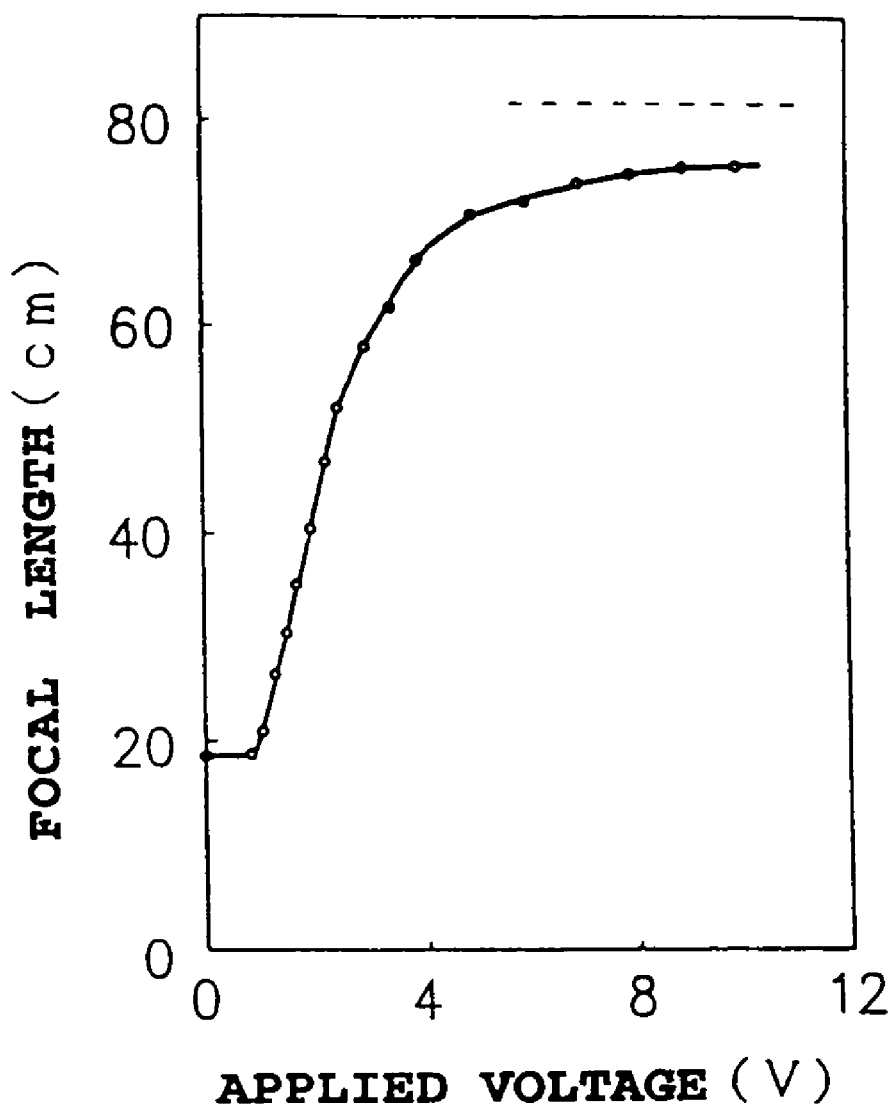
FIG. 2 is a chart showing the relationship between the focal length and an applied voltage in the device of FIG. 1.
Figure 3:
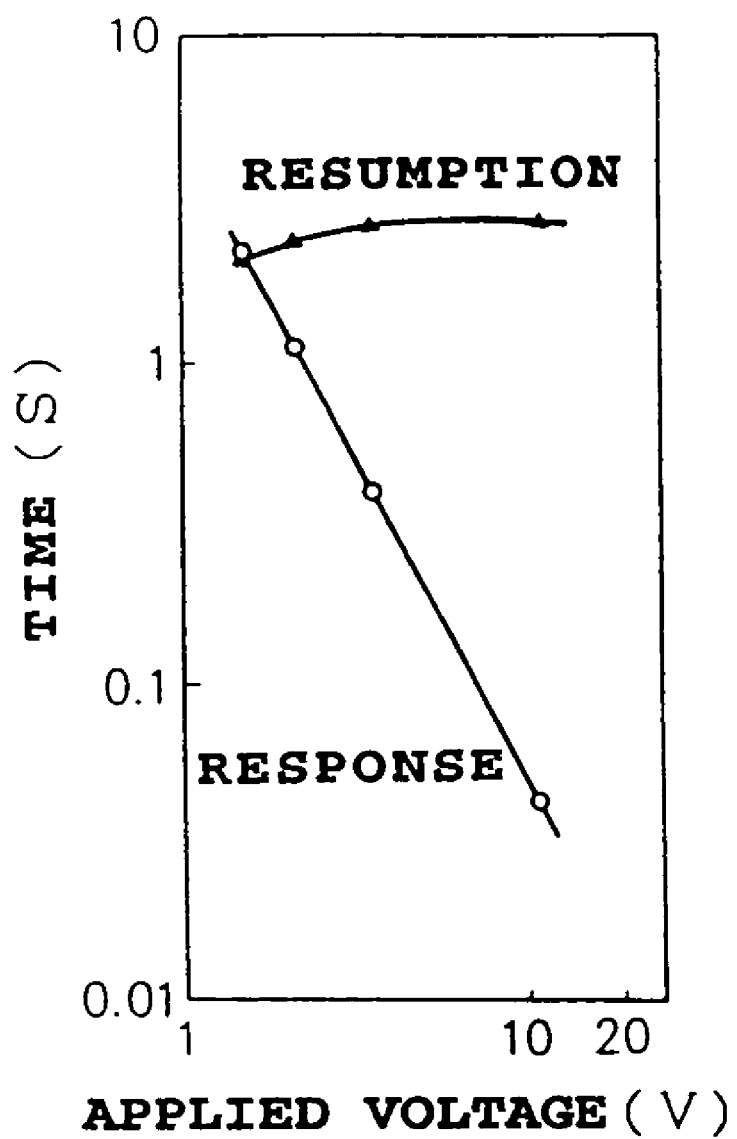
FIG. 3 is a chart showing the relationship between a reaction period and an applied voltage in the device of FIG. 1.
Figure 4:
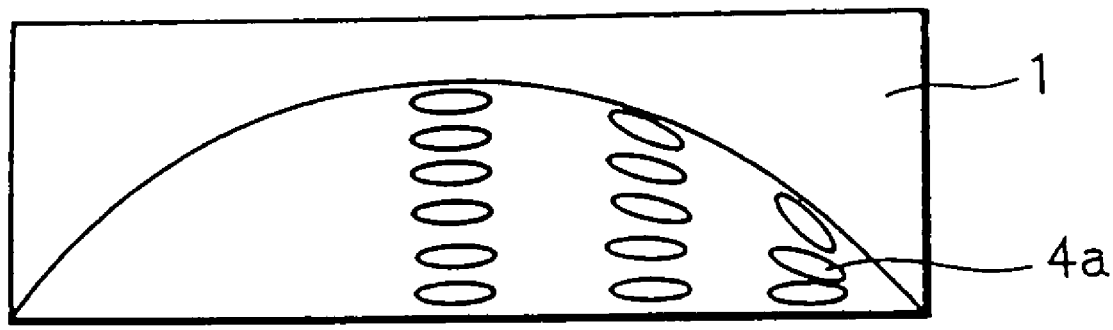
FIG. 4 is a conceptual illustration showing the alignment of liquid crystal molecules by an anchoring force of an alignment layer in the device of FIG. 1.
Figure 5:
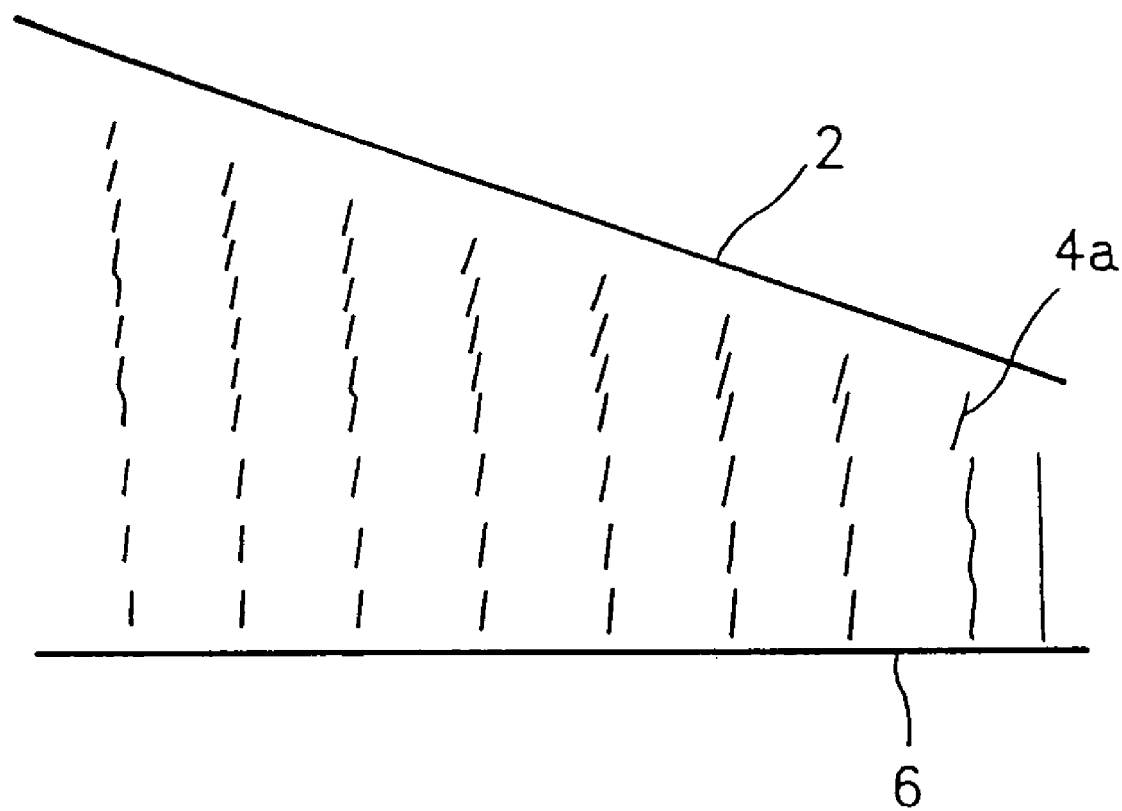
FIG. 5 is a conceptual illustration of alignment of the liquid crystal molecules upon charging of voltage in the device of FIG. 1.
Figure 6:
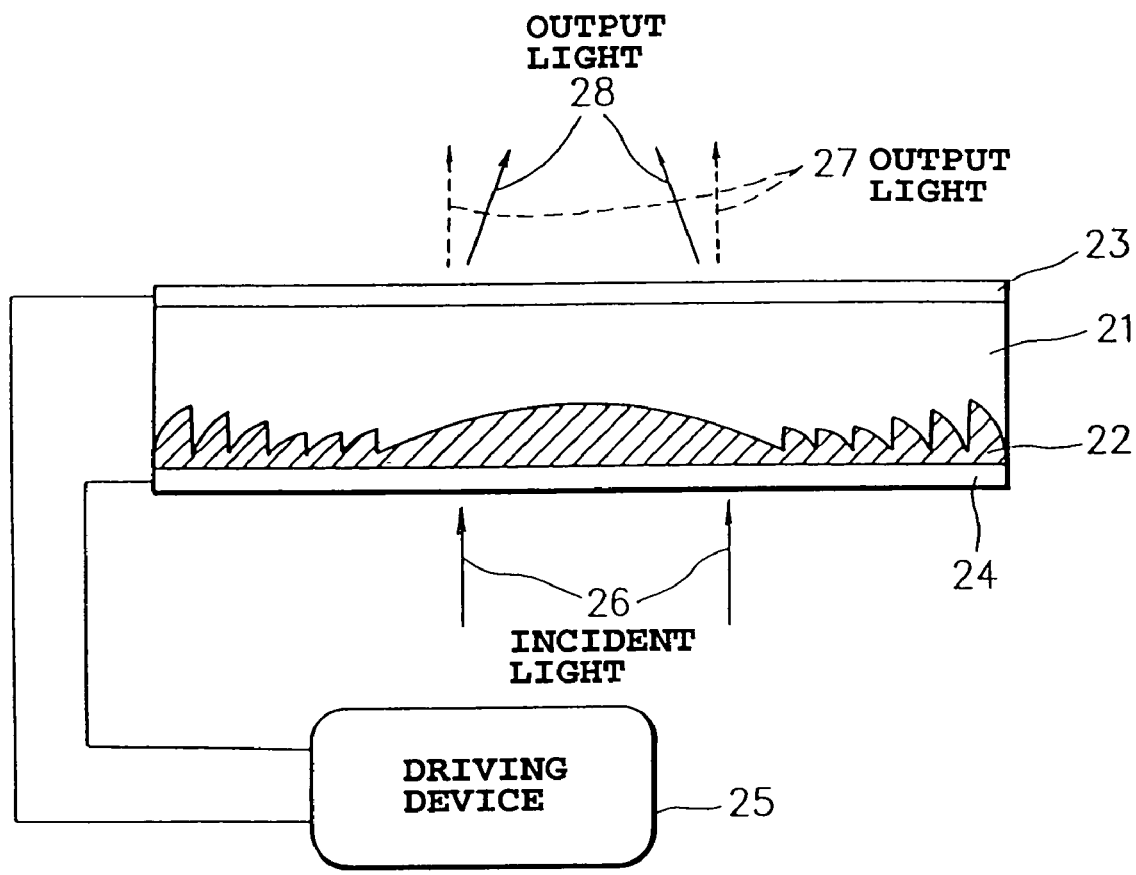
FIG. 6 is an illustration showing the construction of the first embodiment of an optical device according to the present invention.

FIG. 6 shows one embodiment of the optical device according to the present invention. In FIG. 6, the optical device comprises a layer 21 of a transparent material having a desired curved surface configuration and formed of a transparent polymer, glass or the like, a variable refractive index material 22 formed of a transparent material or the like including a liquid crystal, a plurality of transparent electrodes 23 and 24 sandwiching the transparent material layer 21 and a layer including the variable refractive index material 22 and formed of ITO or SnOx, and a driving device 25 for driving these molecules.

Here, if it is intended to provide a planar convex lens with a variable focal length (focal length is positive) as an active optical device, and if the refractive index of the variable refractive index material 22 is substantially greater than the refractive index of the transparent material layer 21, the variable refractive index material 22 may be formed in the shape of a convex lens. Accordingly, the surface configuration of the transparent material layer 21 on the side of the variable refractive index material 22 may be formed in a concave fresnel lens shape as illustrated. Of course, when the refractive index of the variable refractive index material 22 is substantially smaller than the refractive index of the transparent material layer 21, the surface configuration of the transparent material layer 21 on the variable refractive index material 22 side may be in the form of a convex fresnel lens, for example.

In this embodiment, the variable refractive index material 22 has a refractive index anisotropy and a dielectric constant anisotropy. This embodiment uses an example in which the dielectric constant anisotropy $\Delta\varepsilon$ (=$\varepsilon\|$ (dielectric constant in parallel to a longer axis of the molecule)–$\varepsilon\perp$ (dielectric constant in a direction perpendicular to the longer axis of the molecule)) is positive at a frequency f11, and the dielectric constant anisotropy $\Delta\varepsilon$ is negative at a frequency f12. Further, this embodiment uses an example in which the refractive index anisotropy $n_o$ (ordinary refractive index) is substantially equal to the refractive index of the transparent material layer 21, and $n_e$, (extraordinary refractive index) is substantially greater than the refractive index of the transparent material layer 21.

When an electric field having a frequency f11 is applied between the transparent electrodes 23 and 24 from the driving device 25, $\Delta\varepsilon>0$. Consequently, the molecules of the variable refractive index material 22 are aligned in parallel to the direction of the electric field, namely, perpendicular to the transparent electrodes 23 and 24. Therefore, in view of the relationship between the transparent material layer 21 and the variable refractive index material 22, the refractive index of the variable refractive index material 22 becomes substantially equal to the refractive index of the transparent material layer 21. Consequently, the light beam 26 incident into the optical device passes substantially without any variation, as output light beam 27.

On the other hand, when an electric field having a frequency f12 is applied between the transparent electrodes 23 and 24 from the driving device 25, $\Delta\varepsilon<0$. Consequently, the elements of the variable refractive index material 22 are aligned perpendicular to the direction of the electric field, namely parallel to the transparent electrodes 23 and 24. Therefore, in view of the relationship between the transparent material layer 21 and the variable refractive index material 22, the refractive index of the variable refractive index material 22 becomes greater than the refractive index of the transparent material layer 21. In effect, the variable refractive index material 22 becomes a convex fresnel lens. The optical device according to this embodiment serves as a convex fresnel lens for an incident light beam 26 as a polarized light beam parallel to the longer axis of the molecules of the variable refractive index material 22, and converges as a output light beam 28.

In this embodiment, the focal length of the lens is an optical property of the optical device that can be varied by varying the refractive index of the variable refractive index material 22.

In this embodiment, unlike the prior art shown in FIGS. 1 to 5, a force exerted by the electric field 10 is mainly utilized by varying the alignment of the variable refractive index material 22 depending upon difference of the frequency of the applied voltage. Therefore, by increasing the intensity of the electric field, the variation speed can be extremely increased.

Further, the alignment of the variable refractive index material 22 is varied by the force exerted by the electric field, and the transparent electrode 23 is not provided on the transparent material layer 21 on the side of the variable refractive index material 22. Therefore, in either alignment condition of the variable refractive index material 22, the influence of the surface configuration of the transparent material layer 21 becomes much smaller than that in the prior art shown in FIGS. 1 to 5, facilitating uniform variation of the focal length.

Since the transparent electrode 23 is not provided on the transparent material layer 21 on the side of the variable refractive index material 22, it becomes unnecessary to form a layer on a portion having a complicate configuration, thus facilitating the fabrication process to a greater degree than the prior art illustrated in FIGS. 1 to 5.

Furthermore, since the transparent electrode 23 is not provided on the transparent material layer 21 on the side of the variable refractive index material 22, it becomes easy to set the distance between the transparent electrodes 23 and 24 substantially equal. In addition, since the transparent material layer 21 is always present between the transparent electrodes 23 and 24, degradation of insulation, short-circuiting or the like which are liable to occur in the prior art of FIGS. 1 to 5, can be successfully avoided.

As set forth above, the refractive index of the transparent material layer and the ordinary refractive index (or extraordinary refractive index) of the variable refractive index material, such as liquid crystal or the like, are set to be substantially equal to each other, but this is not necessarily required. Namely, setting the refractive indexing substantially equal corresponds to setting the focal length close to infinite. However, if it is difficult to set the refractive indexes at substantially equal values from the viewpoint of materials, or if materials which allow setting of the refractive indexes at substantially equal values cannot be employed in relation with other physical properties (dielectric constant anisotropy, refractive index anisotropy, temperature characteristics, mixing ability with catalyst, toxicity and so forth), it may be possible to set the focal length close to infinite by a correction made by arranging a fixed focus lens at the front or back side of the device.

Thus, this embodiment can increase the driving speed in comparison with the prior art, provides superior uniformity, easiness of fabrication, and thus can solve the problems in driving.

FIGS. 7 to 12 show an embodiment employing a nematic liquid crystal as one example of the optical device according to the present invention.

Here, as a material showing dielectric constant anisotropy depending upon the frequency, such as the variable refractive index material employed in the present invention, there is a dual-frequency liquid crystal among the nematic liquid crystals.

Figure 7:
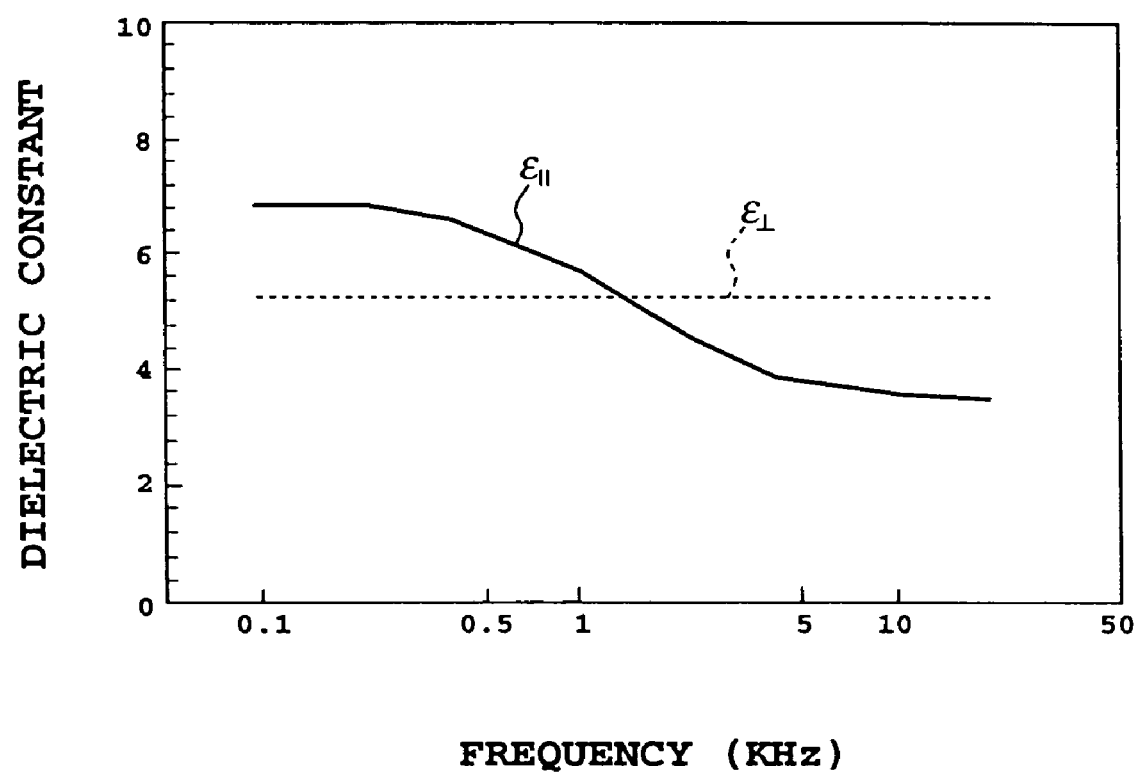
FIG. 7 is a chart showing the relationship between the dielectric constant of the liquid crystal of FIG. 6 and the frequency of a driving voltage.

FIG. 7 shows a specific example of the driving frequency dependency of the dielectric constant anisotropy $\Delta\in(=0\mu-0\perp)$ of the dual-frequency liquid crystal. The example of the nematic liquid crystal shown herein is $\Delta\in>0$ at a low frequency, As becomes smaller gradually as the frequency becomes higher, and $\Delta\in<0$ at a high frequency range. Here, when $\Delta\in>0$, the longer axes of the molecules of the dual-frequency liquid crystal are aligned along the electric field, and when $\Delta\in<0$, the longer axes of the molecules of the dual-frequency liquid crystal are aligned perpendicularly to the electric field. Accordingly, by simply varying the frequency, the refractive index of the dual-frequency liquid crystal can be varied in a substantially binary manner ($n_o$ and $n_e$), and thus the refractive index cannot be varied sequentially. (It should be noted that it may be possible to vary the refractive index by a balance of the anchoring force of the alignment layer and the force of the electric field, but this may encounter various problems as pointed out in the prior art.)

Figure 8:
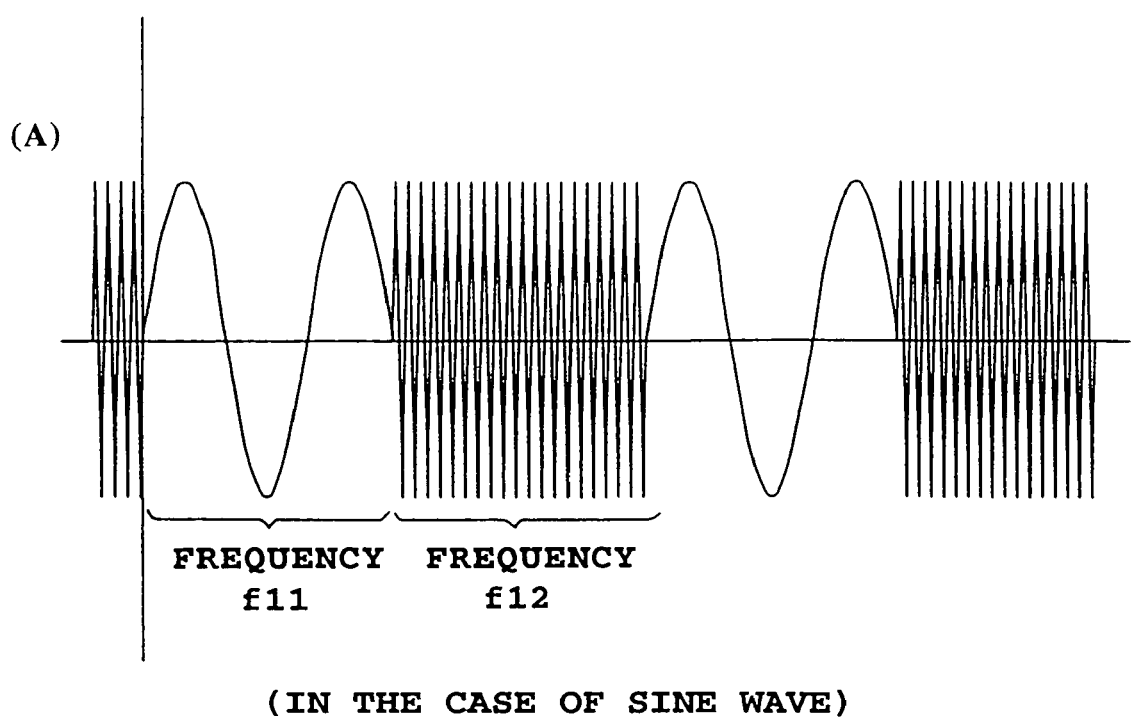
FIG. 8 illustrates suitable waveforms for the driving voltage of the optical device of FIG. 6.
Figure 8:
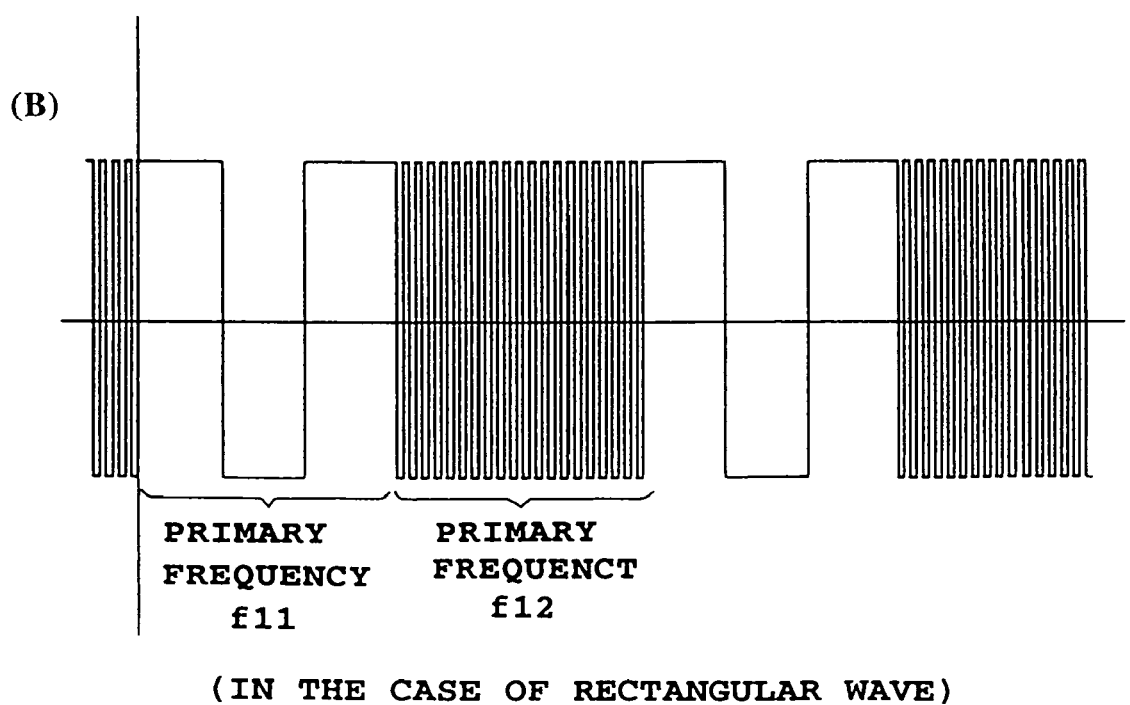

FIG. 8 illustrates one example of a waveform of the driving voltage which can periodically vary the refractive index of the dual-frequency liquid crystal sequentially. An example is shown in which two frequencies f11 ($\Delta\in>0$) and f12 ($\Delta\in<0$), at which $\Delta\in$ has different signs, are used. In the driving method in this embodiment, a voltage having a primary frequency at f11 and a voltage having an equal amplitude to the former voltage and having a primary frequency at f12 are applied at a given duty ratio and a given period.

When driven in this manner, the molecules of the dual-frequency liquid crystal sense and respond to a force for aligning the longer axes of the molecules along the electric field (upon application of the frequency f11) and to a force for aligning the longer axes of the molecules perpendicular to the electric field (upon application the frequency f12) periodically, alternately.

If there were no other constraint, the liquid crystal should abruptly vary at a switching point between the frequencies f11 and f12 and practical analogue operation would not be possible. However, in practice, there are constraints, such as viscosity, and such constraints may balance with the periodically alternating force to permit uniform analogue periodic aligning motions at a high speed over a wide range.

It should be appreciated that, in this driving method, it is important to periodically apply the electric fields at f11 and f12 for a given period of time. If the electric fields at frequency f11 and frequency f12 are applied one time only, uniformity may be degraded or divergence may be increased to reduce the practicality of the arrangement as a varifocal lens. By periodically applying the frequency f11 and the frequency f12 respectively for a given period, the foregoing balance may be established, and uniform operation over a wide range becomes possible.

Figure 9:
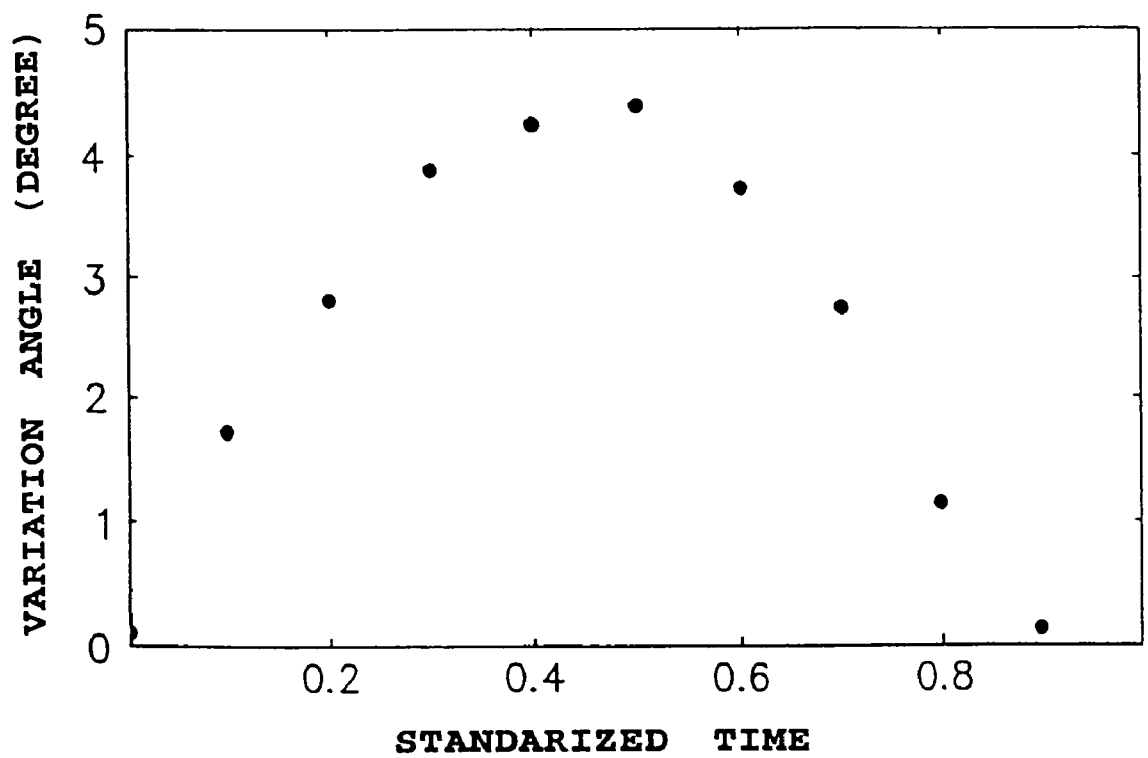
FIG. 9 is an explanatory illustration showing sequential periodic motion of the liquid crystal of FIG. 6.

FIG. 9 shows one example of periodical sequential motions of the liquid crystal. Here, a prism shape is employed as the surface configuration of the transparent material layer in the device illustrated in FIG. 6.

Further, as driving frequencies, a low frequency f11 and a high frequency f12 are used for driving, with rectangular waveforms as shown in FIG. 8. In this case, when the liquid crystal is aligned perpendicularly to the transparent electrode, the refractive index of the liquid crystal and the refractive index of the transparent material are substantially equal to each other. When the liquid crystal is aligned substantially parallel to the transparent electrode, the refractive index of the liquid crystal becomes greater than the refractive index of the transparent material. In FIG. 9, the horizontal axis represents a time from a timing of the beginning of the high frequency f12 (standardized by a repetition period of f11 and f12), and the vertical axis represents an output light beam variation angle (degree) caused by a variation of the refractive index.

It becomes clear from FIG. 9 that as the phase increases, the variation angle of the incident light beam shows behavior close to a sine wave and thus can be varied analogously. Further, the repetition period of two frequencies in this example is substantially 20 ms. From this fact, the present invention significantly increases a resumption speed in comparison with several seconds achieved by the prior art.

Figure 10:
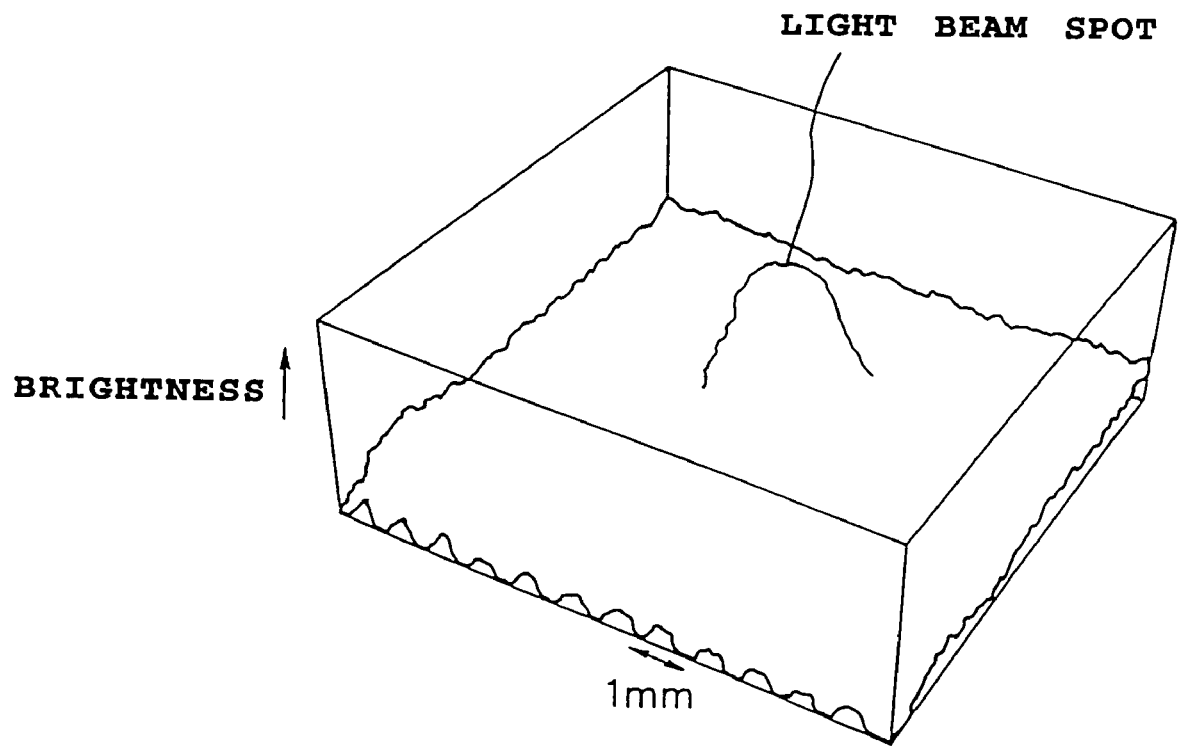
FIG. 10 is a graph showing a plane distribution of brightness of an output light beam.

FIG. 10 shows the shape of the output light beam in the former example (instantaneous image at a certain timing). When a circular spot light beam is the incident light beam, the output light beam is a spot with a similar shape at another time point. Since a similar spot image can be obtained at another timing, it becomes clear that the liquid crystal is making uniform alignment motions over a wide range.

(Another Driving System of Optical Device)

Figure 11A:
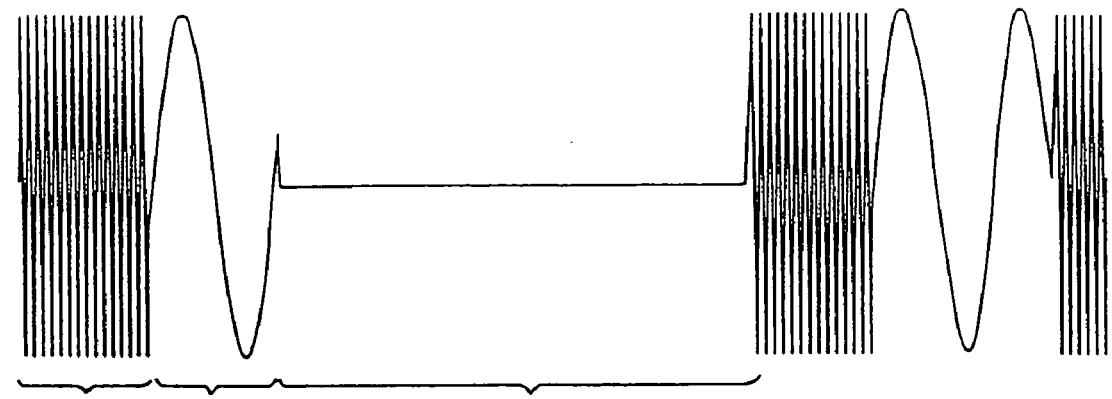
FIGS. 11A and 11B are charts illustrating other waveforms for the driving voltage of FIG. 6.
Figure 11B:
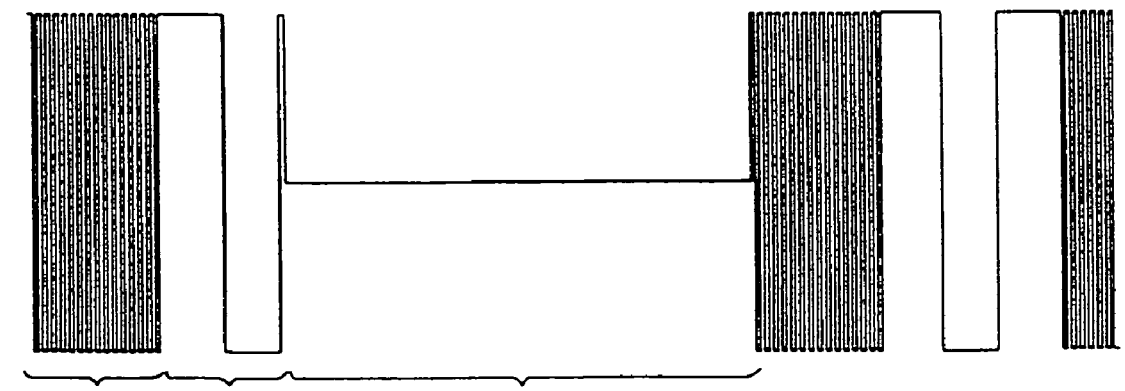

FIG. 11 shows another example of a waveform for the driving voltage which may sequentially vary the refractive index of the liquid crystal. Similarly, as was explained with reference to FIG. 8, two frequencies f11 ($\Delta\in<0$) and f12 ($\Delta\in>0$) at which $\Delta\in$ has different signs are used in FIG. 11. However, in FIG. 8, the voltages of the frequencies f11 and f12 have equal amplitudes and are applied at a given duty ratio and interval. Here, supply of voltage is temporarily stopped at a desired phase at an intermediate timing in the interval and subsequently resumed.

When supply of the voltage is temporarily stopped, the molecules of the dual-frequency liquid crystal stop at an inclination corresponding to the stopped phase, and maintain the inclined condition until this alignment is gradually disturbed by fluctuation due to the anchoring force of the alignment layer or temperature and so forth. A time elapses before the disturbance of the alignment occurs due to fluctuation due to the anchoring force of the alignment layer or temperature and so forth. It normally takes several seconds or more. Accordingly, by resuming the voltage within this time period, the disturbance of the alignment can be kept at a suppressed condition. Furthermore, such small disturbance of the alignment can be corrected by resumption of the voltage supply for the given time period. By driving the liquid crystal in the manner set forth above, it becomes necessary to regularly provide a given refresh time for correcting the disturbance, but a high speed variation of the refractive index (not necessarily periodic) can be achieved.

(Case in which Optical Devices are Arranged in Matrix)

Figure 12:
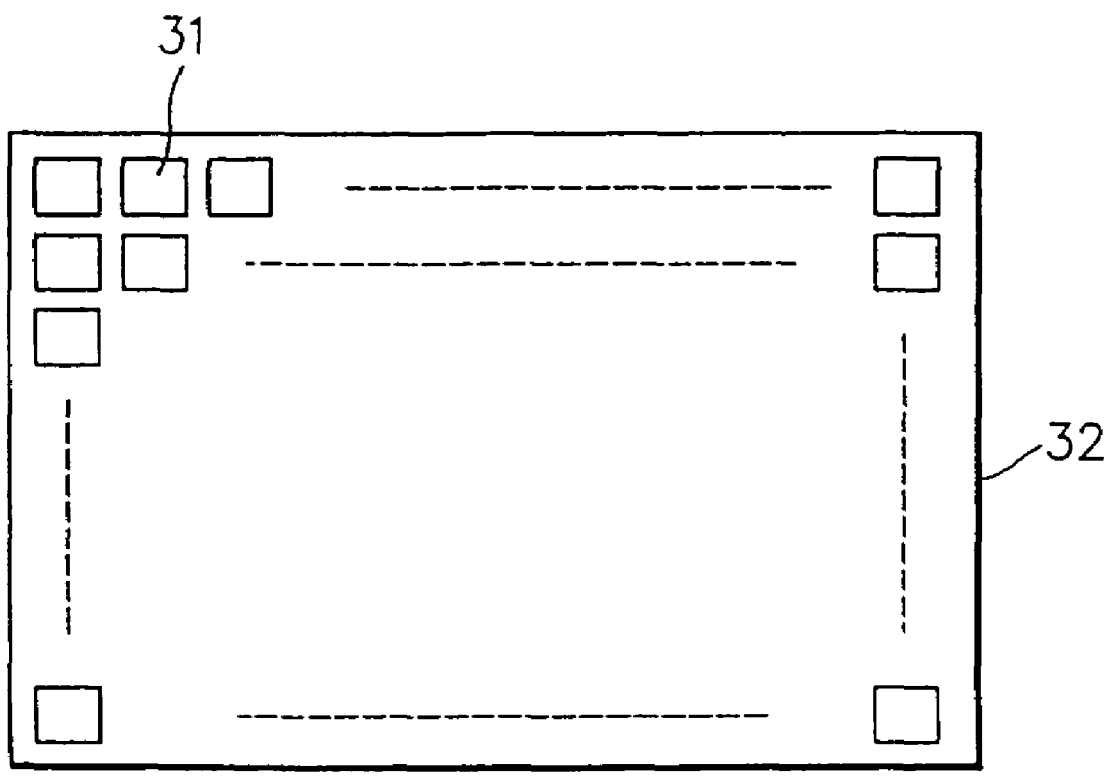
FIG. 12 is an illustration showing a matrix apparatus employing the optical device according to the present invention.

FIG. 12 shows one example to which the above-described driving method is applied. FIG. 12 shows a device 32, in which a plurality of cells 31 are arranged in matrix form. As a driving sequence, at first, (1) after a given period of a refreshing operation (periodic operation shown in FIG. 8), (2) voltage supply for respective cells is stopped at phases respectively corresponding to the desired variations of the refractive indexes of respective cells. Then, after the given period in each cell, refreshing operation is resumed. By repeating such manner of driving, the matrix device 32 formed with a plurality of cells can be driven.

Here, the waveform of the driving voltage is not limited to a sine wave. Needless to say, a rectangular wave or saw-tooth wave including the frequencies f11 and f12 as primary frequencies are also applicable. Further, it is also possible to make the amplitude very periodically. Furthermore, this embodiment employs two frequencies, but a greater number of frequencies may be employed as a matter of course.

Since the electric field is the major factor for causing a change in the refractive index in the driving method according to this embodiment, it becomes possible to further increase the variation in the liquid crystal alignment condition by increasing the amplitude of the applied voltage. Namely, the period of variation of the refractive index in this driving method can be accelerated up to several ms to several tens ms in contrast to several seconds in the prior art. This speed is sufficiently high even when the distance between the transparent electrodes becomes several hundreds gm in the construction shown in FIG. 6.

(Modifications of the First Embodiment of the Optical Device)

FIGS. 13 to 18 show modifications of the optical device according to the present invention. In these drawings, like portions as in the device shown in FIG. 6 will be represented by the same reference numerals. Namely, reference numeral 22 denotes a variable refractive index material. Reference numerals 23 and 24 denote transparent electrodes. Reference numerals 25 and 41 denote a driving device and a transparent material layer, respectively.

As set forth above, the variable refractive index material 22 has refractive index anisotropy and dielectric constant anisotropy. The dielectric constant anisotropy is that $\Delta\in>0$ at the frequency f11 and $\Delta\in<0$ at the frequency f12. Further, the refractive index anisotropy is that no (ordinary refractive index) is substantially equal to the refractive index of the transparent material layer 41, and $n_e$ (extraordinary refractive index) is substantially greater than the refractive index of the transparent material layer 41.

In the modifications of FIGS. 13 to 18, when a dual-frequency driven nematic liquid crystal is employed as the variable refractive index material, the driving voltage from the driving device may have the waveforms shown in FIGS. 7 to 12.

Figure 13:
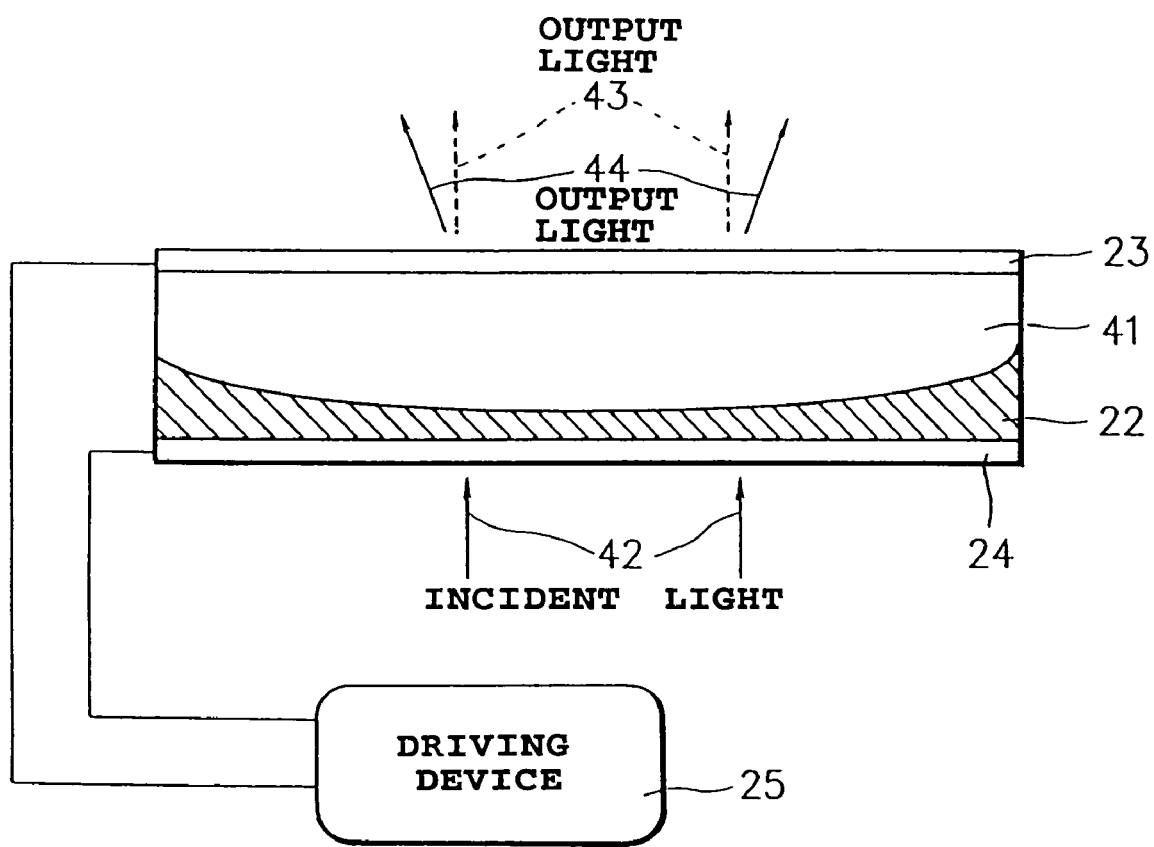
FIG. 13 is an illustration showing a modification of the first embodiment of the optical device of the present invention.

In FIG. 13, the surface configuration of the transparent material layer 41 is in a convex lens shape. When the frequency f11 is applied, the molecules of the variable refractive index material 22 are aligned in parallel to the direction of the electric field, namely in a direction perpendicular to the transparent electrodes 23 and 24. Therefore, in view of the relationship between the refractive index of the variable refractive index material 22 and the refractive index of the transparent material layer 41, the refractive index of the variable refractive index material 22 becomes substantially equal to the refractive index of the transparent material layer 41. Accordingly, a light beam 42 incident into this device substantially passes therethrough to be outputted as the output light beam 43 without change.

On the other hand, when frequency f12 is applied, the molecules of the variable refractive index material 22 are aligned in the direction perpendicular to the electric field, namely in parallel to the transparent electrodes 23 and 24. Therefore, based upon the relationship between the refractive index of the variable refractive index material 22 and the refractive index of the transparent material layer 41, the refractive index of the variable refractive index material 22 becomes substantially greater than the refractive index of the transparent material layer 41. Here, the variable refractive index material 22 becomes a concave lens. Therefore, with respect to the incident light beam 42 polarized in parallel to the longer axis of the molecules of the variable refractive index material 22 of this device, this embodiment serves as a concave lens to cause an output light beam 44.

As set forth above, in the example of FIG. 13, by varying the refractive index of the variable refractive index material 22, the focal length of the concave lens can be varied.

Figure 14:
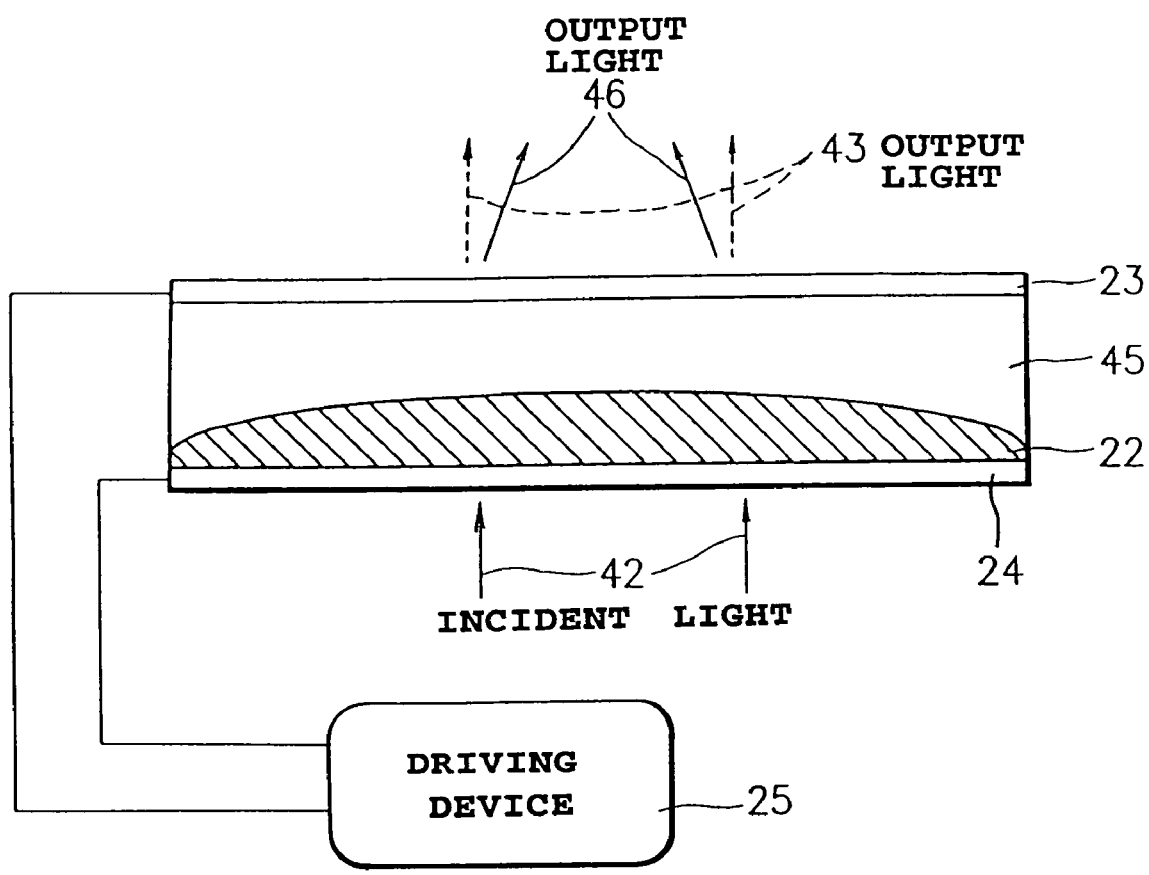
FIG. 14 is an illustration showing another modification of the first embodiment of the optical device of the present invention.

FIG. 14 shows a further modification of the optical device according to the present invention. Here is shown an example, in which a transparent material layer 45 having surface configuration in the shape of a concave lens.

When the frequency f11 is applied to this device, the refractive index of the variable refractive index material 22 becomes substantially equal to the refractive index of the transparent material layer 45 likewise as in the arrangement shown in FIG. 13. Then, the incident light beam 42 passes therethrough and is outputted as the output light beam 43 with substantially no change.

On the other hand, when the frequency f12 is applied, the refractive index of the variable refractive index material 22 becomes greater than the refractive index of the transparent material layer 45 as in FIG. 13. Here, since a portion of the variable refractive index material 22 is formed into a convex lens shaped configuration, this embodiment serves as a convex lens with respect to the incident light beam polarized in parallel to the longer axis of the molecule of the variable refractive index material 22 to converge the light beam as the output light beam 46.

Thus, in the modification of FIG. 14, by varying the refractive index of the variable refractive index material 22, the focal length of the convex lens can be varied.

Figure 15:
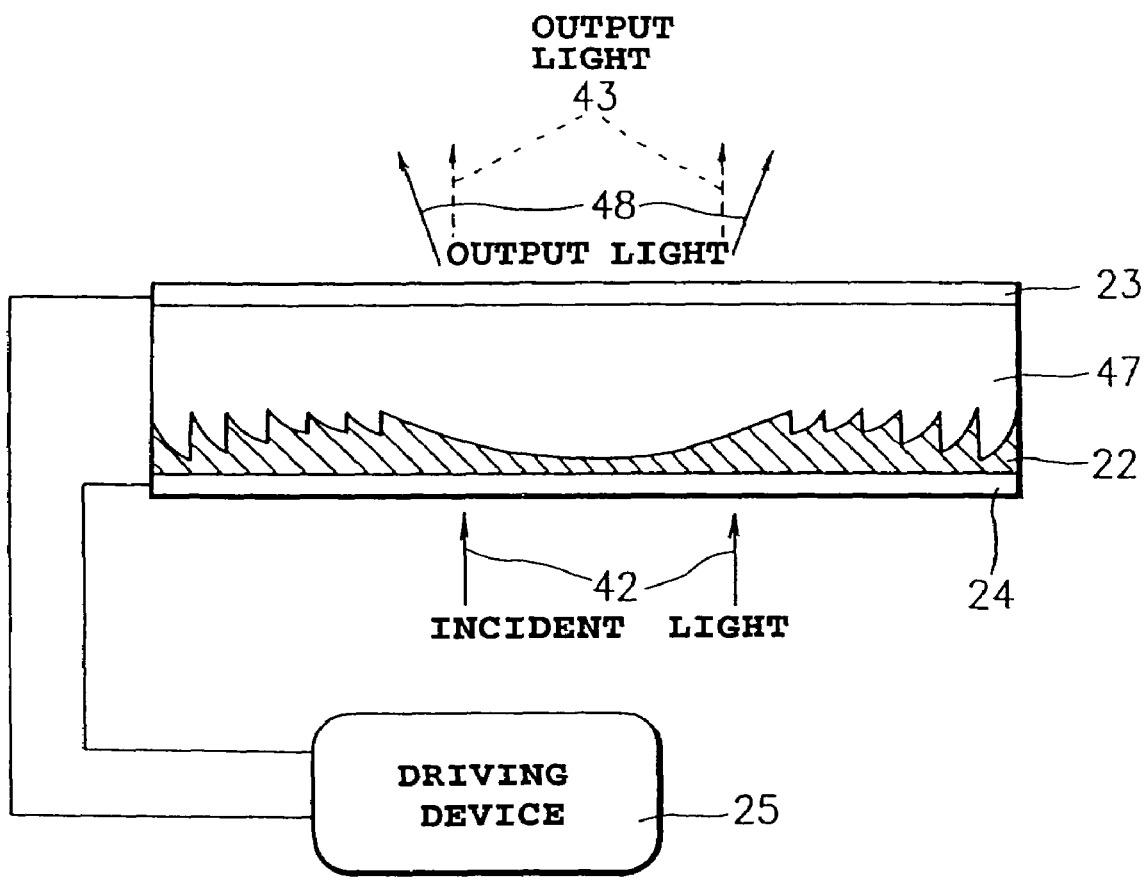
FIG. 15 is an illustration showing another modification of the first embodiment of the optical device of the present invention.

FIG. 15 shows a still further embodiment of this modification of the optical device according to the present invention. Here, a transparent material layer 47 having a convex fresnel lens surface configuration is employed in the arrangement of FIG. 13.

When the frequency f11 is applied to this device, the refractive index of the variable refractive index material 22 becomes substantially equal to the refractive index of the transparent material layer 47 likewise as in FIG. 13. Then, the incident light beam 42 passes therethrough and is outputted as the output light beam 43 with substantially no change.

On the other hand, when the frequency f12 is applied, the refractive index of the variable refractive index material 22 becomes greater than the refractive index of the transparent material layer 47 as in FIG. 13. Here, since the variable refractive index material 22 is formed into a concave fresnel lens shaped configuration, this arrangement serves as a concave fresnel lens for an incident light beam to diverge the light beam so as to provide an output light beam 48.

Thus, in the arrangement of FIG. 15, by varying the refractive index of the variable refractive index material 22, the focal length of the concave fresnel lens can be varied.

Figure 16:
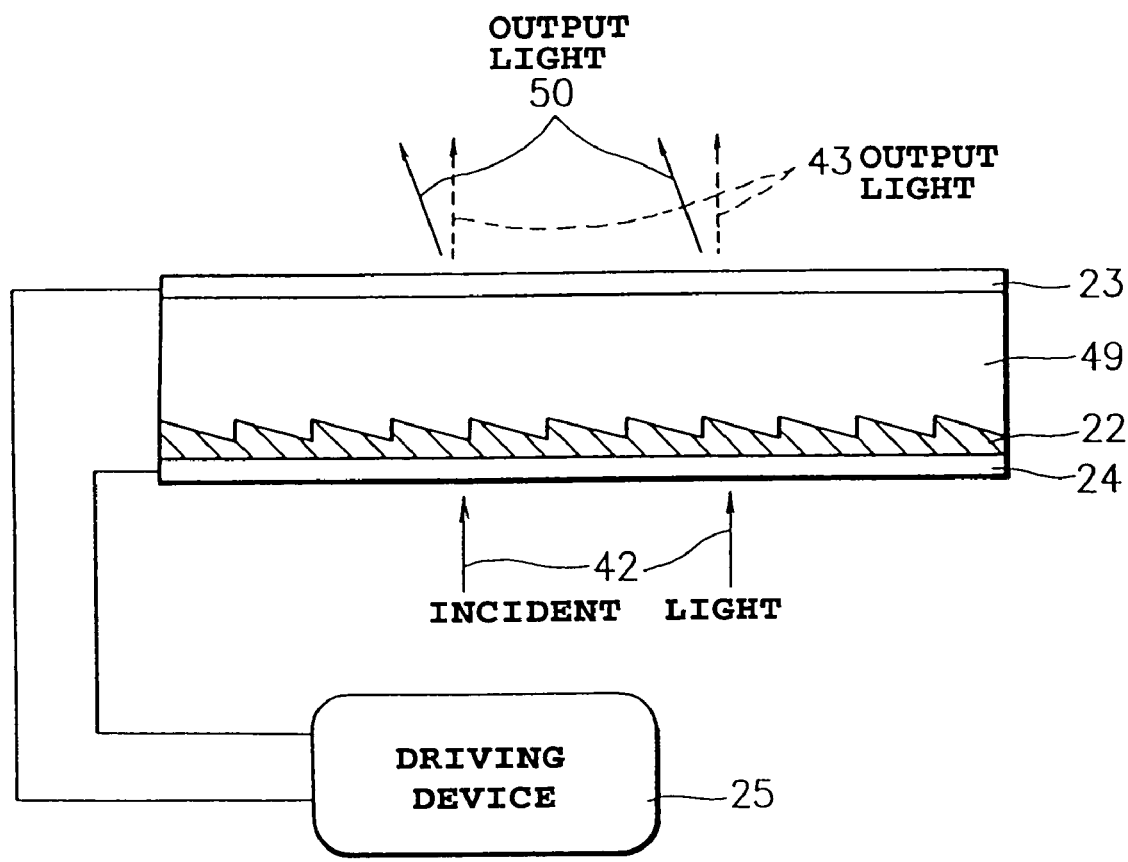
FIG. 16 is an illustration showing another modification of the first embodiment of the optical device of the present invention.

FIG. 16 shows a yet further modification of the optical device according to the present invention. Here, a transparent material layer 49 having a prism array like surface configuration is employed in the arrangement of FIG. 13.

When the frequency f11 is applied to this device, the refractive index of the variable refractive index material 22 becomes substantially equal to the refractive index of the transparent material layer 49 as in FIG. 13. Then, the incident light beam 42 passes therethrough and is outputted as the output light beam 43 with substantially no change.

On the other hand, when the frequency f12 is applied, the refractive index of the variable refractive index material 22 becomes greater than the refractive index of the transparent material layer 49 as in FIG. 13. With respect to an incident light beam polarized in parallel to the longer axis of the molecule of the variable refractive index material 22, the light beam is deflected depending upon the difference in the refractive indexes and the inclination of the prism to deflect the light as an output light beam 50.

Thus, in the arrangement of FIG. 16, by varying the refractive index of the variable refractive index material 22, the deflection angle can be varied.

Figure 17:
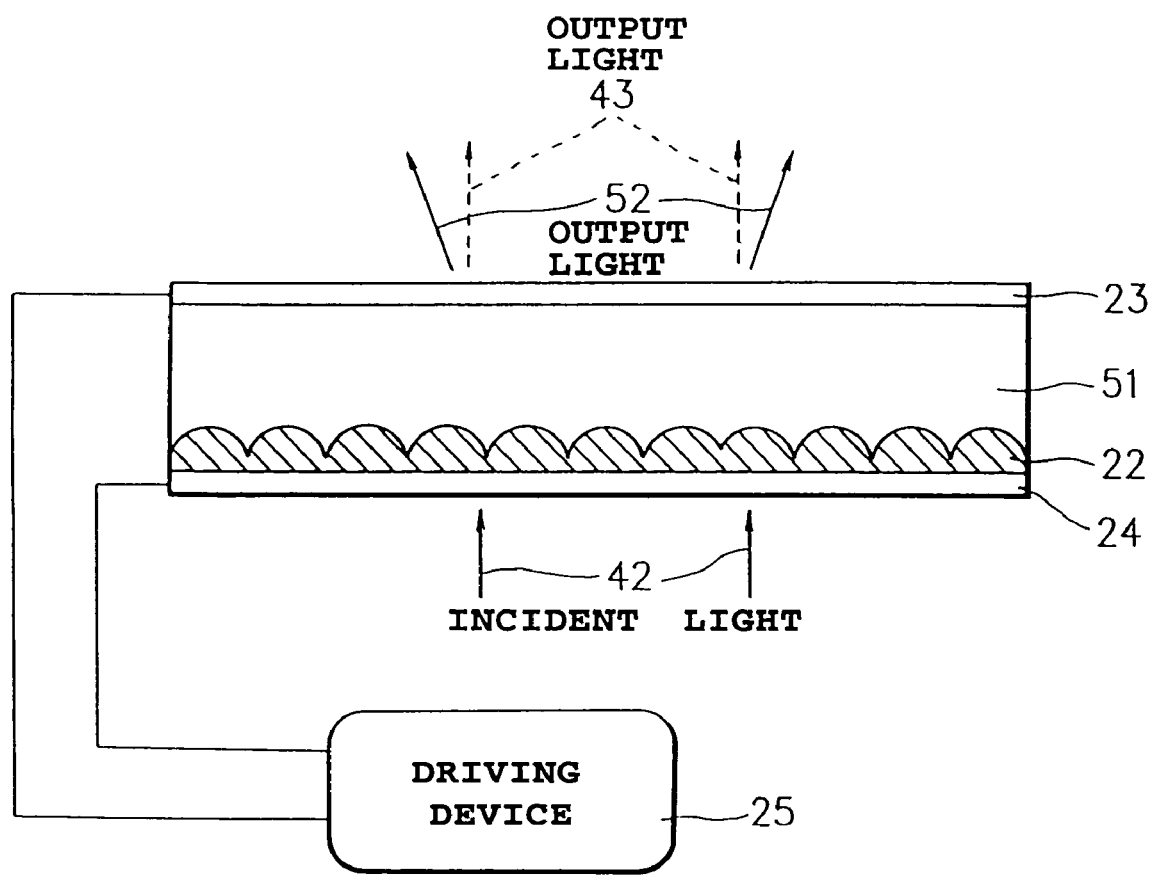
FIG. 17 is an illustration showing another modification of the first embodiment of the optical device of the present invention.

FIG. 17 shows a yet further modification of the optical device according to the present invention. Here, a transparent material layer 51 having a surface configuration in the shape of a concave lenticular lens is employed in the arrangement of FIG. 13.

When the frequency f11 is applied to this device, similarly to the embodiment shown in FIG. 13, the refractive index of the variable refractive index material 22 becomes substantially equal to the refractive index of the transparent material layer 51. Then, the incident light beam 42 passes therethrough and is outputted as the output light beam 43 with substantially no change.

On the other hand, when the frequency f12 is applied, the refractive index of the variable refractive index material 22 becomes greater than the refractive index of the transparent material layer 51 as in FIG. 13. Here, since the variable refractive index material 22 is formed into the convex lenticular lens shaped configuration, this arrangement serves as a convex lenticular lens with respect to the incident light beam polarized in parallel to the longer axis of the molecule of the variable refractive index material 22 to diverge the light beam as an output light beam 52.

Thus, in the arrangement of FIG. 17, by varying the refractive index of the variable refractive index material 22, the focal length and diverting angle of the lenticular lens can be varied.

Figure 18:
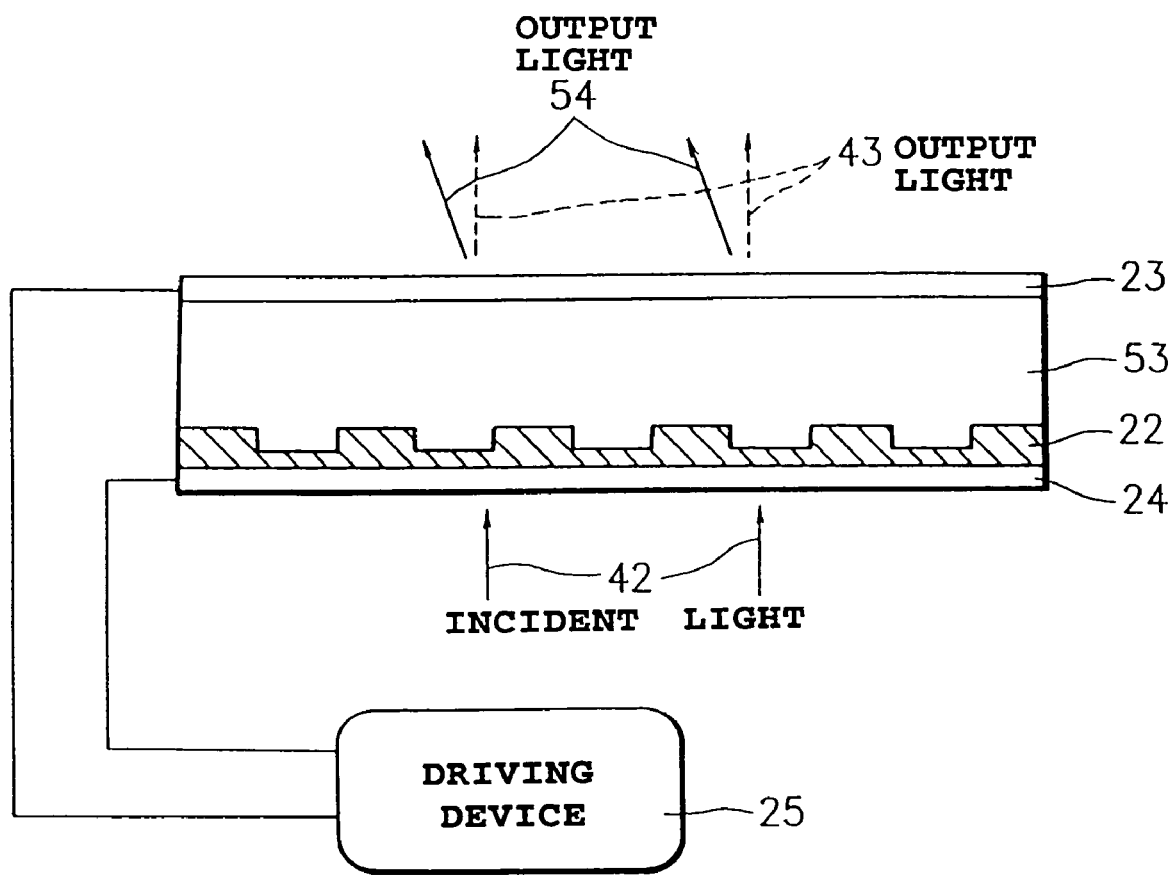
FIG. 18 is an illustration showing another modification of the first embodiment of the optical device of the present invention.

FIG. 18 shows a yet further modification of the optical device according to the present invention. Here, a transparent material layer 53 having a diffraction grating like surface configuration is employed in the arrangement of FIG. 13.

When the frequency f11 is applied to this device, the refractive index of the variable refractive index material 22 becomes substantially equal to the refractive index of the transparent material layer 53 as in the arrangement shown in FIG. 13. Then, the incident light beam 42 passes therethrough and is outputted as the output light beam 43 with substantially no change.

On the other hand, when the frequency f12 is applied, the refractive index of the variable refractive index material 22 becomes greater than the refractive index of the transparent material layer 53 as in FIG. 13. Here, since the variable refractive index material 22 is formed into the diffraction index shaped configuration, this arrangement serves as a diffraction grating with respect to an incident light beam polarized in parallel to the longer axis of the molecules of the variable refractive index material 22 to diffract the light beam so as to provide an output light beam 54.

Thus, in the arrangement of FIG. 18, by varying the refractive index of the variable refractive index material 22, a difference in the refractive index in the diffraction grating can be varied, and thus can vary the intensity of the diffracted light beam.

(Second Embodiment of the Optical Device)

Figure 19:
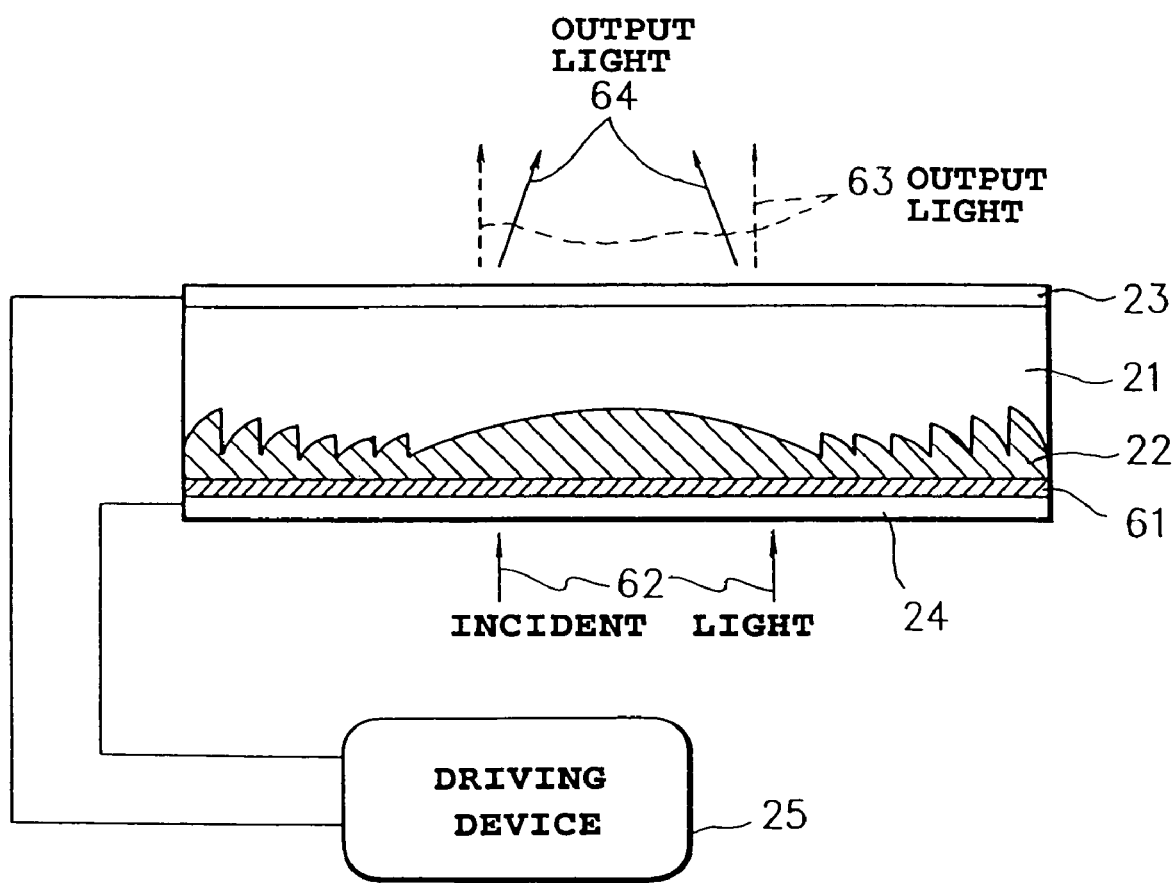
FIG. 19 is an illustration showing the second embodiment of the optical device according to the present invention.

FIG. 19 shows another example of the second embodiment of the optical device according to the present invention. In the drawing, like components as those in the device of FIG. 6 will be denoted by like reference numerals. Namely, reference numeral 21 denotes a transparent material layer, 22 denotes a variable refractive index material, 23 and 24 denote transparent electrodes, 25 denotes a driving device, and 61 denotes an alignment layer. The alignment layer 61 is formed of polyimide, PVA, PVB, inclined evaporation deposition SiO or so forth, and is formed on the surface of the transparent electrode 24 on the side of the variable refractive index material 22. By processing the alignment layer 61 by the rubbing method or the like, the variable refractive index material, i.e. the liquid crystal 22 in this case, can be aligned in a given direction.

By the construction and process set forth above, in the driving condition where the liquid crystal 22 is aligned to be parallel to the alignment layer 61, the liquid crystal 22 can be placed in a uniformly aligned condition in a wide domain region. Because of this, a change in the refractive index of the liquid crystal 22 can efficiently propagate to the incident light beam. Further, it becomes possible to prevent diverting due to randomly orienting the molecules of liquid crystal 22 and opaquing resulting therefrom.

By applying the alignment layer including polyimide, PVA, PVB, inclined evaporation deposition SiO or so forth on the surface of the transparent material layer 21 on the side of the liquid crystal 22, and providing the aligning process by a rubbing method and the like, the alignment ability of the liquid crystal 22 on the side of the transparent material layer 21 can be improved. Further, when the transparent material layer 21 is formed by a replica method (a method for obtaining a replica of a die of metal, glass, plastic or the like), it is possible to directly align the liquid in the case of a certain direction of peeling off of the replica. In this case, since it becomes unnecessary to apply a special layer or to subject the surface having unevenness to the alignment process, fabrication of this device can be facilitated.

Further, by coating a vertical alignment material on the surface of the transparent material layer 21 on the side of the liquid crystal 22, the liquid crystal 22 on the side of the transparent material layer 21 can be aligned vertically. The liquid crystal 22 on the side of the transparent material layer 21 can be aligned to be oriented close to vertical by applying a material containing a group of fluorine or the like and having a low wettability with the liquid crystal material on the surface of the transparent material layer 21. In such cases, it is sufficient to coat the layer. It is not required to subject a surface having unevenness to the alignment process, so fabrication of this device can be facilitated.

In the optical device shown in FIG. 19, as the variable refractive index material, a dual-frequency liquid crystal may also be used, for example. With such structure, in the vicinity of the transparent electrode, on which the alignment layer is arranged, the molecules of the dual-frequency liquid crystal (variable refractive index material) in the vicinity thereof can be aligned in a given orientation by carrying out an alignment process such as a rubbing method or the like. However, since no particular alignment process is applied in the vicinity of the transparent material layer, the alignment orientation of the dual-frequency liquid crystal may differ from one portion to another portion so that the variation in the refractive index cannot satisfactorily propagate to the incident light beam to make it difficult to obtain the effect of varifocal point.

However, even in the case of such construction, by making the light beam incident from the side where the ordering of the liquid crystal has higher uniformity (e.g. side where the alignment layer is formed), this problem can be solved. Namely, by matching the polarized condition of the incident light beam with the alignment orientation, variation in the refractive index can effectively propagate to the incident light beam. This is based on the optical rotation property of the liquid crystal. When the alignment orientation of the molecules of the liquid crystal is varied toward the direction of the incident light beam at a lower speed in comparison with the wavelength, the polarizing direction of the incident light beam is varied following a variation in the alignment orientation of the molecules of the liquid crystal. (For example, when the alignment orientation of the liquid crystal is varied counterclockwise, the polarizing direction of the incident light beam is also varied counterclockwise.)

Therefore, even when the alignment orientation is made different from one position to another position in the vicinity in the transparent material layer, the incident light beam may sufficiently sense the variation in the refractive index.

Such a construction can dispense with the need to apply a special layer or the need to subject a surface having unevenness to an alignment process, thereby facilitating the fabrication of this device.

Figure 20:
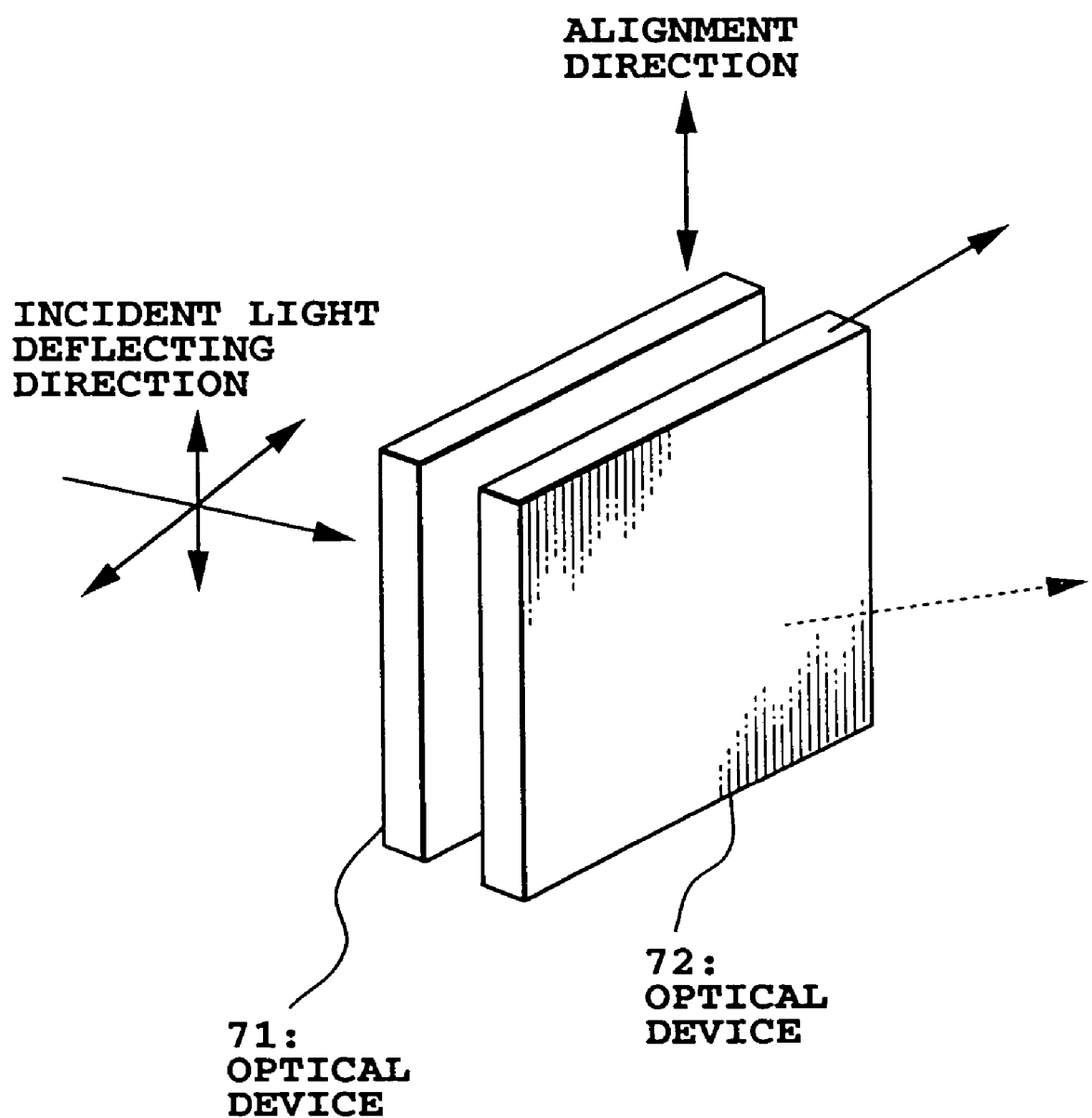
FIG. 20 is an illustration showing a construction employing the optical device of FIG. 19.

FIG. 20 shows an embodiment of the optical device according to the invention. Namely, reference numerals 71 and 72 denote optical devices having the alignment layer as discussed with respect to FIG. 19. By arranging the alignment layers in series in a manner such that they mutually intersect each other at right angles substantially, various functions can be achieved irrespective of the polarizing condition of the incident light beam.

Figure 21:
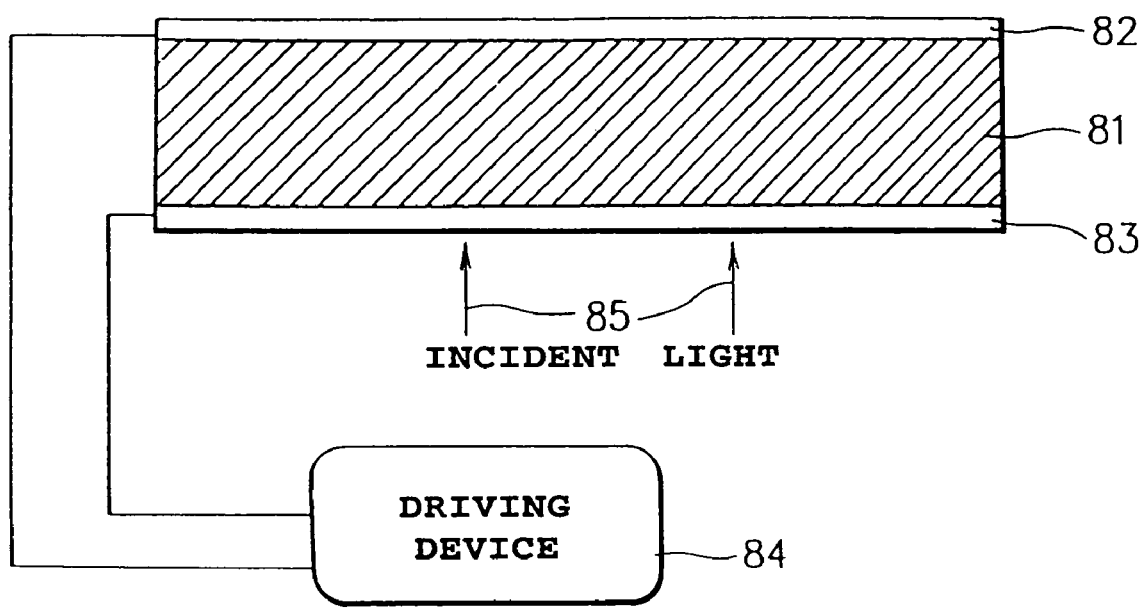
FIG. 21 is an illustration showing the third embodiment of the optical device according to the present invention.

FIG. 21 shows another embodiment of the optical device according to the invention. This embodiment of the optical device comprises a variable refractive index material 81 formed of a transparent material including liquid crystal, a plurality of transparent electrodes 82 and 83 sandwiching the variable refractive index material 81 and formed of ITO or SnOx, and a driving device 84 for driving these components. Here, in the embodiment of FIG. 21, there is shown one example of the active optical device which is directed to providing a device for varying a light beam phase.

In the embodiment of FIG. 21, the variable refractive index material 81 has refractive index anisotropy and dielectric constant anisotropy. The dielectric constant anisotropy, $\Delta\varepsilon (=0\|)$ (dielectric constant in parallel to the longer axis of the molecule)$-(0\bot$ (dielectric constant in an orientation perpendicular to the longer axis of the molecule)) is positive at a frequency f11, and $\Delta\varepsilon$ becomes negative at a frequency f12. Further, the refractive index anisotropy, $n_o$ (ordinary refractive index) is substantially smaller than $n_e$ (extraordinary refractive index).

When an electric field having a frequency f11 is applied to the transparent electrodes 83 and 84 by the driving device 84, $\Delta\varepsilon>0$. Thus, the molecules of the variable refractive index material 81 are aligned in a direction parallel to the electric field, i.e. in an orientation perpendicular to the transparent electrodes 82 and 83. Therefore, the refractive index of the variable refractive index material 81 becomes $n_o$, so that a phase shift associated with the incident light beam occurs corresponding to a product of the refractive index and the thickness of the layer.

On the other hand, when the driving device 84 applies an electric field having a frequency f12 to the transparent electrodes 82 and 83, $\Delta\varepsilon<0$. Consequently, the molecules of the variable refractive index material 81 are aligned perpendicularly to the direction of the electric field, i.e., in parallel to the transparent electrodes 82 and 83. Thus, the refractive index of the variable refractive index material 81 becomes $n_e$, which is greater than $n_o$. Therefore, the phase shift of the incident light beam 85 becomes greater in comparison with that at the frequency f11.

In this embodiment described above, by varying the refractive index of the variable refractive index material 81, the phase shift of the light beam is an optical property of the optical device that can be varied.

(Another Driving Method for an Optical Device)

Figure 22:
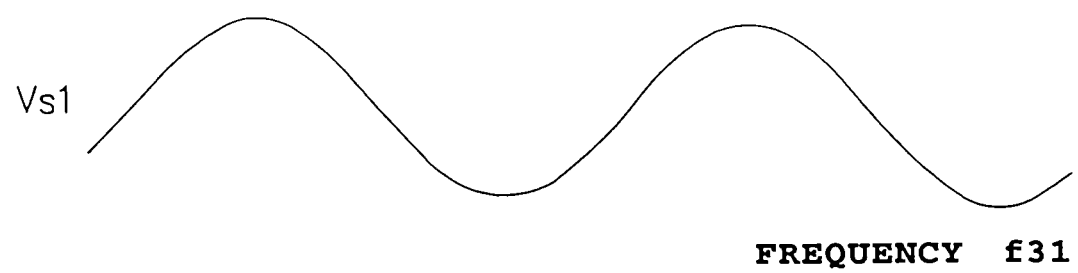
FIG. 22 illustrates suitable waveforms for the driving voltage for the devices of FIGS. 13-19 and FIG. 21.
Figure 22:
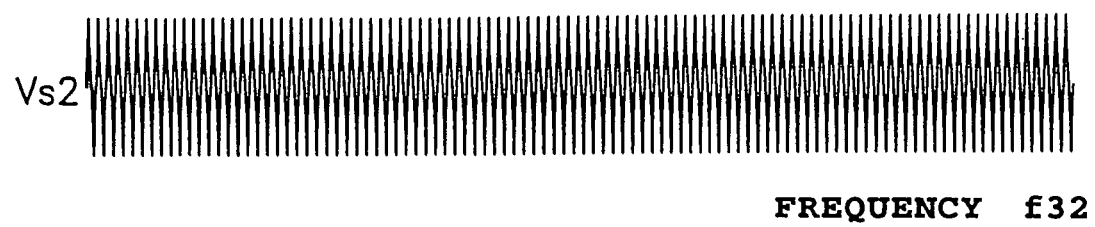
Figure 22:
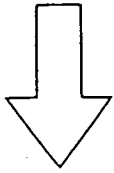
Figure 22:
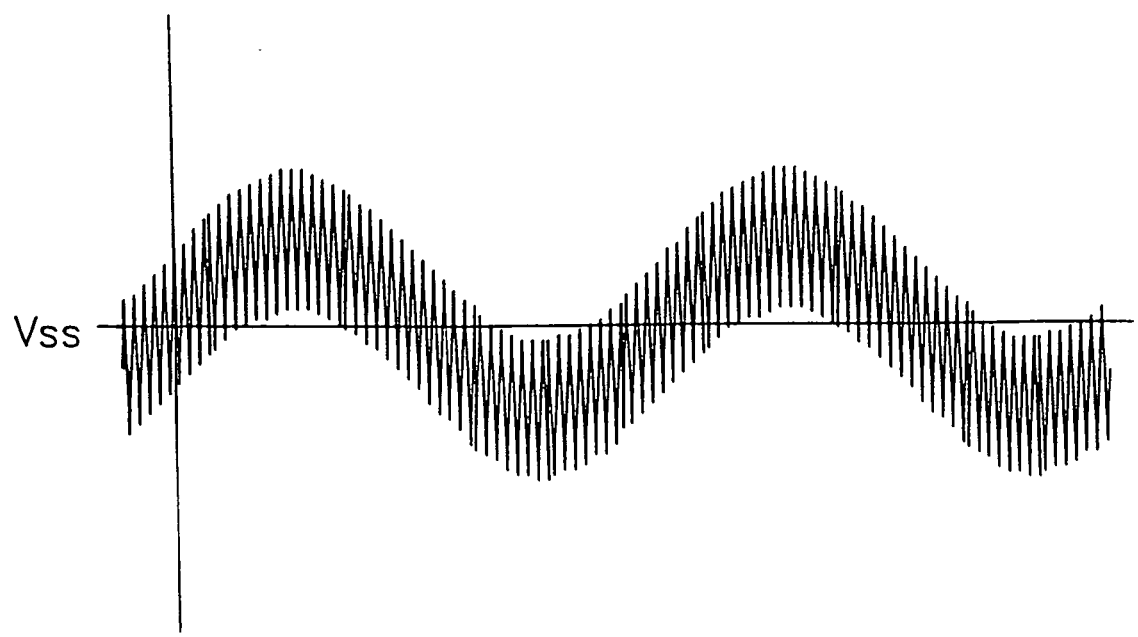
Figure 23:
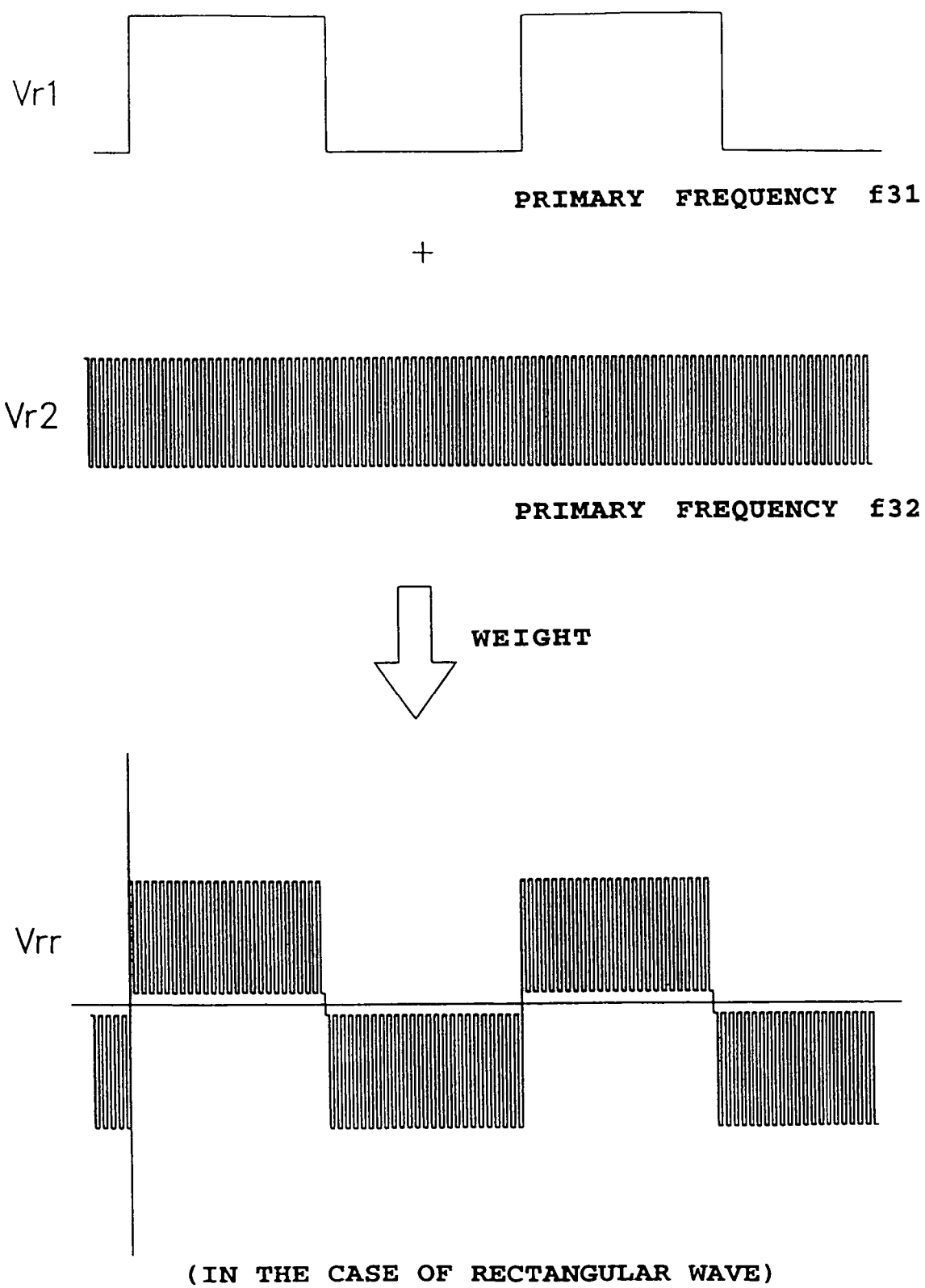
FIG. 23 illustrates suitable waveforms for another driving voltage for the devices of FIGS. 13-19 and FIG. 21.

FIGS. 22 and 23 show examples according to the invention of driving voltage waveforms which may be used to sequentially vary the optical property. FIG. 22 illustrates sine waves, while FIG. 23 illustrates rectangular waves. FIG. 22 shows a voltage Vss (in the case of the sine waves) and FIG. 23 shows a voltage Vrr (in the case of the rectangular waves). In FIG. 22, Vs1 having a frequency 01 as a primary frequency, and a voltage Vs2 having a frequency 02 as a primary frequency, are superimposed at a certain voltage ratio. In FIG. 23, a voltage Vr1 having a frequency 01 and a voltage Vr2 having a frequency f32 are superimposed at a certain voltage ratio.

By driving with the driving voltages as set forth above, the molecules of the liquid crystal are simultaneously subject to a force for aligning the longer axis along the electric field (upon application of the frequency F31) and a force for aligning the longer axis perpendicular to the electric field (upon application of the frequency f32) in a ratio corresponding to the foregoing voltage ratio. Therefore, the molecules of the variable refractive index material 81 are aligned to be inclined from the electric field direction at an angle where the forces in opposite directions balance. Therefore, the refractive index can be varied sequentially at high speed. Further, the foregoing action may be combined with the constraining force of the liquid crystal thereby to permit substantially uniform alignment action of the liquid crystal at a high speed over a wide domain region.

Here, the waveform of driving voltage is not necessarily a sine wave or rectangular wave and may be a saw-toothed wave containing the foregoing frequencies f31 and f32 as primary frequencies. Further, it should be clear to provide a variation of the amplitude with time. Furthermore, two frequencies are used in this embodiment, but a greater number of frequencies may also be used.

Since the primary factor influencing the refractive index in this embodiment of the driving method is the electric field, a higher speed can be achieved by increasing the amplitude. Namely, even when the distance between the transparent electrodes is wide, in the order of several hundreds μm, the dual-frequency liquid crystal can vary the refractive index at several tens of milliseconds or less to provide a fast response speed.

Figure 24:
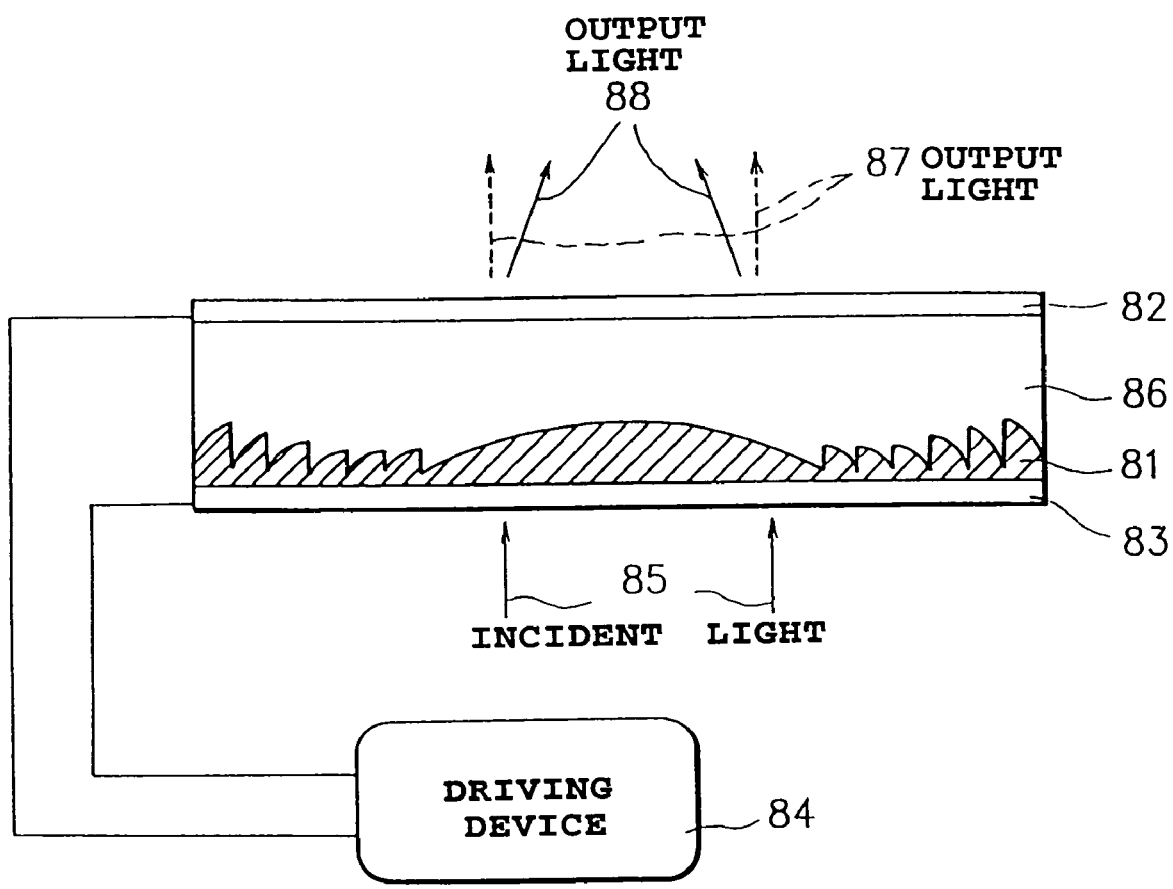
FIG. 24 is an illustration showing a modification of the third embodiment of the present invention.
Figure 25:
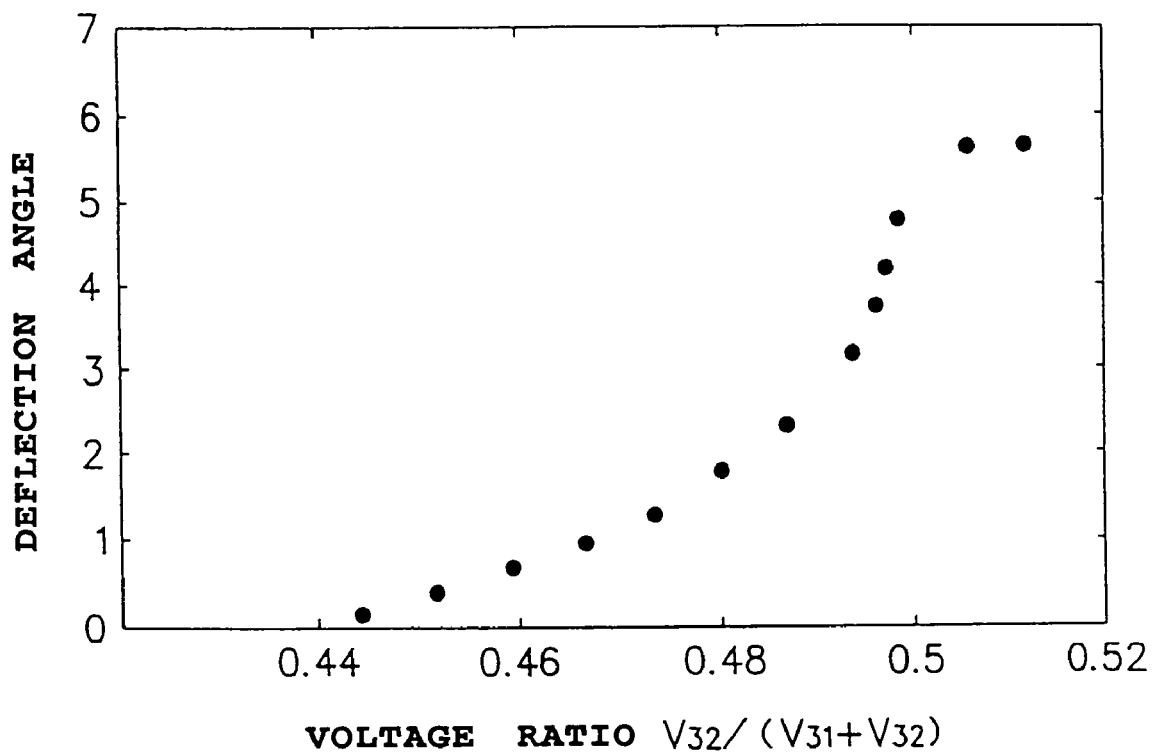
FIG. 25 is an explanatory illustration showing sequential variations of an optical property in the third embodiment of the optical device according to the present invention.

FIGS. 24 and 25 show one example of the foregoing driving method for the optical device. In the drawings, like components as in the device of FIG. 21 will be denoted by the like reference numerals. Namely, reference numeral 81 denotes the variable refractive index material. Reference numerals 82 and 83 denote transparent electrodes. 84 denotes the driving device and 86 denotes a transparent material layer.

The transparent material layer 86 is formed of a transparent polymer, glass or the like with a desired curved surface configuration and disposed between the transparent electrodes 82 and 83.

In this embodiment, as one example of the active optical device, a planar convex lens with a variable focal length (focal length is positive) is provided. For example, when the refractive index of the variable refractive index material 81 is substantially greater than the refractive index of the transparent material layer 86, the variable refractive index material 81 may be formed in the shape of a convex lens. Accordingly, the surface configuration of the transparent material layer 86 on the side of the variable refractive index material 81 may be in the shape of a concave fresnel lens. Needless to say, if the refractive index of the variable refractive index material 81 is substantially smaller than the refractive index of the transparent material layer 86, the surface configuration of the transparent material layer 86 on the side of the variable refractive index material 81 may be in the shape of a convex fresnel lens. In this embodiment, the variable refractive index material 81 has refractive index anisotropy and dielectric constant anisotropy. As the refractive index anisotropy, $\Delta\in$, >0 at the frequency f31 and $\Delta\in$<0 at the frequency f32. Further, in this embodiment, the dielectric constant anisotropy is such that no is substantially equal to the refractive index of the transparent material layer 86 and ne is substantially greater than the refractive index of the transparent material layer 86.

When an electric field having frequency f31 is applied between the transparent electrodes 82 and 83 from the driving device 84, $\Delta\in$>0. Consequently, the molecules of the variable refractive index material 81 are aligned in parallel to the electric field, i.e. in a direction perpendicular to the transparent electrodes 82 and 83. Therefore, from the relationship between the refractive indexes of the transparent material layer 86 and the variable refractive index material 81, the refractive index of the variable refractive index material 81 becomes substantially equal to the refractive index of the transparent material layer 86. Accordingly, the light beam incident into this embodiment of the optical device according to the invention, may be outputted as an output light beam 87 with substantially no change.

On the other hand, when an electric field having frequency f32 is applied between the transparent electrodes 82 and 83 from the driving device 84, $\Delta\in$<0. Consequently, the molecules of the variable refractive index material 81 are aligned perpendicular to the electric field, i.e. in parallel to the transparent electrodes 82 and 83. Therefore, from the relationship between the refractive indexes of the transparent material layer 86 and of the variable refractive index material 81, the refractive index of the variable refractive index material 81 becomes greater than the refractive index of the transparent material layer 86. Here, the variable refractive index material 81 is shaped into a convex fresnel lens. This device serves as a convex fresnel lens with respect to the light beam 85 polarized in parallel to the longer axis of the molecule to make it converge as an output light beam 88.

As set forth above, in this embodiment, the focal length of the lens can be varied, by varying the refractive index of the variable refractive index material 81, amongst the optical properties of the optical device.

However, as set forth above, it is not possible to vary the refractive index to an intermediate value between no and ne by simply varying the frequency.

Sequential variation of the optical property of the optical device can be obtained by applying the voltage V31 having the frequency f31 as the primary frequency thereof and the voltage V32 having the frequency f32 as the primary frequency thereof in a superimposing manner at a certain voltage ratio. At this time, the molecules of the dual-frequency liquid crystal are aligned in an inclined orientation where the forces in the opposite directions are balanced. Further, the constraining force of the liquid crystal is combined with the action set forth above, so that uniform and high speed alignment operations of the liquid crystal become possible, thus enabling uniform variation of the optical property.

FIG. 25 shows one example of a sequential variation in the optical property. In this example, the surface of the transparent material layer is configured in the shape of a prism. The horizontal axis represents a voltage ratio (V32/(V31+V32)) of the voltage V31 having the frequency f31 as the primary frequency thereof and the voltage V32 having the frequency f31 as the primary frequency thereof. The vertical axis represents a variation of the deflection angle of the output light beam with a variation in the refractive index (V32/(V31+V32)). From FIG. 25, it is seen that the deflection angle of the output light beam varies with the increase in the voltage ratio (V32/(V31+V32)). It should be noted that the shape of the output light beam is similar to that of FIG. 10. From this, it becomes clear that the liquid crystal makes substantially uniform alignment actions over a wide range.

Here, the driving voltage to be applied is not necessarily a sine wave. Needless to say, a rectangular wave or sawtooth wave including the frequencies f31 and f32 as primary frequencies are also applicable. Further, it is clear that the amplitude may vary with time. Furthermore, this embodiment employs two frequencies, but a greater number of frequencies may be also employed.

Since the electric field is a major factor for causing a variation in the refractive index in the driving method according to this embodiment, it becomes possible to further accelerate the speed of varying the liquid crystal alignment condition by increasing the amplitude of the applied voltage. More specifically, a speed of several 10 ms or less as a response speed in the refractive index variation of the dual-frequency liquid crystal can be achieved even when the distance between the transparent electrodes reaches several hundreds gym.

Furthermore, since the alignment of the variable refractive index material 81 is varied by the electric field and the transparent electrode 82 is not provided on the transparent material layer 86 on the side of the variable refractive index material 81, it becomes unnecessary to form the layer on portions of complicated configuration. Therefore, fabrication can be facilitated in comparison with the conventional device shown in FIGS. 1 to 5.

Furthermore, the transparent electrode 82 is not provided on the transparent material layer 86 on the side of the variable refractive index material 81, so a substantially equal distance between the transparent electrodes 82 and 83 is maintained over the entire area. Furthermore, the transparent material layer 86 essentially lies between the transparent electrodes 82 and 83, effectively preventing degradation of insulation, short circuits and so forth, unlike the device of FIGS. 1 to 5.

As set forth above, in comparison with the prior art, this embodiment can speed up driving with uniformity, can facilitate fabrication, and solve the driving problem associated with the prior art.

Figure 26A:
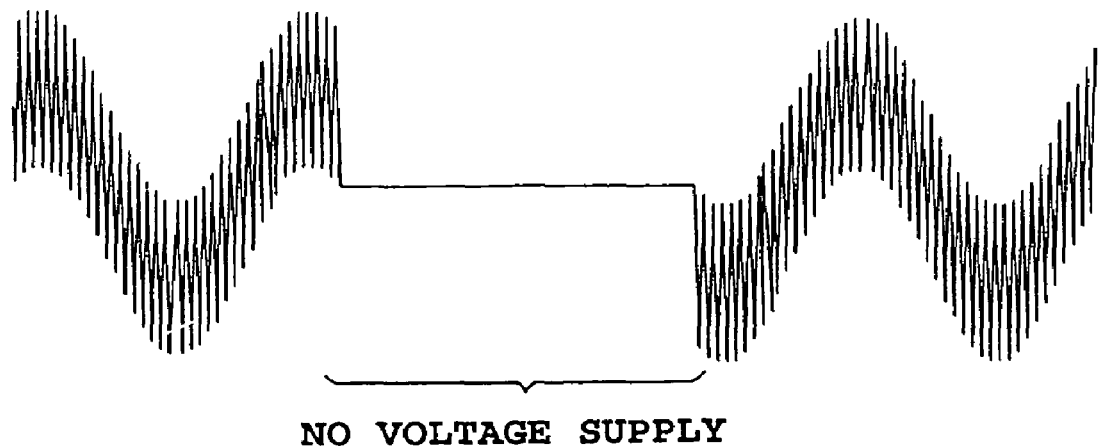
FIGS. 26A and 26B are waveforms of a driving voltage for explaining the third embodiment of the optical device according to the present invention.
Figure 26B:
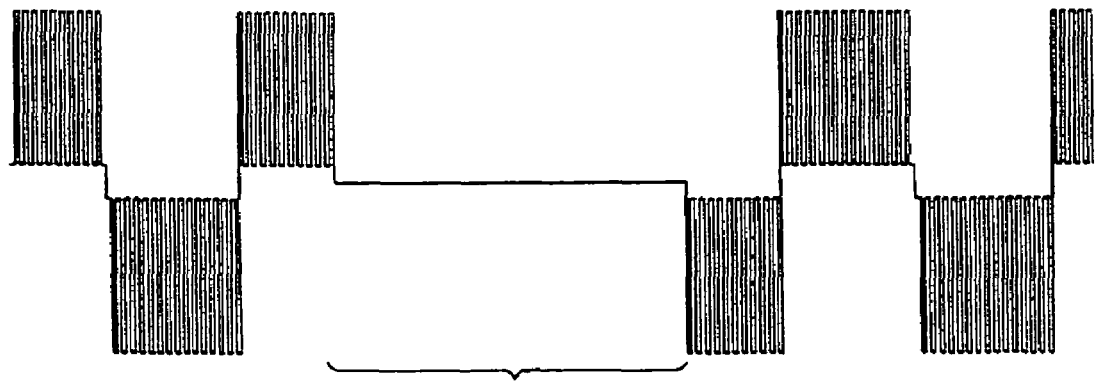

FIG. 26 shows a further modification according to the invention.

An example is given in which two frequencies f31 ($\Delta\epsilon>0$) and f32 ($\Delta\epsilon<0$) are employed, which result in $\Delta\epsilon$ having different signs, and a dual-frequency liquid crystal is used as the variable refractive index material. Further, sine waves are used in one case and rectangular waves are used in the other case.

In this embodiment of the driving method, the voltage having the frequency f31 as the primary frequency and the voltage having the frequency f32 as the primary frequency are applied in a superimposing manner at a certain voltage ratio. In addition, the voltage is temporarily stopped at a certain timing and subsequently resumed.

When the voltage is temporarily stopped, the molecules of the dual-frequency liquid crystal stop at an inclination corresponding to the stopped phase, and maintain the inclined condition until alignment is gradually disturbed by fluctuation due to the anchoring force of the alignment layer or temperature and so forth. A time period elapses before this disturbance of the alignment occurs due to fluctuation due to the anchoring force of the alignment layer or temperature and so forth. It normally takes several seconds or more. Accordingly, by resuming voltage within this period, the disturbance of the alignment can be maintained as small as possible. Furthermore, such small disturbance of the alignment can be corrected by resumption of the voltage supply for a predetermined interval. By driving the liquid crystal in the manner set forth above, it becomes necessary to regularly provide a given refresh time for correcting disturbance, but a high speed variation in the refractive index can be achieved while eliminating the need to constantly apply a voltage.

This driving method is also applicable for the device in which a plurality of cells are arranged in matrix form as shown in FIG. 12. In a driving sequence, at first, (1) after a predetermined interval of refreshing operation (shown in FIGS. 22 and 23), (2) voltage supply to respective cells is stopped at phases respectively corresponding to the desired variation in the refractive indexes of respective cells. Then, after the predetermined interval in each cell, refreshing operation is resumed. By repeating such driving operations, the matrix device 32 formed with a plurality of cells can be driven.

Here, the driving voltage to be applied is not necessarily a sine wave. Needless to say, a rectangular wave or sawtooth wave including the frequencies f31 and f32 as primary frequencies are also applicable. Further, it is also possible to provide a periodic variation in the amplitude. Furthermore, this embodiment employs two frequencies, but a greater number of frequencies may be employed as a matter of course.

Since the electric field is the major factor for causing the variation in the refractive index in the driving method according to this embodiment, it becomes possible to further accelerate at the speed of the variation in the liquid crystal alignment condition by increasing the amplitude of the applied voltage. More specifically, the period of the variation in the refractive index in this driving method can be speeded up, exceeding several ms to several tens ms from several seconds as has been conventional. This speed is obtained when the distance between the transparent electrodes is as wide as several hundreds gm in the arrangement shown in FIG. 21. It is evident that such arrangement permits sufficient speed.

The arrangements shown in FIGS. 13 to 20 as described above may carry out driving operations by applying the driving voltage having the frequency F31 as the primary frequency and the voltage having the frequency F32 as the primary frequency in a superimposed manner at a certain voltage ratio as described with respect to FIGS. 22, 23, and 25. Alternatively, the arrangements shown in FIGS. 13 to 20 as described above may carry out driving operations by applying the driving voltage having the frequency F31 as the primary frequency and the voltage having the frequency F32 as the primary frequency in a superimposed manner at a certain voltage ratio and, further, temporarily stopping supply of the voltage at a certain moment, followed by resuming the supply of the voltage, as descried with respect to Embodiment 13.

(Fourth Embodiment of the Optical Device)

The foregoing discussions relate to the embodiments in which two electrodes for driving the variable refractive index material are both transparent electrodes. However, it is advantageous that one of the electrodes has a mirror surface, in some applications, for example, when an active mirror varying an optical property, such as the focal length, light beam deflection angle and so forth, is required. This mirror may be a half mirror.

Figure 27:
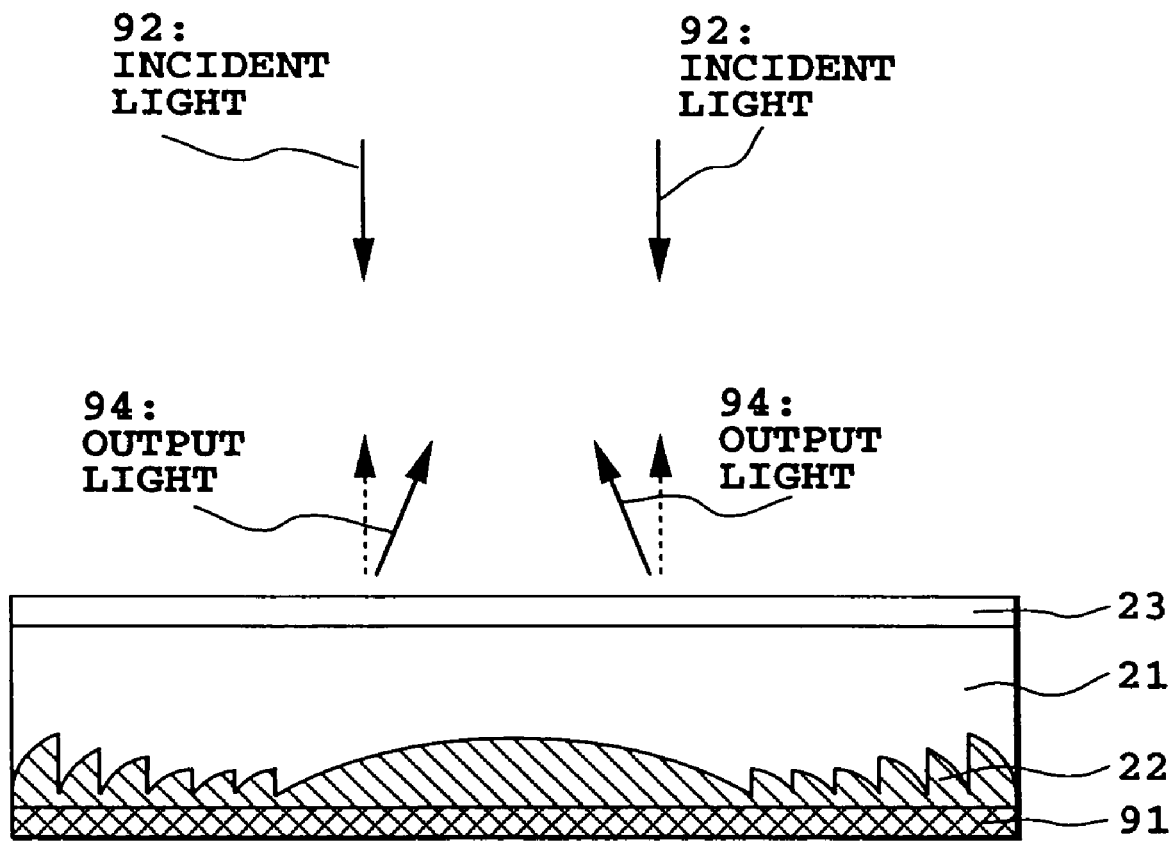
FIG. 27 is an illustration showing the fourth embodiment of the optical device according to the present invention.

FIG. 27 shows one embodiment of the optical device according to the present invention. In the drawing, like components as in FIG. 6 will be identified by like reference numerals. Reference numeral 21 denotes the transparent material layer, 22 denotes a variable refractive index material, 23 denotes the transparent electrode, and 91 denotes an electrode.

The electrode 91 has a mirror surface formed in place of the transparent electrode 24 in the device of FIG. 6. The electrode 91 may be formed of metal, such as an aluminum film, chromium film or the like.

In the arrangement set forth above, when the frequency f11 is applied from a driving device, not shown, the refractive index of the variable refractive index material 22 becomes substantially equal to the refractive index of the transparent material layer 21 as in the first embodiment. Then, an incident light beam 92 incident from the side of the transparent electrode 23 reaches the electrode 91 with no substantial variation, and is reflected therefrom to be outputted from the transparent electrode 23 as an output light beam 93.

On the other hand, when the frequency f12 is applied, the incident light beam is subject to optical effects, such as a lens effect, deflection effect and the like depending upon the variation in the refractive index of the variable refractive index material 22 before reaching the electrode 91, and is reflected back therefrom to be again subject to the similar optical effect to be outputted from the side of the transparent electrode 23 as an output light beam 94.

Thus, in the embodiment of FIG. 18, by varying the refractive index of the variable refractive index material 22, a varifocal mirror or a variable deflection angle mirror can be implemented.

Figure 28:
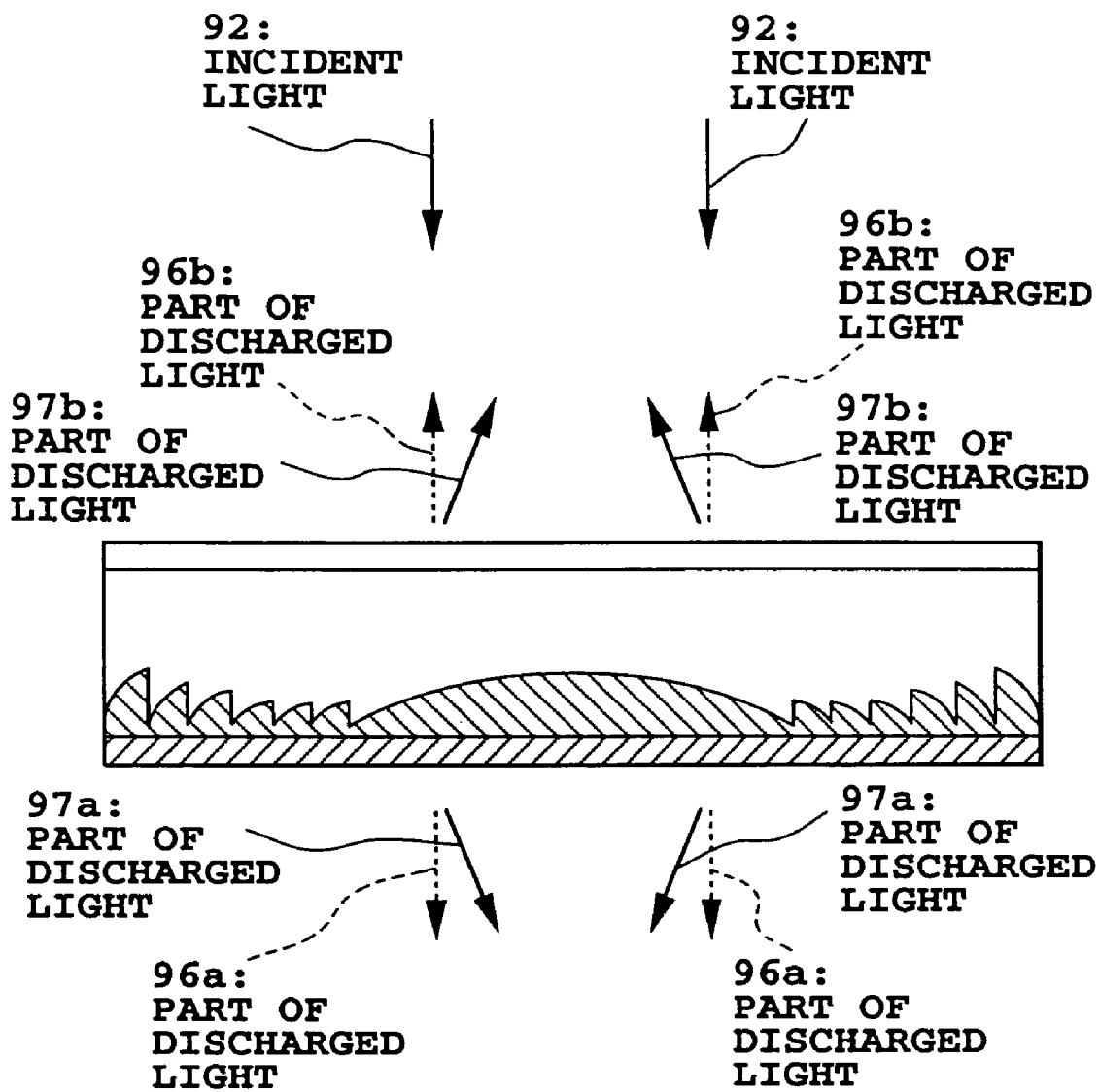
FIG. 28 is an illustration showing a modification of the fourth embodiment of the optical device according to the present invention.

FIG. 28 shows a modification of the optical device. In this embodiment, an electrode 95 formed as a half mirror is used in place of the electrode 91 in the embodiment of FIG. 27. More specifically, the electrode 95 has a laminated layer of an ITO film and a metal thin film, a multi-layer film of a metal thin film and an insulation film and so forth, and passes a part of the incident light beam and reflects the remaining part of the incident light beam.

In the arrangement set forth above, when the frequency f11 is applied from a driving device not shown, the refractive index of the variable refractive index material 22 becomes substantially equal to the refractive index of the transparent material layer 21 as in the first embodiment. Then, the incident light beam 92 incident from the side of the transparent electrode 23 passes through to reach the electrode 95 with no substantial variation. A part of the light beam 95 reaching the electrode 95 passes through the electrode to be outputted as the output light beam 96a, and the remaining part of the light beam 95 is reflected back therefrom to be outputted through the transparent electrode 23 as an output light beam 96b.

On the other hand, when the frequency f12 is applied, the incident light beam is subject to optical effect, such as a lens effect, deflection effect or the like depending upon a variation in the refractive index of the variable refractive index material 22 and reaches the electrode 95. Then, a part of the light beam passes through the electrode 95 to be outputted as an output light beam 97a, and the remaining part of the light beam 95 is reflected back therefrom to be again subject to the similar optical effect to be outputted through the side of the transparent electrode 23 as an output light beam 97b.

Thus, in this modification, by varying the refractive index of the variable refractive index material 22, a varifocal mirror and a variable deflection angle transparent optical device can be achieved simultaneously. Further, when the incident light beam is made incident from the side of the electrode 95, a varifocal lens, a simple mirror and a variable deflection angle transparent optical device can be achieved simultaneously.

Figure 29:
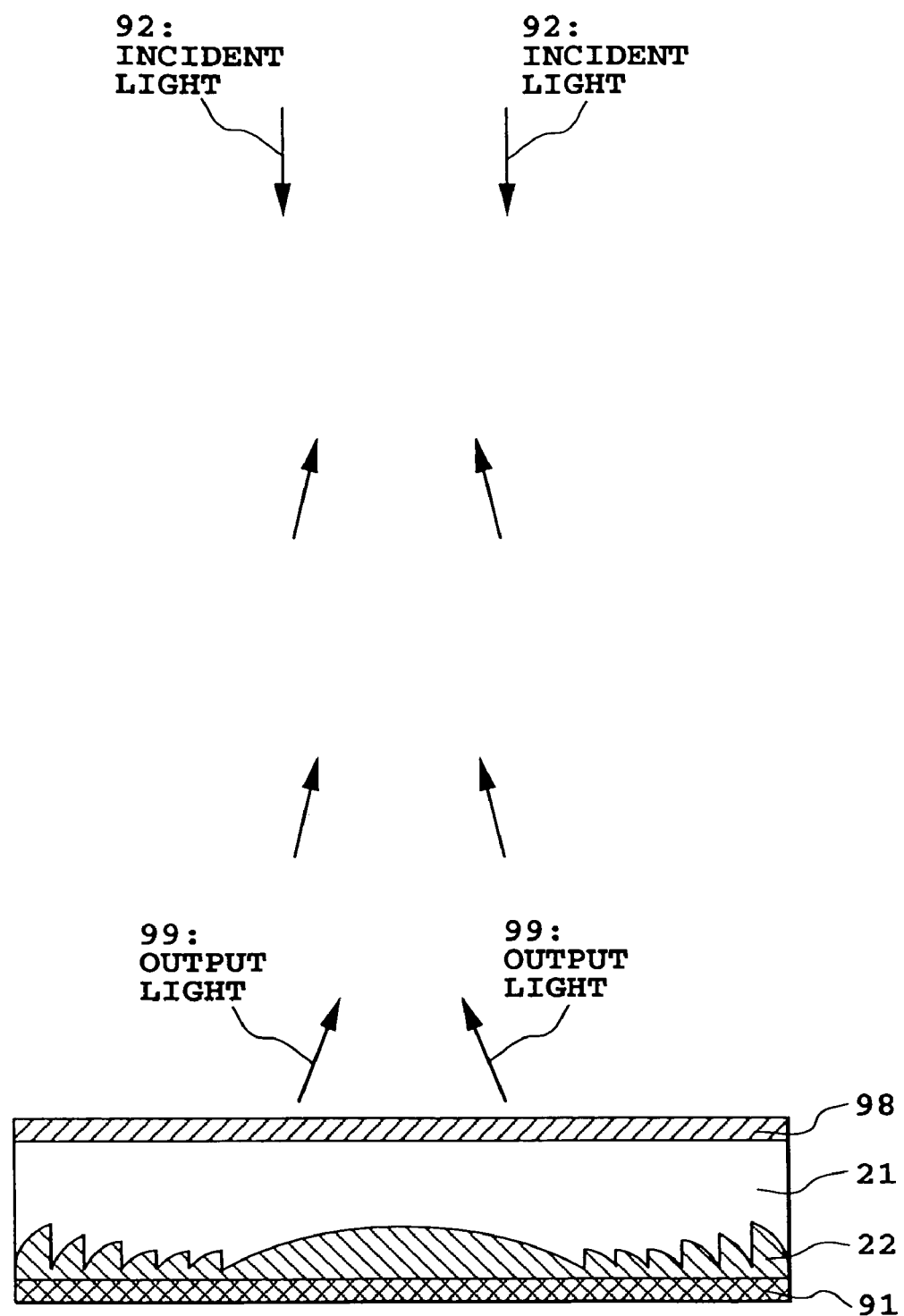
FIG. 29 is an illustration showing another modification of the fourth embodiment of the optical device according to the present invention.

FIG. 29 shows a further modification of the optical device according to the invention. Here, an electrode 98 formed as a half mirror is employed in place of the transparent electrode 23 in the embodiment shown in FIG. 27. More specifically, the electrode 98 has a laminated layer of an ITO film and a metal thin film, a mufti-layer film of a thin metal film and an insulation film and so forth, and passes a part of the incident light beam and reflects a remaining part of the incident light beam, like the electrode 95.

In the arrangement set forth above, when the incident light beam 92 is made incident from the side of the electrode 98, a part of the light beam is reflected back from the electrode 98 and a remaining light beam is made incident through the transparent material layer 21 and the variable refractive index material 22.

At this time, when the frequency f11 is applied from a deriving device not shown, the refractive index of the variable refractive index material 22 becomes substantially equal to the refractive index of the transparent material layer 21 as in the first embodiment. Then, the incident light beam 92 incident from the side of the transparent electrode 23 passes through and reaches the electrode 91 with no substantial change, and is reflected back therefrom to reach the electrode 98 again. Then, a part of the reflected light beam is again reflected back from the electrode and the remaining light beam is outputted. The same process is repeated. However, in this case, since the light beam is subject to no optical effect, the output light beam 92 becomes merely a reflected light beam.

On the other hand, when the frequency f12 is applied, the incident light beam is subject to an optical effect, such as a lens effect, deflection effect or the like depending upon a variation in the refractive index of the variable refractive index material 22 and reaches the electrode 91, and is reflected back therefrom. The reflected light beam is again subject to a similar optical effect and reaches the electrode 98. Then, a part of the reflected light beam is reflected back and the remaining is outputted therethrough. The foregoing process is repeated. Whenever the process is repeated, the reflected light beam is subject to the same optical effect. Therefore, the optical effect becomes greater as the number of repetitions becomes greater. Thus, the output light beam 99 subjected to the greater optical effect is outputted.

Thus, in this modification, by varying the refractive index of the variable refractive index material 22, it becomes possible to provide a lens having a plurality of focal points and variable focal points, optical devices having a plurality of deflection angles and variable deflection angles, or the like. At this time, the number of the focal points and the deflection angles to be achieved simultaneously can be substantially determined by adjusting the ratio of passing to reflecting of the electrode 98.

(Another Driving Method for the Optical Device)

In the optical device shown in FIG. 6, with an increase of the frequency of the voltage applied to the electrodes 23 and 24 (the frequency thereof being sufficiently higher than a frequency corresponding to the response speed of the molecules of the liquid crystal, i.e. the frequency to which the molecules of the liquid crystal cannot respond, e.g. several Hz to several tens Hz), the voltage reaches a level VA at which Frederick transition takes place. At a voltage higher than or equal to VA, the molecules of the liquid crystal begin to be aligned in a perpendicular direction from the orientation in parallel to the electrode due to the dielectric constant anisotropy of the molecules of the liquid crystal. By further increasing the applied voltage, the molecules of the liquid crystal are statistically aligned in a perpendicular direction to the electrode (such given voltage is defined as VT).

Conventionally, since the liquid crystal layer is driven by varying the voltage between the voltage VT and a voltage lower than or equal to VA (normally 0V), the driving speed cannot be increased. In contrast, the driving method according to this embodiment can drive the liquid crystal layer 22 at an increased speed by applying a voltage higher than or equal to the voltage VT.

When such high voltage is applied, the liquid crystal becomes statistically unstable to cause electrofluid dynamic motion. Because of this, the molecules of the liquid crystal effectively sway between an orientation perpendicular to the electrode and an orientation slightly inclined from the perpendicular position. Such sway motions are made in synchronism with an interval of an applied voltage including alternating current. It should be noted that the liquid crystal as a whole has a poor polarizing ability, so that there is a small difference in swaying motion due to the polarity of the voltage. Therefore, the frequency of the motion of the liquid crystal becomes twice the applied voltage. Further, the magnitude of the swaying motion becomes greater in proportion with an increase of the amplitude of the applied voltage. Furthermore, the relaxation time becomes significantly shorter than the static relaxation time. Therefore, the refractive index of the liquid crystal layer 22 can be varied at a frequency twice the applied voltage in synchronism therewith, thus enabling speeding up.

As set forth above, with this embodiment, the optical property (such as a focal length and so forth) can be varied at a high speed periodically in synchronism with the applied voltage.

Further, in this embodiment, as set forth above, since electrofluid dynamic motion can be increased by increasing the applied voltage, the effective response speed can be advantageously increased. Therefore, in this embodiment, in comparison with the prior art, a higher speed operation can be achieved.

This driving method will be discussed in detail with reference to the drawing.

Figure 30:
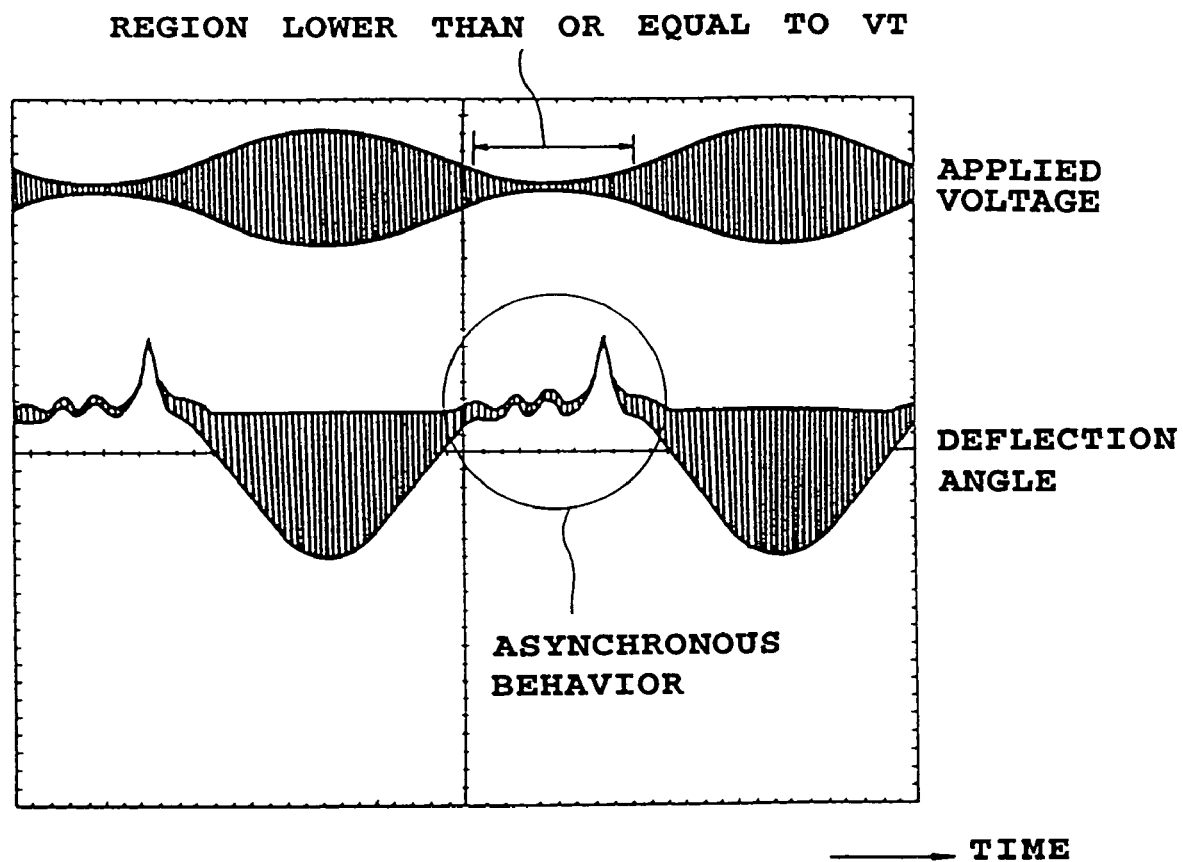
FIG. 30 is a chart showing the relationship between the driving voltage for the optical device and the deflection angle.

FIG. 30 shows the behavior of the deflection angle when the amplitude of the envelope of the voltage is varied between a value that is higher than or equal to VT and a value that is lower than or equal to VT, e.g. about 0V as in the prior art. As one example, as the applied voltage, a sine wave having a frequency of 30 Hz was used. The amplitude was varied in a sine-wave-like pattern. In the drawing, the behavior of the deflection angle due to the variation in the amplitude of the applied voltage is illustrated in an-envelop-like representation (i.e. fine periodic motion of the applied voltage and the deflection angle are represented by densely drawn lines).

When the liquid crystal is driven such that the amplitude of the envelope of the voltage is lower than VT (approximately 0V) as in the prior art, there is a problem that in the vicinity of the region where the amplitude of the voltage is small, the deflection angle has asynchronous behavior which is clearly different from the period of the applied voltage. In the region showing asynchronous behavior, the light beam is significantly diverted to make it difficult to definitely determine the deflection angle.

Figure 31:
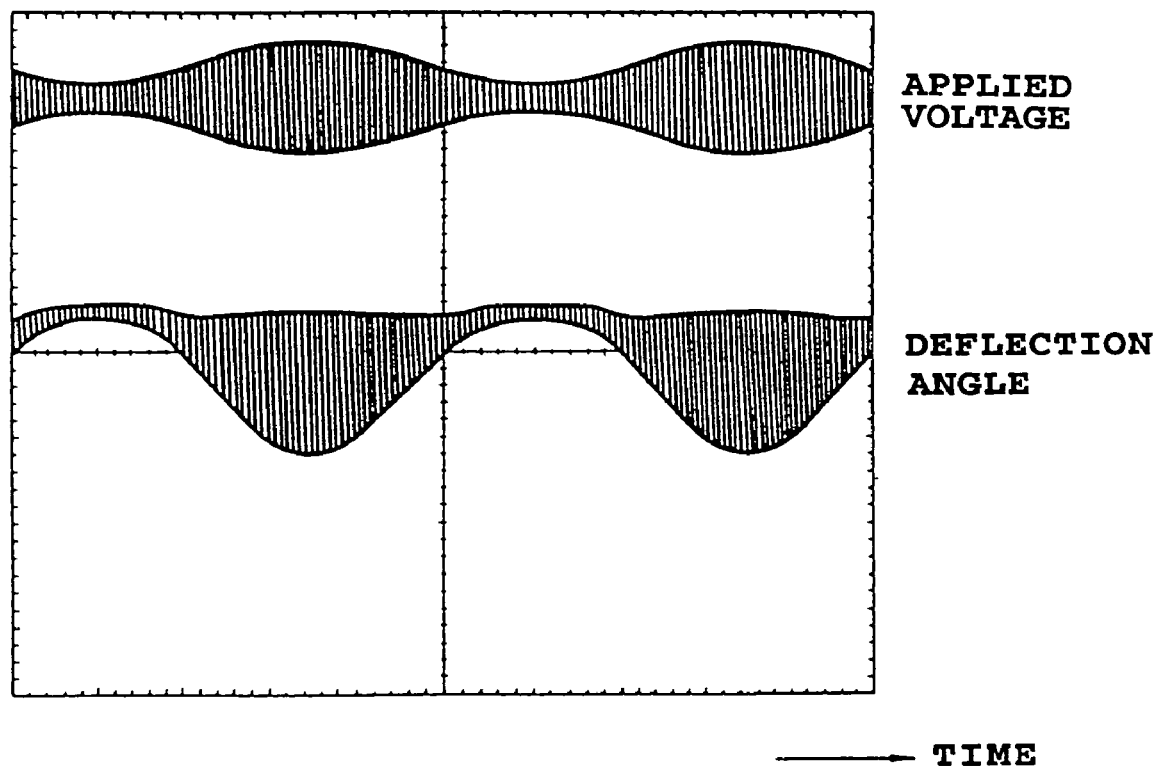
FIG. 31 is a chart illustrating the relationship between the applied voltage and the deflection angle for explaining another driving method of the optical device according to the present invention.
Figure 32A:
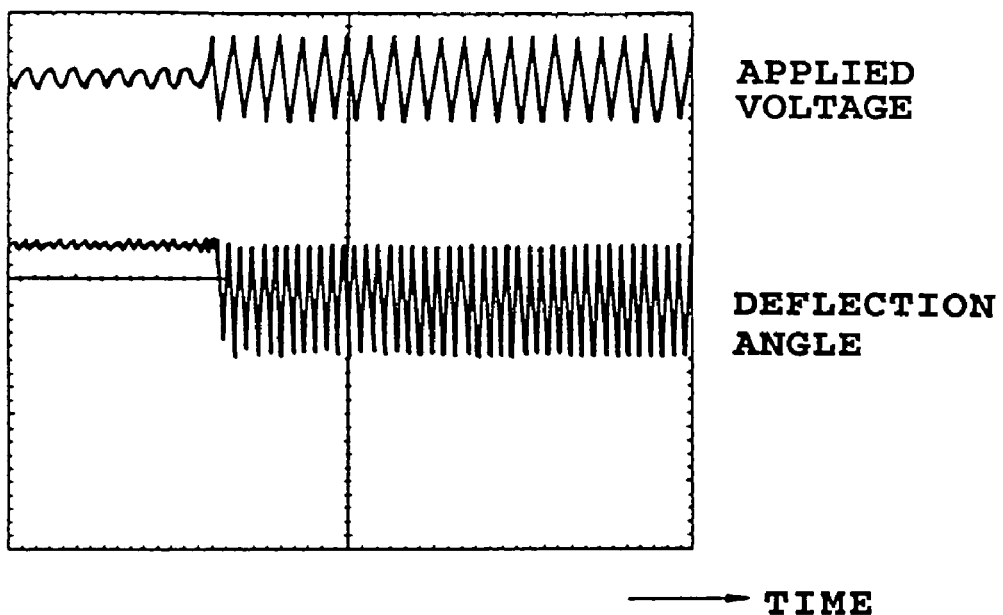
FIGS. 32A and 32B are charts illustrating a detailed relationship between the applied voltage and the deflection angle of FIG. 31.
Figure 32B:
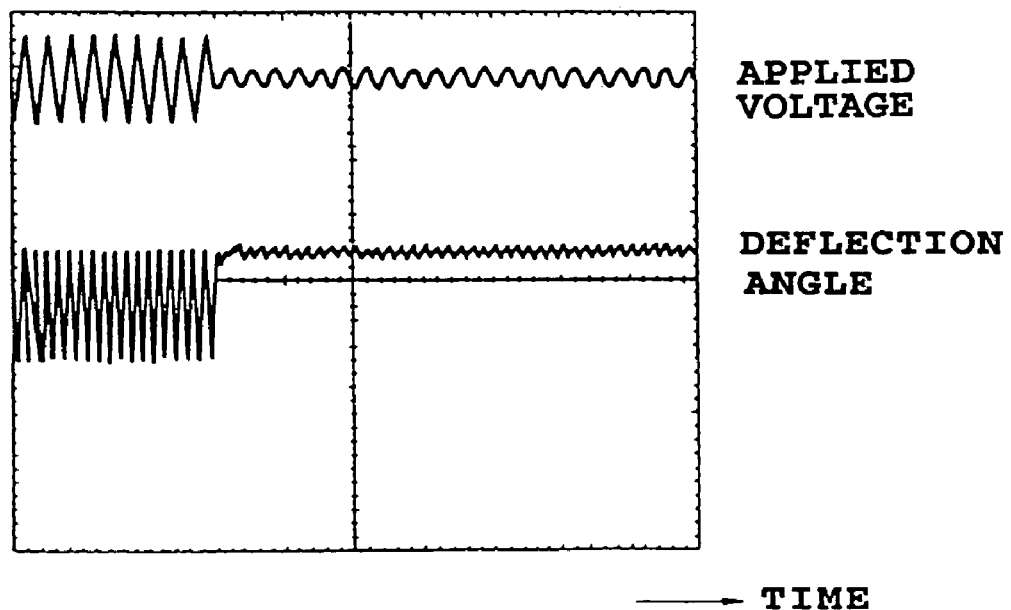
Figure 33:
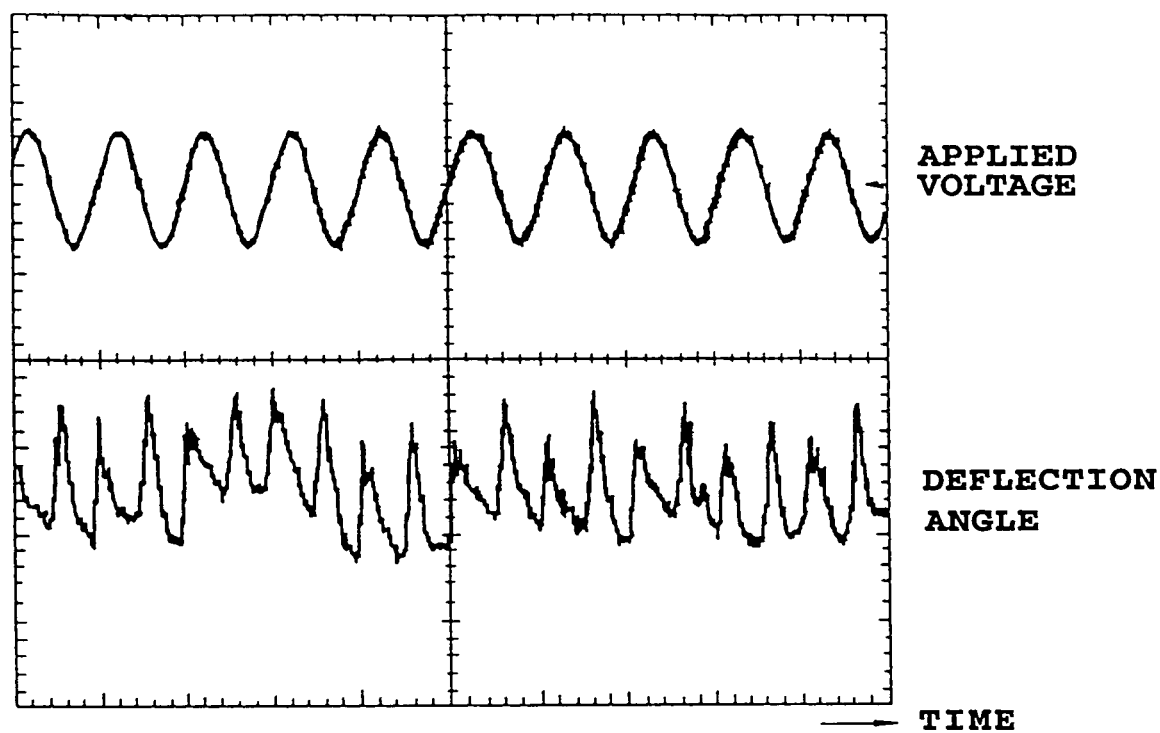
FIGS. 33 to 37 are charts illustrating other relationships between the applied voltage and the deflection angle.
Figure 34:
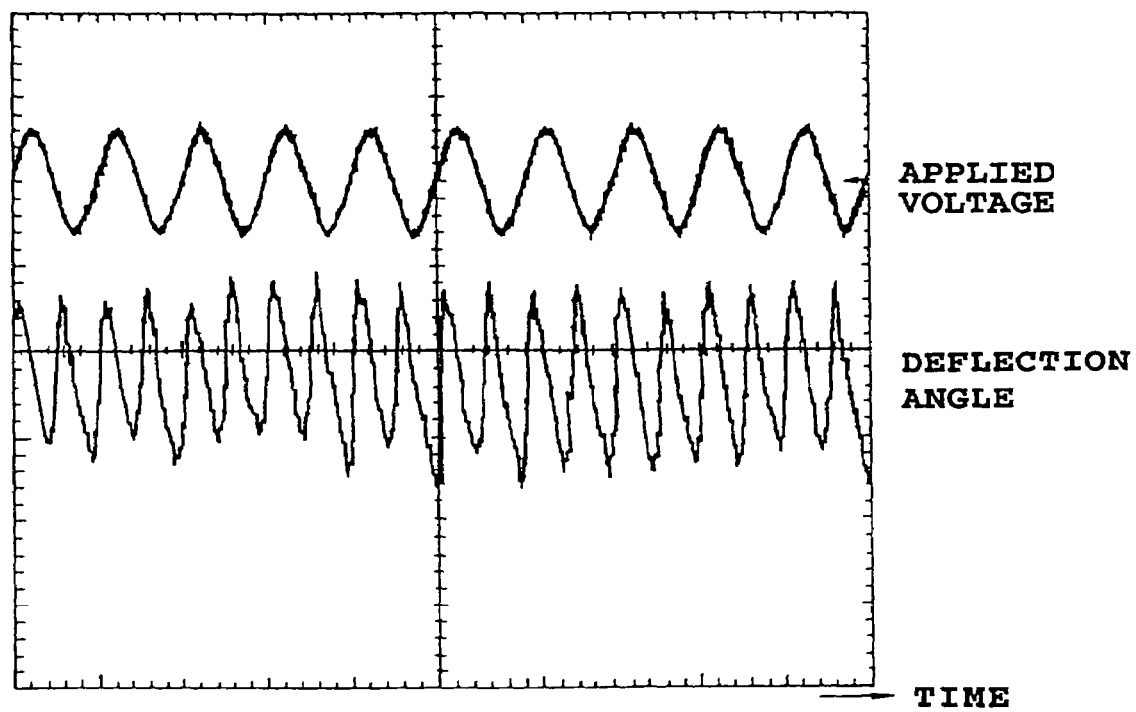
Figure 35:
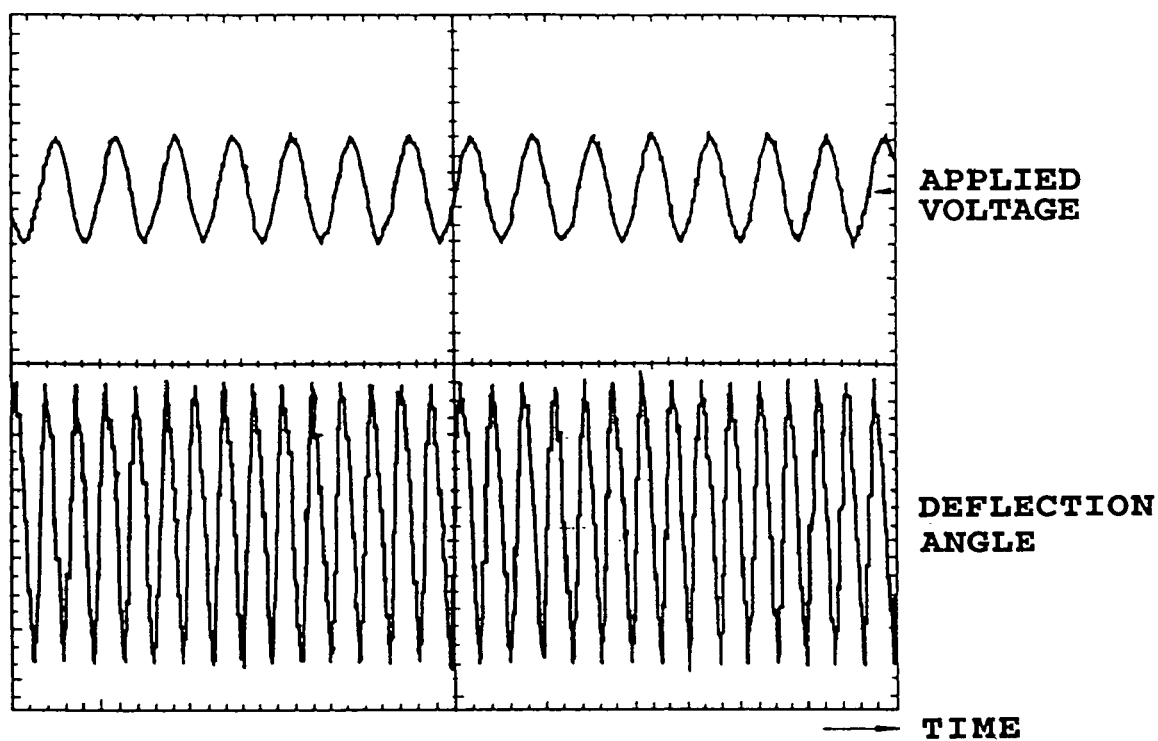
Figure 36:
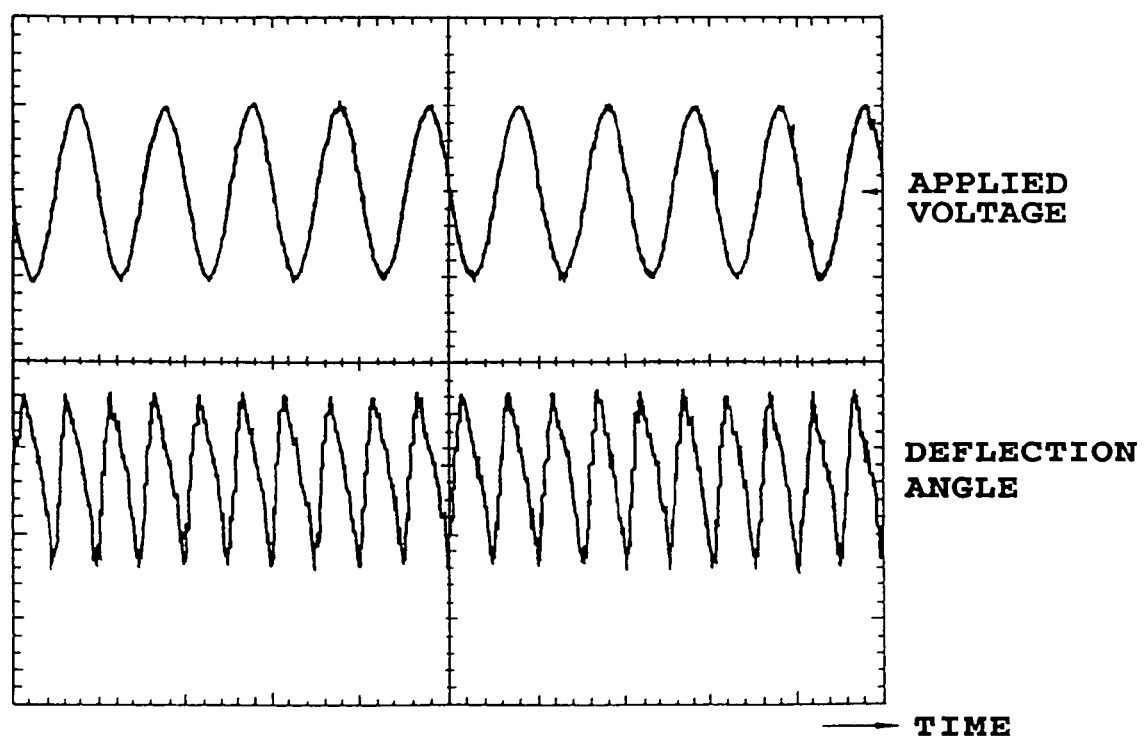

On the other hand, FIGS. 31 and 32 show the behavior of the deflection angle in the case where the envelope of the applied voltage is varied at a voltage amplitude greater than or equal to VT as set forth above. FIG. 31 is illustrated in an envelope-like representation as in FIG. 30, and FIG. 32 shows the detailed correspondence between the applied voltage and the deflection angle. Further, the applied voltage was in the form of a sine wave having a frequency of 30 Hz, and its amplitude was varied in a-sine-wave-like pattern.

As is clear from FIG. 32; by varying the amplitude of the voltage at the voltage higher than or equal to Vt, it can be appreciated that the deflection angle can be varied at a frequency twice the frequency of the applied voltage in synchronism with a period of the applied voltage. In the region where the voltage is higher than or equal to VT, even a stepwise abrupt variation in the amplitude causes no disturbance in the deflection angle substantially, following the variation of the amplitude in synchronous fashion. Further, from FIG. 31, it is appreciated that the magnitude of the periodic variation in the deflection angle is variable depending upon the amplitude of the applied voltage, and no asynchronous behavior is included. Furthermore, when the amplitude of the voltage higher than or equal to VT is varied as discussed previously, diverting of the light beam can be constantly suppressed to be low.

As set forth above, with this embodiment, high-speed response can be achieved.

FIGS. 33 to 37 show other embodiments of this driving method. The behavior of an optical property (e.g. deflection angle) of the optical device according to the present invention depending upon the frequency of the applied voltage (amplitude >VT) will be discussed. It should be noted that, as an example of the applied voltage, a sine wave is employed. FIGS. 33 to 36 respectively illustrate the behavior of the deflection angle at the frequencies of the applied voltage of 0.5 Hz, 1 Hz, 3 Hz and 100 Hz.

The deflection angle shows a synchronous response even at a low frequency, i.e. 0.5 Hz, but the waveform of the deflection angle is not constant and is disturbed. The variation in the average value in one period is large. Thus, the waveform is disturbed as a whole. Furthermore, in this case, a large light beam diverting is caused. In contrast, in the case of 1 Hz, the disturbance of each waveform is not so large as in the case of 0.5 Hz, and the variation of the average value in one period becomes smaller. In the case of 3 Hz, the disturbance becomes further smaller. In addition, in the case of 1 Hz and 3 Hz, diverting of the light beam observed in the case of 0.5 Hz, becomes extremely small. Furthermore, at a further higher frequency, such as 100 Hz, a neat response waveform with quite small disturbance and scattering can be obtained. Therefore, in order to restrict disturbance of the deflection angle and scattering of the light beam, it is desirable to set the frequency of the applied voltage to be higher than or equal to 1 Hz.

Figure 37:
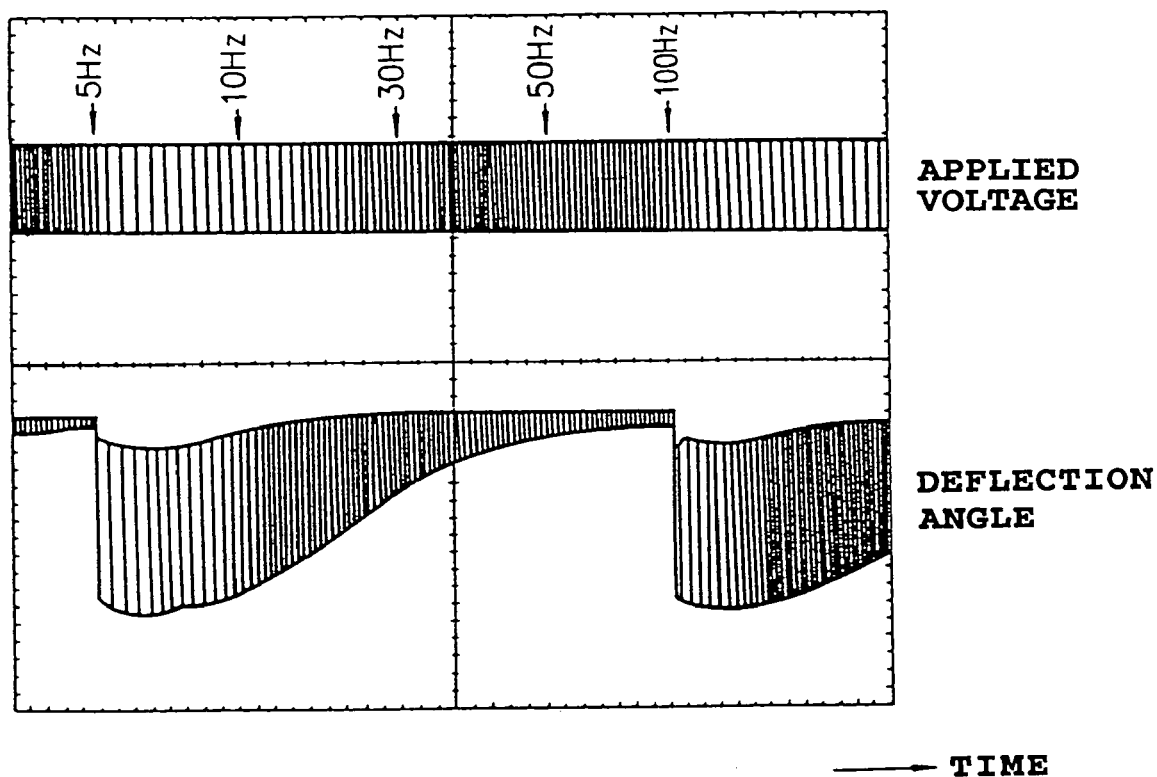

FIG. 37 illustrates the behavior of the deflection angle when the frequency of the applied voltage is varied in a range of 5 Hz to 100 Hz. (It should be noted that, similarly to FIGS. 30 and 31, fine periodic motion of the applied voltage and the deflection angle is represented by densely drawn lines). The deflection angle shows a substantially similar magnitude of variation at the frequency of the applied voltage up to about 10 Hz. When the frequency becomes higher than 10 Hz, the magnitude is gradually reduced according to the increase in frequency of the applied voltage and becomes quite small at a frequency of about 100 Hz. Accordingly, from the viewpoint of ensuring the magnitude of variation in the deflection angle, it is desirable to maintain the frequency of the applied voltage to be lower than or equal to 100 Hz. Therefore, the frequency of the applied voltage according to the present invention is practical in a range of 1 Hz to 100 Hz.

It should be noted that, although in this embodiment, a sine wave is used as the applied voltage, a similar effect can be produced even in the case of a rectangular wave, a triangular wave or other periodic waves.

The above described driving method is applicable to any of the optical devices discussed above.

(Three-Dimensional Display Device Employing Optical Device)

A three-dimensional display device employing the aforementioned optical device will now be discussed.

Figure 38:
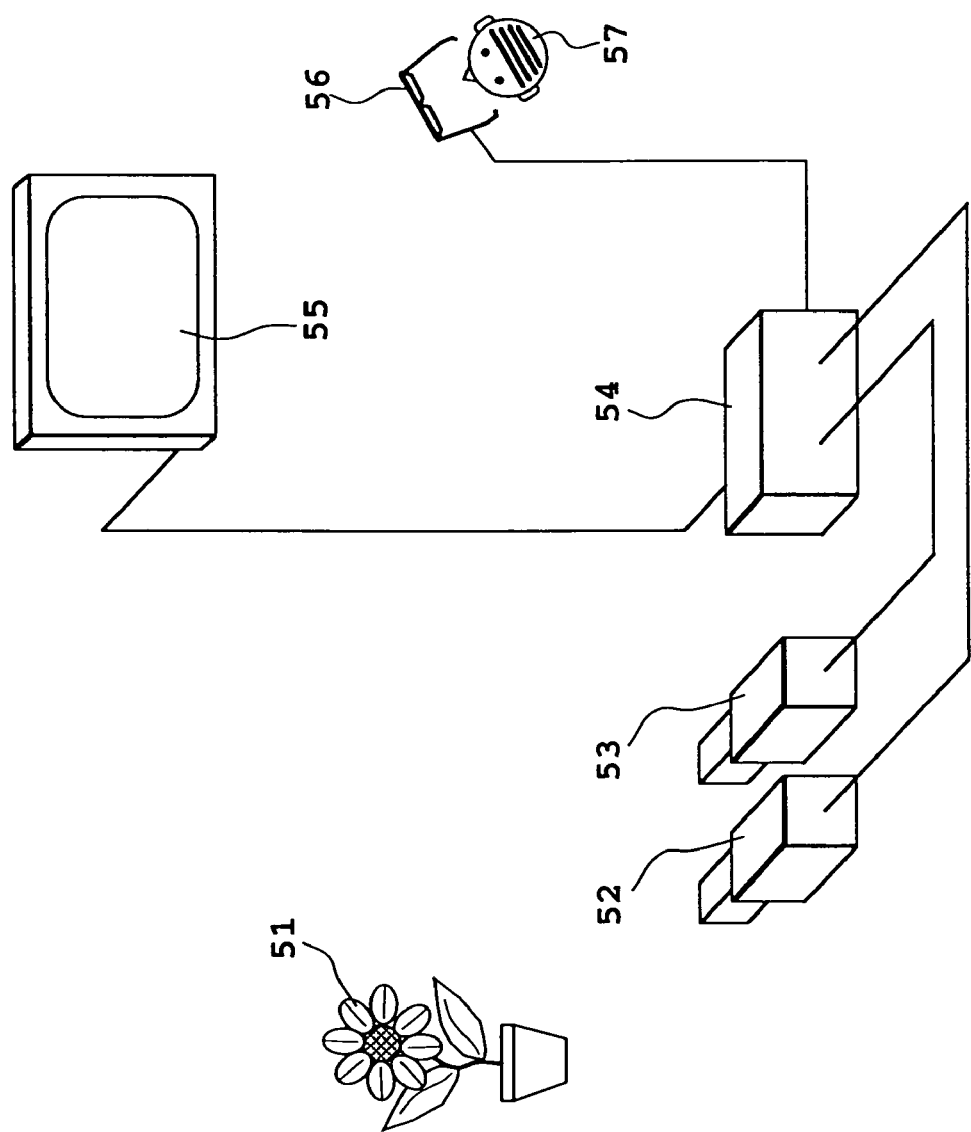
FIG. 38 is a block diagram schematically showing the construction of a three-dimensional display device employing conventional liquid crystal shutter eyeglasses.

At first, a conventional three-dimensional display device will be explained. There has been known a conventional three-dimensional display device, employing liquid crystal shutter eyeglasses as shown in FIG. 38. In the device shown in FIG. 38, at first, in order to obtain a so-called binocular disparity image by picking up images of a three-dimensional object 51 in different directions, the image of the three-dimensional object 51 is picked up by two cameras 52 and 53 positioned at a predetermined interval.

Then, two-dimensional images picked up by the respective cameras 52 and 53 are synthesized by an image signal conversion device 54 so that the two-dimensional images picked up by the cameras 52 and 53 are arranged alternately per each field.

The image signal conversion device 54 displays the synthesized two-dimensional images on a CRT display device 55, and drives a liquid crystal shutter on the left side of an observer 57 in liquid crystal shutter eyeglasses 56 to be transparent and the liquid crystal shutter on the right side to be not transparent when the two-dimensional image picked up by the camera 52 is displayed.

On the other hand, when the image signal conversion device 54 displays the two-dimensional image picked up by the camera 53 on the CRT display device SS, the image signal conversion device 54 drives a liquid crystal shutter on the right side of the observer 57 in the liquid crystal shutter eyeglasses 56 to be transparent and the liquid crystal shutter on the left side to be not transparent.

By repeating the operation set forth above, by the after image effect of the eye, the observer 57 feels as if he or she is simultaneously looking at the binocular disparity images with both eyes, to realize a three-dimensional view by binocular disparity.

Figure 39:
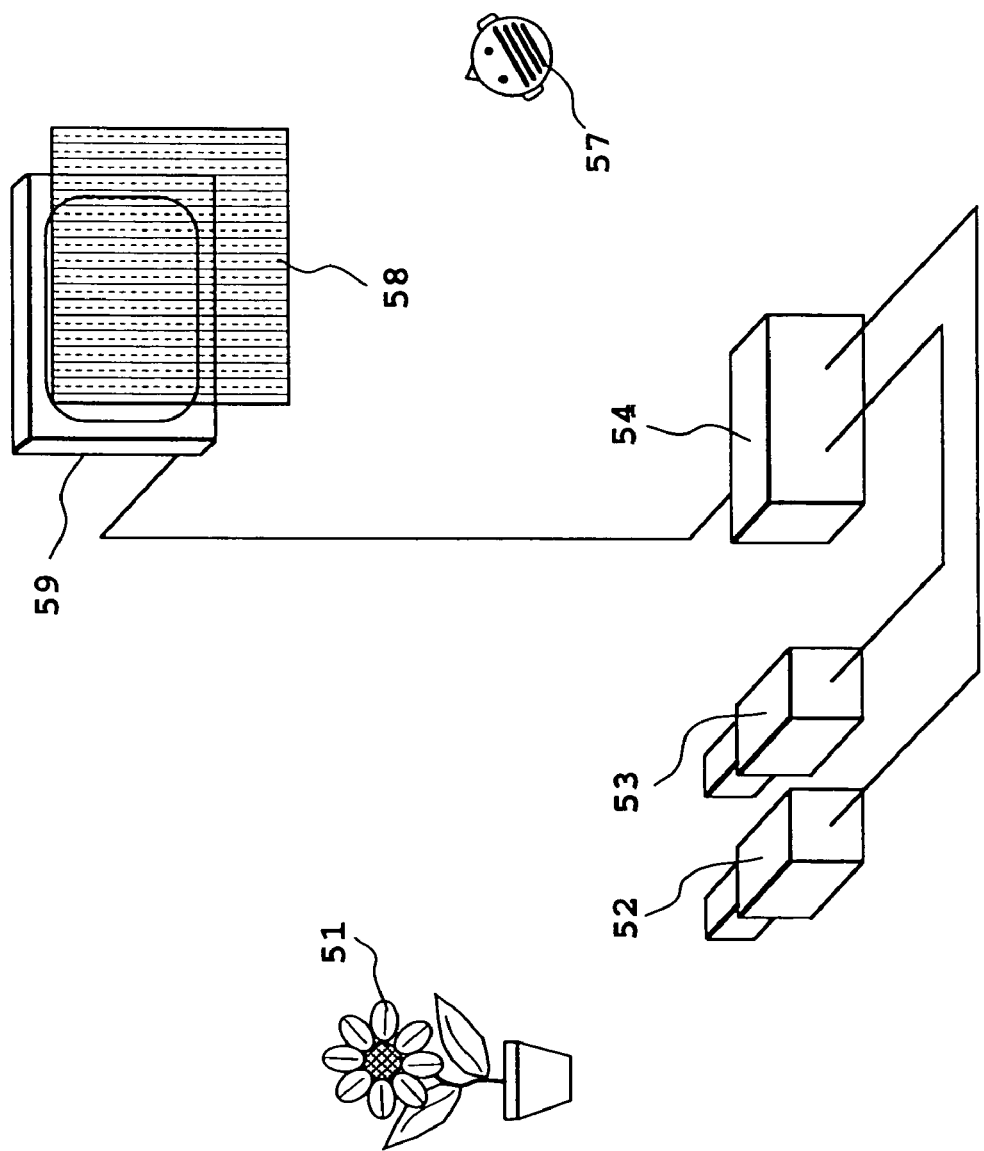
FIG. 39 is a block diagram schematically showing the construction of a three-dimensional display device employing a conventional lenticular lens sheet.

There has been known a three-dimensional display device not employing eyeglasses or the like, but a known lenticular lens sheet as shown in FIG. 39.

In this device, similarly to the device employing the liquid crystal shutter eyeglasses, at first, the binocular disparity images of the three-dimensional object 51 are picked up by the cameras 52 and 53.

Next, respectively the image signal conversion device 54 synthesizes the two two-dimensional images picked up by the cameras 52 and 53, to form a two-dimensional image in which pixels are arranged alternately in a horizontal direction.

The image signal conversion device 54 displays the synthesized two-dimensional image on a matrix type two-dimensional display device 59, typified by a liquid crystal display device.

At this time, the lenticular lens sheet 58 is closely fitted to the screen of the two-dimensional display device 59. Consequently, since the lenticular lens sheet 58 has directivity, the observer can perceive, by his left and right eyes only pixels of the two-dimensional images picked up respectively by the cameras 52 and 53 according to the position of the observer 57.

Accordingly, the binocular disparity images picked up at a predetermined interval can be seen by both eyes of the observer 57, respectively, to thus form a three-dimensional image by the effect of binocular disparity.

For example, holography is known, and can be employed to provide a three-dimensional display device capable of forming a more natural three-dimensional image.

In holography, interference fringes are picked up when an object light beam (a transmitted or reflected light beam produced by irradiating the three-dimensional object 51 with light from a coherent light source) and a reference light beam radiated from the light source intersect at a predetermined angle.

In the case of reproduction of a three-dimensional image, the picked-up interference fringe is read out by a light beam having a wavelength equal to that of the light beam used in picking up, to thus obtain a three-dimensional image of the three-dimensional object 51.

In the conventional three-dimensional display device employing the liquid crystal shutter eyeglasses, it is constantly required to wear the liquid crystal shutter eyeglasses. In the case of communication such as television conferences, it becomes difficult to see the faces of attendants and this gives an give awkward feeling.

In case of the three-dimensional display device employing the lenticular lens sheet, the range where the binocular disparity images can be viewed by both eyes of the observer is quite limited. Therefore, the observer cannot freely select the position relative to the two-dimensional display device 59.

Moreover, since the range to be observed is narrow, a plurality of people cannot observe the range at one time.

Furthermore, in the three-dimensional display device employing the liquid crystal shutter eyeglasses and the three-dimensional display device employing the lenticular lens sheet, the eye of the observer is accommodated on the screen of the display device, and the accommodation is not varied according to the images to be displayed.

This may cause discrepancy between the convergence perceived by the observer 57 and the accommodated position of the eye, thus inducing asthenopia.

Further, the two-dimensional image displayed on the display device is fixed at the visual positions which are, in turn, determined by the positions of the cameras 52 and 53. Therefore, it is not possible to express the movement. Even when the observer 57 moves, the image displayed on the display device looks to move together with the observer. This gives the observer a sense of incompatibility.

In the three-dimensional display device employing holography, a coherent light beam such as a laser beam is required in picking-up the three-dimensional object. Further, the information amount to be obtained becomes huge to make it impossible to process the information of a moving picture at a real time.

According to the present invention, a three-dimensional display device employing the aforementioned optical device can solve the problems described above. Consequently, an object of the three-dimensional display according to the present invention is to satisfy the binocular disparity, convergence and accommodation and movement parallax as visual cues to depth perception in three-dimensional views without employing eyeglasses or the like, and to achieve moving picture displaying which can be re-written electrically.

Further, it is another object of the present invention to provide a driving method for driving the three-dimensional display device which can satisfy the binocular disparity, convergence and accommodation and movement parallax as visual cues to depth perception in three-dimensional view without employing the eyeglasses or the like, and can achieve moving picture displaying which can be re-written electrically.

Preferred embodiments of the three-dimensional display device according to the present invention will be described hereinafter in detail with reference to the accompanying drawings.

Like molecules or corresponding parts having like functions will be designated by the same reference numerals throughout the all figures illustrating the three-dimensional display device according to the present invention.

(First Embodiment of Three-Dimensional Display Device)

Figure 40:
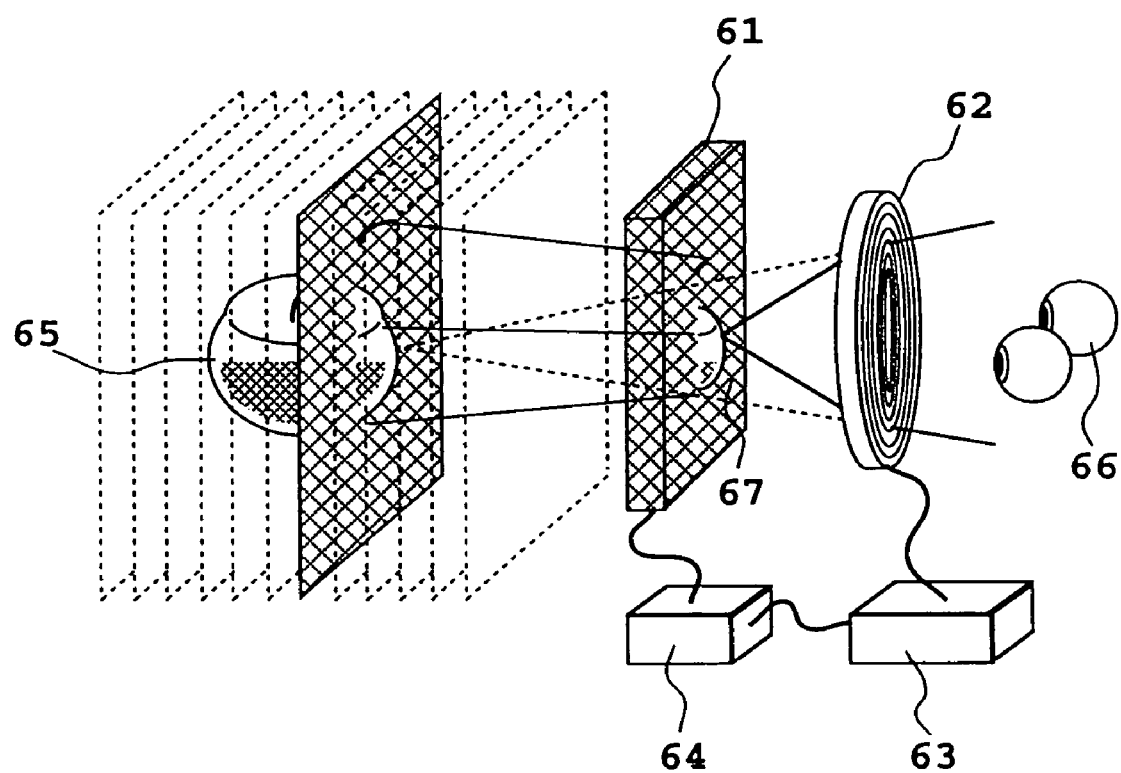
FIG. 40 is a block diagram schematically showing the construction of a first embodiment of a three-dimensional display device according to the present invention.

FIG. 40 is a block diagram illustrating a schematic construction of the first embodiment of a three-dimensional display device according to the present invention. In FIG. 40, reference numeral 61 denotes a two-dimensional display device; 62, a varifocal lens; 63, a driving device; 64, a synchronization device; 65, a three-dimensional image; 66, an observer; and 67, a two-dimensional image.

In FIG. 40, the two-dimensional display device 61 is well known as a CRT (Cathode Ray Tube), a liquid crystal display, an LED display, plasma display, a projector type display, a vector-scanning type display or the like. The varifocal lens 62 is the optical device as set forth above.

The two-dimensional display device 61 is arranged inside of the focal length of the varifocal lens 62, namely at the position closer to the varifocal lens 62 than the focal length.

The varifocal lens 62 is interposed between the two-dimensional display device 61 and the observer 66, to vary the focal length at a predetermined speed according to an output from the driving device 63, described later.

The driving device 63 is a known signal generator having a predetermined duty ratio and a predetermined period and outputting driving signals of frequencies f12 and f22 having the same amplitude.

Although this embodiment employs the driving signals of frequencies f12 and 22 having the same amplitude as outputs from the driving device 63, it is may employ signals of frequencies having various amplitudes.

The synchronization device 64 is adapted to synchronize the focal position of the varifocal lens 62 and the two-dimensional image displayed on the two-dimensional display device 61. For example, the synchronization device 64 generates a synchronization signal after a lapse of a delay period until the focal length of the varifocal lens 62 is varied on the basis from the output from the driving device.

The three-dimensional image 65 is used for explaining the image to be viewed by the observer 66 in the case where the first embodiment of the three-dimensional display device is employed. In this embodiment, the image is displayed as a virtual image.

Eyes of the observer 66 represents a view position of the observer 66. The two-dimensional image 67 represents an image to be displayed on the two-dimensional display device 61, which is generated by decomposing the three-dimensional image into the two-dimensional image represented on a plane at predetermined intervals according to procedures described later. Namely, the two-dimensional image 67 are a depth sampled image.

Figure 41:
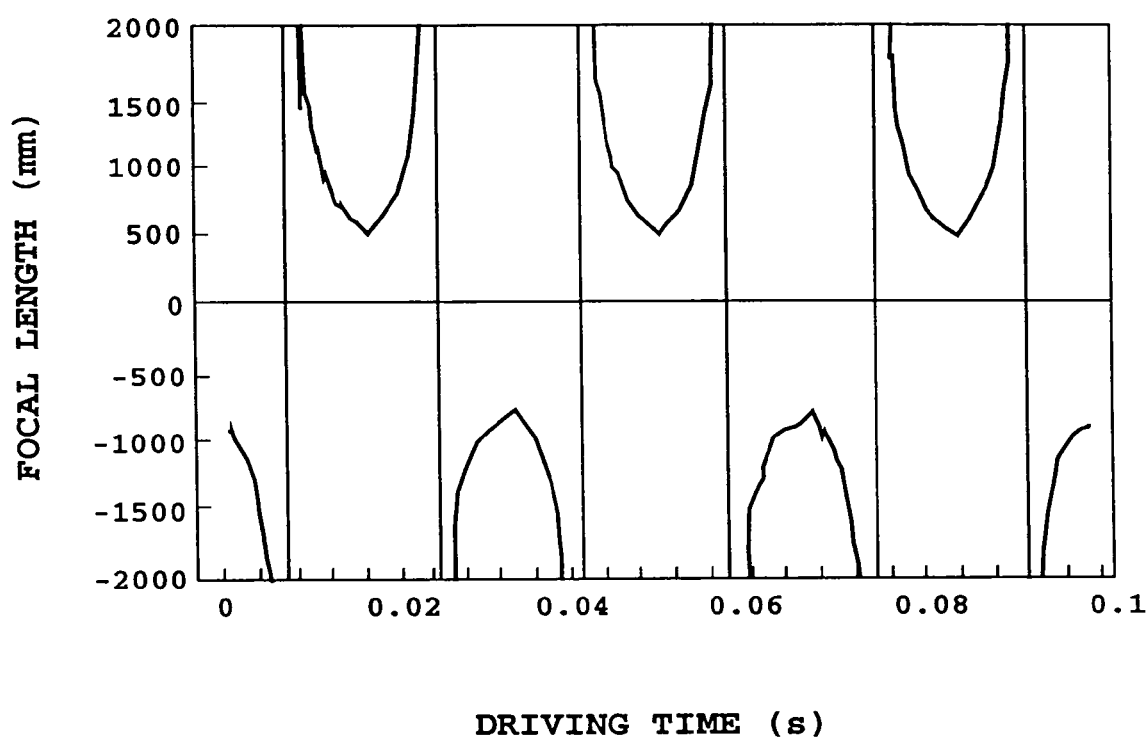
FIG. 41 is a graph illustrating how focal length varies when a varifocal lens is driven by the driving device of the first embodiment of the three-dimensional display device according to the present invention.

FIG. 41 graphically shows a state of variation of the focal length when the varifocal lens is driven by the driving device in the first embodiment. In FIG. 41, the horizontal axis represents a driving time and the vertical axis represents a focal length.

It should be noted that the waveform of the driving signal is rectangular, as shown in FIG. 813, in which a low frequency f21 ($\Delta\in >0$) and a high frequency f22 ($\Delta\in 1<0$) are used. The refractive index of the dual-frequency liquid crystal (variable refractive index material) becomes smaller than the refractive index of the transparent material when the dual-frequency liquid crystal is erected perpendicularly to the transparent electrodes 23 and 24. On the other hand, when the dual-frequency liquid crystal is disposed substantially in parallel to the transparent electrodes 23 and 24, the refractive index of the dual-frequency liquid crystal becomes greater than that of the transparent material.

As a result, it is obvious from FIG. 41 that the focal length of the varifocal lens 12 is varied in an analogous sequential manner. The repetition frequency of the low frequency f12 and the high frequency f22 is substantially 30 Hz.

Accordingly, remarkably high speed operation can be achieved, by employing the varifocal lens in the above-described optical device, in comparison with the conventional liquid crystal lens which takes several seconds for resumption.

The operation of the first embodiment of the three-dimensional display device will be discussed with reference to FIGS. 42A and 42B.

Figure 42A:
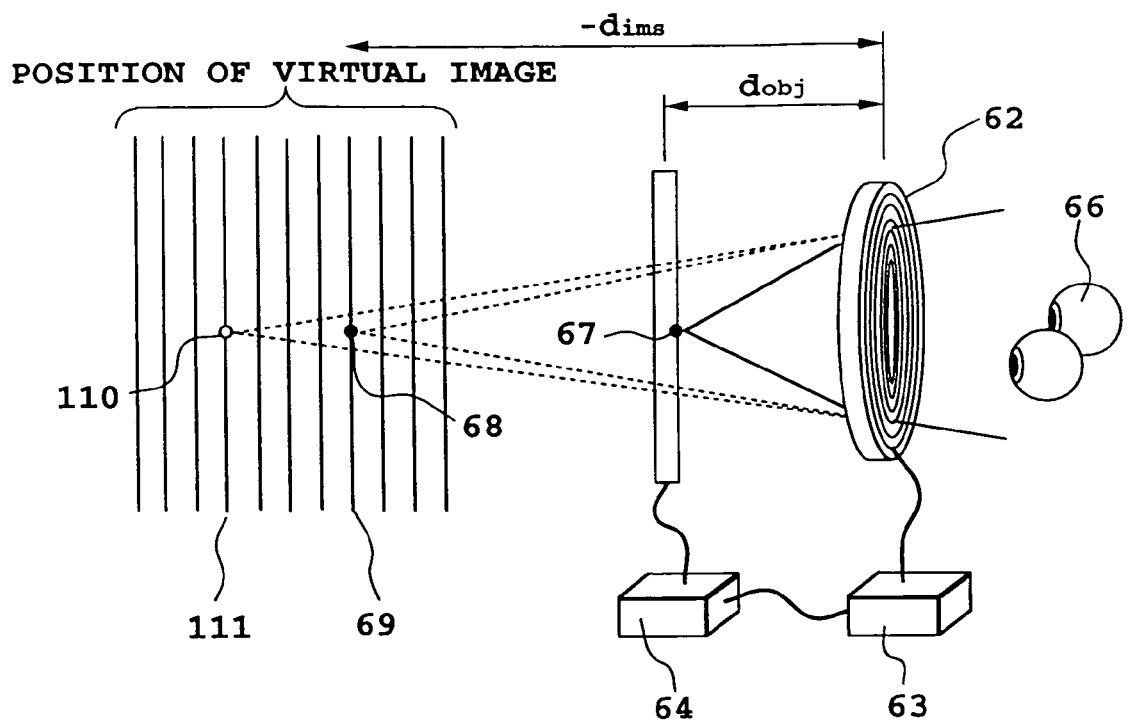
FIGS. 42A and 42B are views for explaining the operation of the first embodiment of the three-dimensional display device.
Figure 42B:
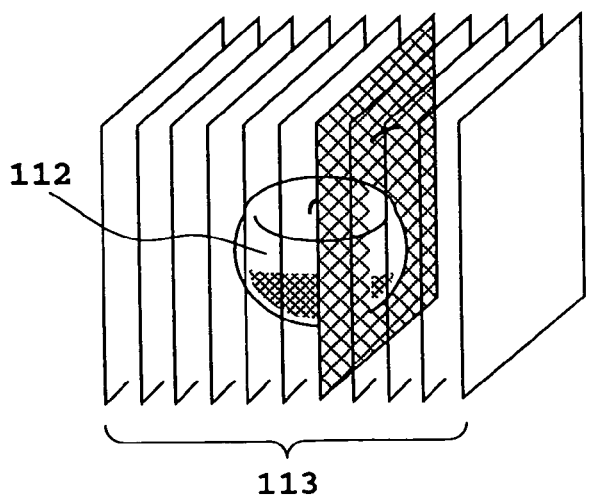

FIG. 42A is an illustration for explaining operation of the three-dimensional display device, and FIG. 42B is an illustration for explaining the two-dimensional image to be displayed on the two-dimensional display device 61.

In FIGS. 42A and 42B, a virtual image 68 is a two-dimensional image formed at a position 69, and a virtual image 110 is a two-dimensional-image formed at a position 111. Reference symbol $d_{obj}$ designates a distance between the varifocal lens and the two-dimensional display device; and $d_{img}$, a distance between the varifocal lens and the imaging point of the virtual image. FIG. 42B shows a three-dimensional image 112 and an aggregate 113 of the two-dimensional images.

It should be noted that the reason why the minus (−) sign is given to the distance dung between the varifocal lens and the imaging point of the virtual image is that the direction toward the observer 66 from the varifocal lens 62 is taken to be plus (+).

Next, discussion will be given on operation of the first embodiment of the three-dimensional display device in reference to FIGS. 40, 42A and 42B. As described above, the position (view position) of the two-dimensional display device is set at a position where the $d_{obj}$ is smaller than the focal length of the varifocal lens 62. Therefore, the two-dimensional image 67 displayed on the two-dimensional display device 61 is observed as a virtual image by the observer 66.

At this time, conforming to the equation (1) below according to a paraxial theory as a theory of optics of the lens, the imaging point 69 of the virtual image 68 of the two-dimensional image 67 can be varied in the depth direction toward the imaging point 111 of the virtual image 110 by varying the focal length of the varifocal lens 62.

$$1/d_{obj} + 1/d_{img} = 1/f_o \tag{1}$$

wherein $f_o$ is a focal length of the varifocal lens 62.

As shown in FIG. 42B, for example, the three-dimensional image 112 is expressed as an aggregate of the two-dimensional images sampled toward the depth direction from the visual direction when the three-dimensional image 112 is picked up or displayed, and the respective two-dimensional images are displayed on the two-dimensional display device 61 in a time division manner.

At this time, synchronization of the two-dimensional display device 61 and variation of the focal length of the varifocal lens 62 is established by the synchronization device 64 so that the imaging point of the two-dimensional image to be displayed on the two-dimensional display device 61 accords with the sampling position in the depth direction. Consequently, due to an after image effect of the eyes of the observer 66, the three-dimensional image 65 to be displayed on the two-dimensional display device 61 can be observed as an aggregate (virtual image) of the images sampled in the depth direction viewed from the observer 66.

As described above, in the first embodiment of the three-dimensional display device, an image obtained by sampling the three-dimensional image 112 into two-dimensional images represented on the two-dimensional plane at predetermined intervals is displayed on the two-dimensional display device 61. The two-dimensional images to be displayed on the two-dimensional display 61 are displayed at the same positions as those at the time of sampling based on an output from the synchronization device 64 for generating a signal in synchronism with variation in focal length of the varifocal lens 62. Thus, on the basis of the foregoing equation (1), the imaging point of the two-dimensional image (virtual image) to be displayed on the two-dimensional display device 61 can be varied so that the three-dimensional image 112 can be displayed as the virtual image 65, i.e., an aggregate of the sampled images in the depth direction.

In the first embodiment of the three-dimensional display device, since the observer 66 views the three-dimensional image 65 as the aggregate of the virtual images substantially aligned in the depth direction. Thus, visual cues to depth perception in three-dimensional view such as binocular disparity, convergence, accommodation and movement parallax can be satisfied without causing any discrepancy, and a natural three-dimensional image can be realized.

Moreover, in the first embodiment of the three-dimensional display device, an amount of information necessary for displaying is determined according to the number of samples in the depth direction. Resolution in the visual direction (depth direction) of the human being is known to be lower than resolution in the vertical and horizontal directions. Therefore, the number of the samples in the depth direction can become greatly smaller than that required in the vertical and horizontal directions. According to the present invention, the information amount required for displaying can be remarkably reduced in comparison with the holography.

Additionally, since the information amount can be remarkably reduced, the three-dimensional display device in the first embodiment can be applicable to the case of displaying, e.g., a moving picture, which must be displayed at high speed.

Furthermore, since the three-dimensional display device in the first embodiment utilizes the normal lens effect by the varifocal lens 62, a coherent light source such as a laser beam source is not required as the light beam source. Furthermore, since an influence of difference of colors in the two-dimensional image 67 is slight, it is easy to achieve color image display.

Furthermore, since no mechanical driving portion is required, the three-dimensional display device in the first embodiment is advantageous in reduction of a weight and improvement of reliability.

Although in this embodiment two frequencies are used, the number of frequencies should not be limited to two, and the greater number of frequencies may be employed.

(Second Embodiment of Three-Dimensional Display Device)

Figure 43:
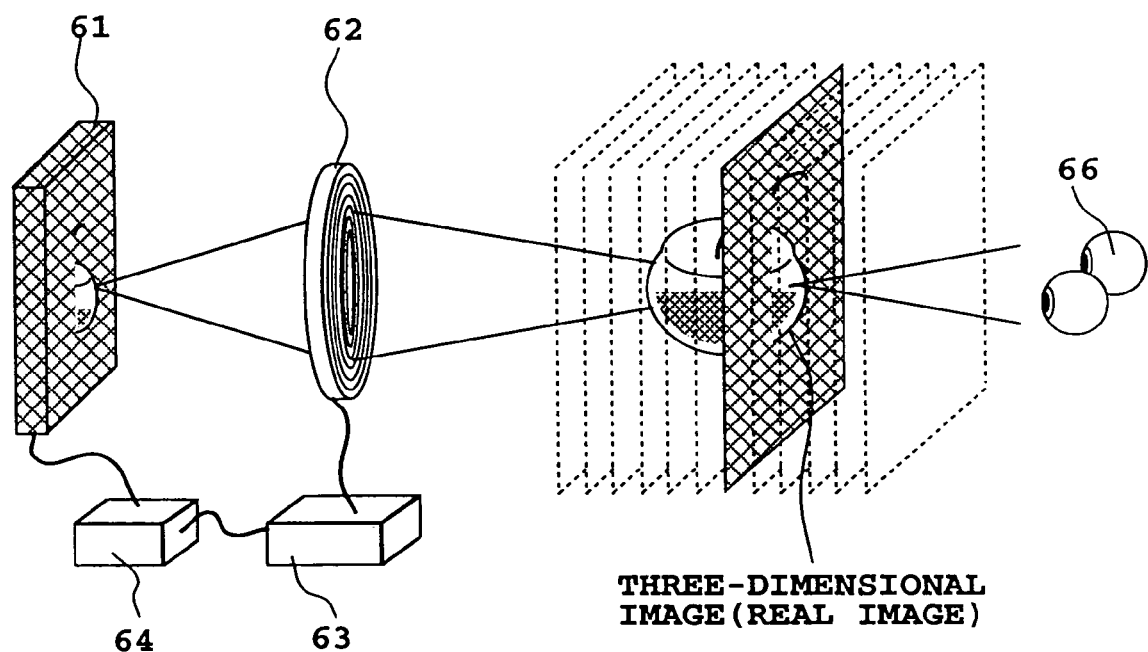
FIG. 43 is a block diagram schematically showing the construction of a second embodiment of the three-dimensional display device according to the present invention.

FIG. 43 is a view showing a schematic construction of a three-dimensional display device in the second embodiment according to the present invention. In the second embodiment shown in FIG. 43, the basic construction is the same as that of the three-dimensional display device in the first embodiment, and different from the first embodiment in that the two-dimensional display device 61 is arranged outside of the focal length as viewed from the varifocal lens 62, and that the three-dimensional image 112, i.e., the aggregate 113 of the two dimensional images is displayed on the two-dimensional display device 61 in a manner invented in the vertical and horizontal directions.

As obvious from FIG. 43, since the two-dimensional display device 61 is arranged outside of the varifocal length as viewed from the varifocal lens 62 in the three-dimensional display device in this second embodiment, the observer 66 may view the three-dimensional image (real image) formed between the varifocal lens 62 and the observer 66.

Figure 44:
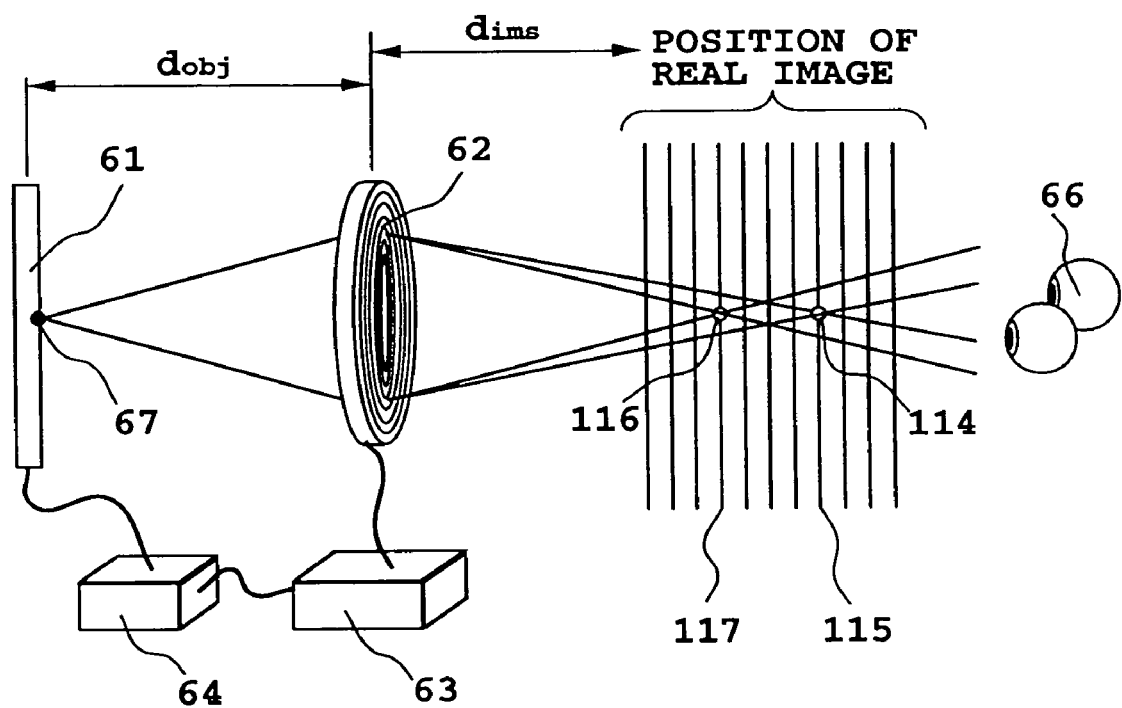
FIG. 44 is an illustration for explaining the second embodiment of the three-dimensional display device.

FIG. 44 is an illustration for explaining operation of the second embodiment of the three-dimensional display device. Hereinafter, description will be given on operation of the second embodiment of the three-dimensional display device with reference to FIG. 44.

In FIG. 44, the real image 116 is a two-dimensional image formed at an imaging point 117, and another real image 114 is a two-dimensional image formed at another imaging point 115.

At first, as shown in FIG. 44, the imaging point 115 of the real image 114 of the two-dimensional image 67 can be varied in the depth direction from the observer 66 toward the imaging point 117 of the real image 116 by varying the focal length of the varifocal lens 62.

Accordingly, similarly to the first embodiment as set forth above, the three-dimensional image is expressed as the aggregate 113 of the two-dimensional images sampled in the depth direction, and the respective two-dimensional images in the aggregate 113 are displayed on the two-dimensional display device 61 in a time division manner. Further, the focal lengths of the two-dimensional display device 61 and varifocal lens 62 are synchronized by the synchronization device 64 so that the imaging points of the respective two-dimensional images accord with the sampling position in the depth direction. Thus, utilizing the after image effect of the human eyes, the three-dimensional image can be reproduced as an aggregate of the sampled images (real image) in the depth direction.

Accordingly, this embodiment of the three-dimensional display device achieves the same advantageous result as that of the first embodiment of the three-dimensional display device. In addition, since the second embodiment of the three-dimensional display device can form the real image, it becomes possible to pick up the two-dimensional image by placing a beaded plate at the imaging point.

Otherwise, by placing a scattering plate at the imaging point, only the two-dimensional image at that position can be viewed.

(Third Embodiment of Three-Dimensional Display Device)

Figure 45:
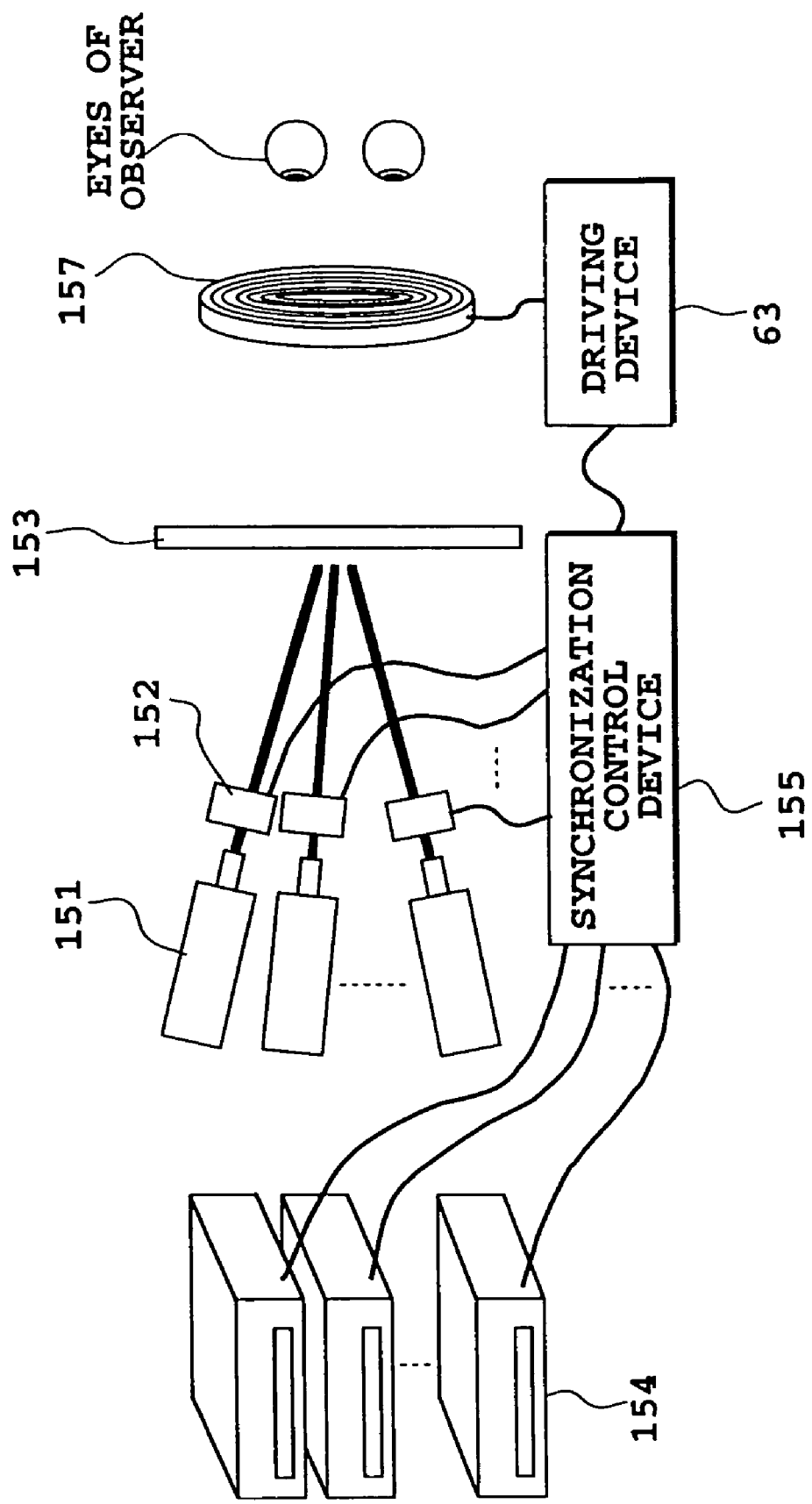
FIG. 45 is a block diagram schematically illustrating the construction of a third embodiment of the three-dimensional display device according to the invention.

FIG. 45 is a block diagram illustrating a schematic construction of a third embodiment of the three-dimensional display device according to the present invention. Reference numeral 151 denotes a projection type display; 152, a shutter; 153, a scattering plate; 154, an image recording and reproducing apparatus; and 155, a synchronization control device.

In FIG. 45, the projection type display 151 has been well known. In the third embodiment, a plurality of displays are employed for lowering a depiction speed of the respective projection type displays.

The shutters 152 are provided in the respective projection type displays 151, for projecting images from each of projection type displays 151 on the scattering plate 153 in a time division manner.

The scattering plate 153 is of a known type for displaying the image projected from the projection type display 151. For example, the scattering plate 152 is placed within the focal length of the varifocal lens 62, similarly to the first embodiment.

The image recording and reproducing apparatus 154 is of a known type, such as a video recorder. The image recording and reproducing apparatus 154 outputs an image signal to the projection type display 151 connected thereto on the basis of the output from the synchronization control device 155.

The synchronization control device 155 controls operation of the image recording and reproducing apparatus so that the image signal can be output in synchronism with variation in the focal length of the varifocal lens 157 on the basis of the output from the driving device 63. Further, the synchronization control device 155 controls the respective shutters 152, for projecting the image of the selected one of the projection type display 151 onto the scattering plate 153.

Next, the operation of the third embodiment of the three-dimensional display device according to the present invention will be discussed with reference to FIG. 45. Similarly to the foregoing first embodiment, the three-dimensional image 112 shown in FIG. 42B is expressed as the aggregate 113 of the two-dimensional images sampled in the depth direction. These two-dimensional images are projected in order from the projection type display 151 and displayed in order on the scattering plate 153 in a time division manner by the respective shutters 152. Simultaneously, the image recording and reproducing apparatus 154 and the focal length of the varifocal lens 62 are synchronized such that the imaging point of each two-dimensional image accords with the sampling position. Consequently, the three-dimensional image can be reproduced as an aggregate of the sampled images (virtual images) utilizing the after image effect of the human eyes.

Thus, the same advantageous result can be produced as that of the three-dimensional display devices in the foregoing embodiments. Additionally, a screen size can be increased easily since the projection type display 151, shutter 152 and scattering plate 153, which all have been known.

It should be noted that, in the third embodiment of the three-dimensional display device, it is possible to place the scattering plate 153 and the varifocal lens 157 in a positional relationship similar to the second embodiment in which the scattering plate 153 is placed outside of the focal length of the varifocal lens 157 so as to achieve three-dimensional displaying by projecting vertically and horizontally invented images (two-dimensional images) from the image recording and reproducing apparatus 154.

Figure 46:
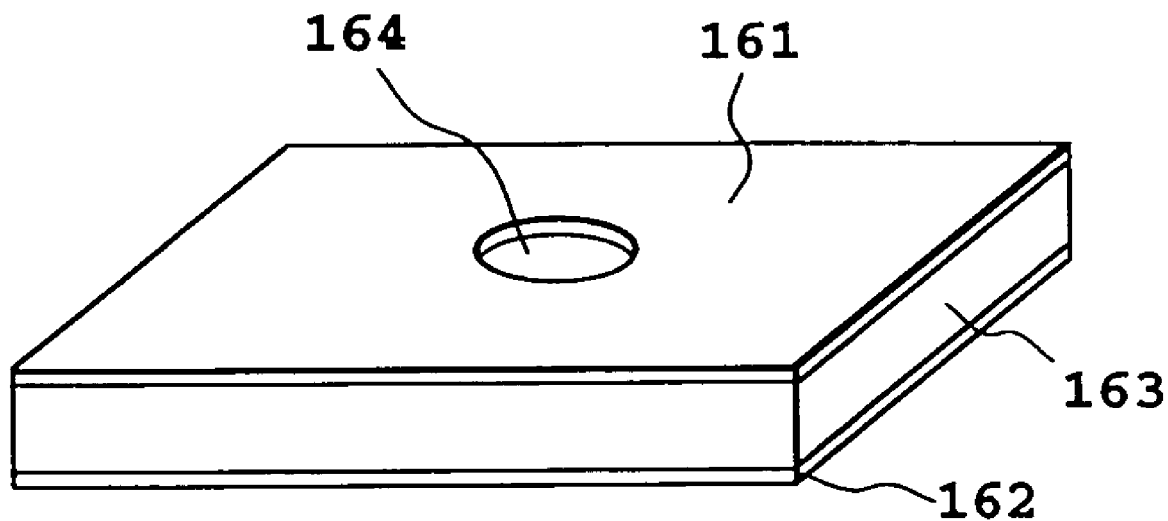
FIG. 46 is a view schematically showing the construction of a varifocal lens of the three-dimensional display device.

FIG. 46 is view showing another schematic construction of the varifocal lens to be used in the three-dimensional display device. Reference numerals 161 and 162 denotes transparent electrodes; 163, a variable refractive index material; and 164, an aperture.

In FIG. 46, the transparent electrodes 161 and 162 has been known and are formed of an ITO film, a ZnOx film or the like. The aperture 164 is formed on the transparent electrode 161, as shown in FIG. 46.

The variable refractive index material 163 is formed of a polymer dispersed liquid crystal, a polymer liquid crystal or the like, and its refractive index is varied depending upon a voltage applied to the transparent electrodes 161 and 162.

It should be noted that in the varifocal lens in the third embodiment of the three-dimensional display device, the configuration of the aperture 164 formed on the transparent electrode 161 is circular. However, the shape of the aperture is not limited to be circular, and can be variable with respect to the direction of the light beam. For instance, the aperture may be formed into a strip if the focal length is varied only in one direction.

Although the present invention made by the inventors has been described in detail and particularly in the preferred embodiments, the present invention should not be limited to these embodiments, but can be modified in various ways without departing from the spirit and the scope of the invention.

Figure 47:
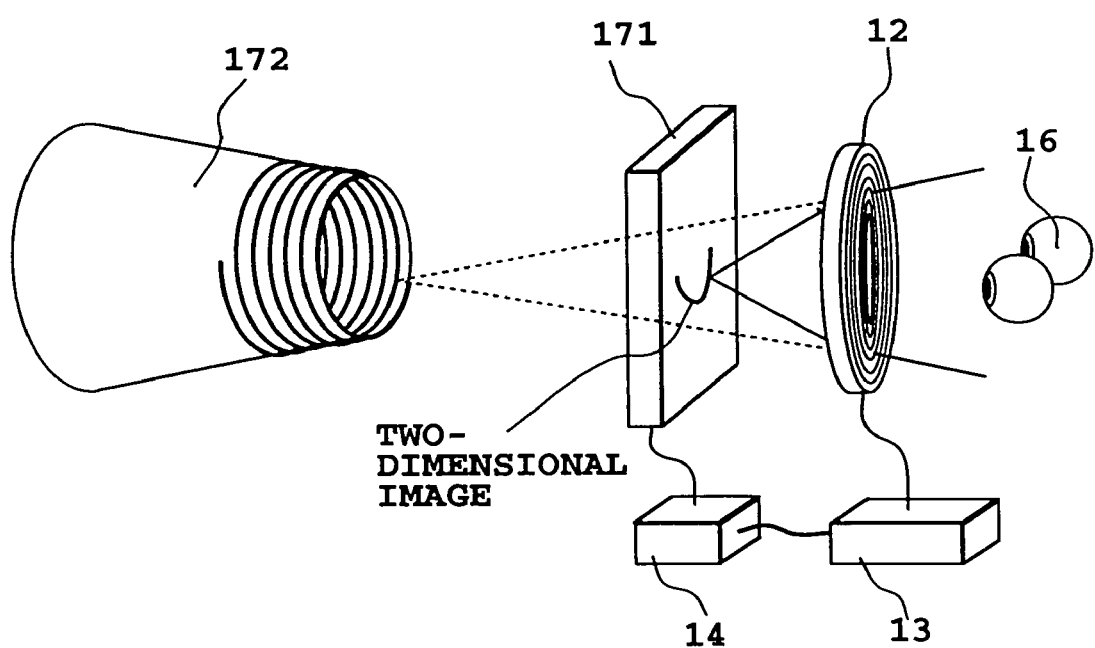
FIG. 47 is a view schematically showing the construction of another embodiment of the three-dimensional display device.

For example, it is also possible to reproduce a three-dimensional image 172 by employing a line depiction device 171 (such as a laser scanning depiction device or an electron beam scanning depiction device) as a two-dimensional display device to express the three-dimensional image 172 as an aggregate of lines or dots in place of the sampled images in the depth direction, and by varying the focal length of the varifocal lens 62 in accordance with the position of the lines or dot in the depth direction by employing the synchronization device 64, as shown in FIG. 47.

This system is applicable to the foregoing embodiments. This system can produce the same advantageous results as those achieved by the foregoing embodiments. Furthermore, since this system can reduce the number of components required for achieving the three-dimensional display, thus facilitating analogous (sequential) display in the depth direction.

According to the present invention, the three-dimensional image is displayed by varying the focal length of the varifocal lens 62 so as to vary the imaging point of the image (virtual image or real image) displayed on the two-dimensional display device 171 in the depth direction. Since the resolution in the depth direction of the human being is markedly low at the far position in comparison with that in the near position, it may be possible to reduce the overall information amount by increasing the number of samples at the near position to the observer 66 and reducing the number of samples farther from the observer 66.

Figure 48:
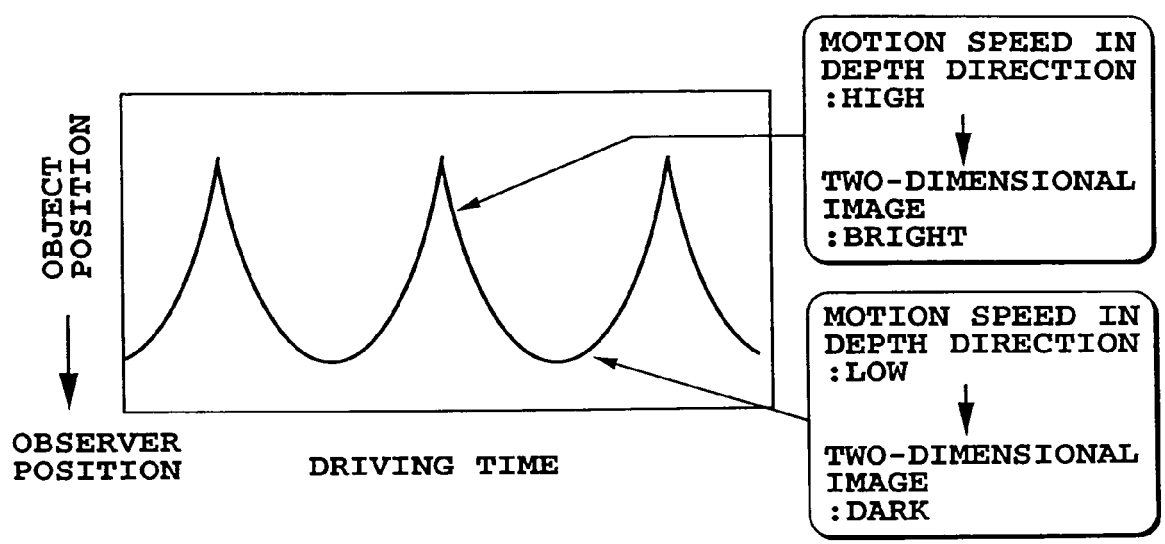
FIG. 48 is an illustration showing a motion speed of an image by the varifocal lens.

As illustrated in FIG. 48, it can be considered that the motion speed of the image by the varifocal lens is not constant in the depth direction.

In this case, if the brightness of the two-dimensional images are constant, the image where the motion speed is low appears brighter and the image where the motion speed is high appears darker to make the brightness as viewed by the observer non-uniform.

Therefore, it is quite useful to vary the brightness of the two-dimensional image according to the motion speed of the varifocal lens.

As illustrated in FIG. 48, the focal length of the varifocal lens is varied periodically between the position near to the eyes and the position far from the eyes.

In such driving manner driving, there are two cases: (1) from the near position to the far position; and (2) from the far position to the near position. These two motions are reverse in direction, but pass through the same depth positions.

Accordingly, by depicting different images in the cases of (1) and (2), the three-dimensional display device of the present invention can be driven more efficiently.

(Fourth Embodiment of Three-Dimensional Display Device)

With the three-dimensional display devices in the foregoing embodiments, since the two-dimensional images sampled in the depth direction are displayed in time division to be thus integrated into the three-dimensional image by an after image effect, it is impossible to avoid a phantom phenomenon, which allows the back side or inside of the object which should be hidden from the observer's sight to be viewed transparently. This is an immense obstacle to reproduction of the natural three-dimensional image, and is the reason why the three-dimensional display devices in the foregoing embodiments are used only for reproducing wire frame like images. Hereinafter, a three-dimensional display device capable of avoiding the above-stated drawback will be described with reference to FIGS. 49 to 59.

Figure 49:
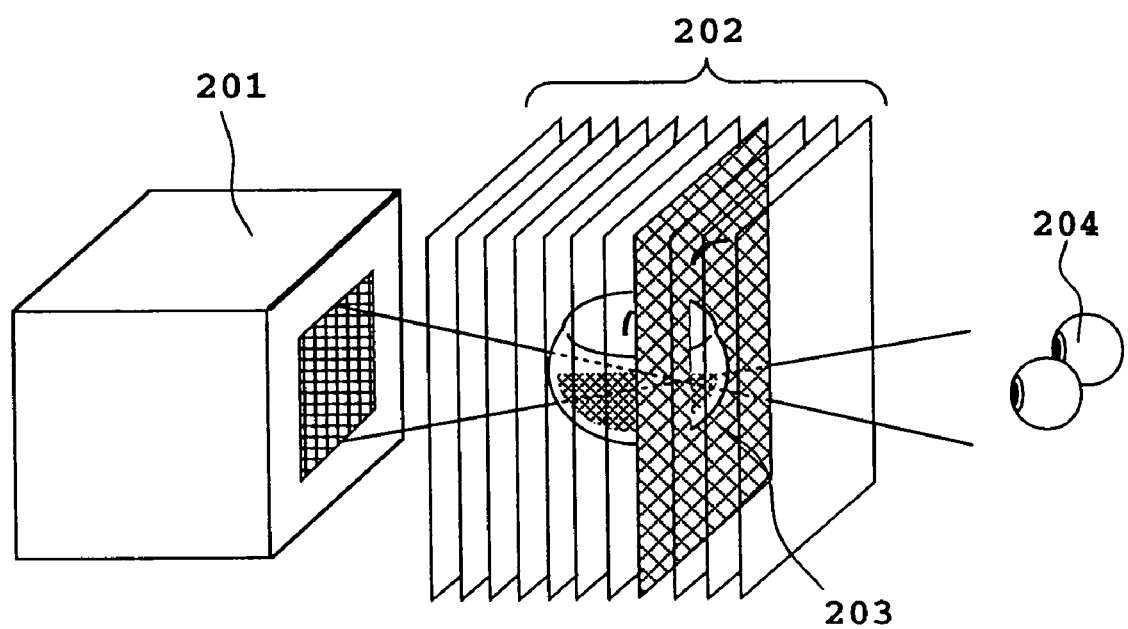
FIG. 49 is a view schematically showing the construction of a fourth embodiment of the three-dimensional display device according to the present invention.
Figure 50:
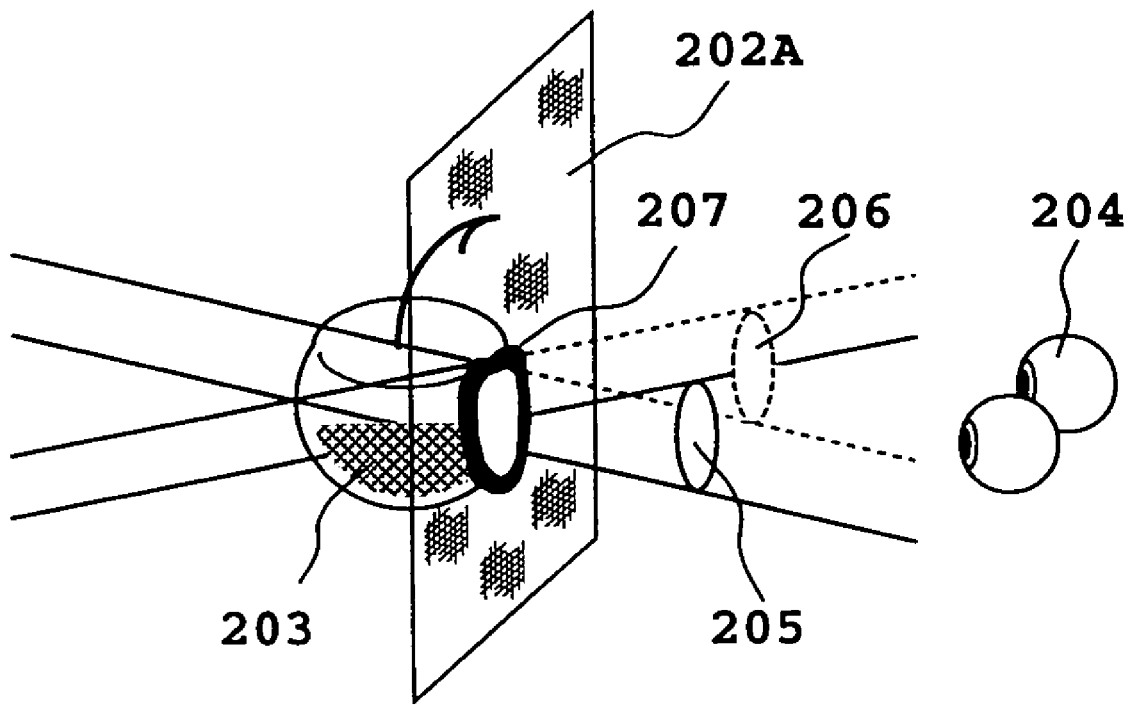
FIG. 50 is an illustration showing the basic operation of the fourth embodiment of the three-dimensional display device.

FIG. 49 is a schematic view showing a construction of the fourth embodiment of the three-dimensional display device according to the invention, and FIG. 50 is an illustration for explaining basic operation of the fourth embodiment of the three-dimensional display device for avoiding the phantom phenomenon.

In FIGS. 49 and 50, reference numeral 201 denotes a phantom three-dimensional display device; 202, a shutter device; 202A, a shutter element of the shutter device 202; 203, a phantom image (real image); 204, eyes of an observer; 205, a transmitted light beam; 206, a blocked light beam; 207, a portion where blocking, scattering and reflecting functions are effected.

The fourth embodiment uses an example in which a three-dimensional image is reproduced as a real image outside of the phantom three-dimensional display device. The term "Phantom" refers to a phenomenon which allows the back side or inside of an object which should be hidden to be viewed transparently.

As shown in FIG. 49, the fourth embodiment of the three-dimensional display device comprises the phantom three-dimensional display device 201 and the shutter device 202 arranged at a position including the phantom three-dimensional image 203.

The phantom three-dimensional display device 201 is exemplified in a varifocal three-dimensional display device or a depth direction sampling type device such as a varifocal mirror type device, a varifocal lens type device, an oscillation screen type device, a display area layer type device or a rotary type device. The phantom three-dimensional display device 201 reproduces the phantom image 203 by, for example, displaying images sampled in the depth direction in a time division manner. This phantom image is practically displayed with development in the depth direction. Therefore, although it becomes possible to satisfy visual cues to depth perception in the three-dimensional view, such as binocular disparity, convergence, accommodation and movement parallax without any discrepancy, there arises a problem that the back side or inside to be hidden is viewed transparently. Namely, normally, a light beam is scattered/reflected on the surface of a general three-dimensional object, and simultaneously, a light beam from the back side is blocked. However, the phantom three-dimensional display device can only express the former function. The three-dimensional display device as shown in FIG. 43 is one example of the phantom three-dimensional display device.

The shutter device 202 is a device including a guest-host liquid crystal, a polymer dispersed liquid crystal, a holographic polymer dispersed liquid crystal or the like; or a device including a photo reactive element in which the state of an imaging point is turned into a light blocking state, a light scattering state or a light reflecting state by converged light at the imaging point of a real image.

Next, the basic operation of the fourth embodiment of the three-dimensional display device for avoiding the phantom phenomenon will be, discussed with reference to FIG. 50.

As shown in FIG. 50, the fourth embodiment of the three-dimensional display device is constructed by arranging the shutter elements 202A forming the shutter device 202, for example, in the vicinity of the sampling positions in the depth direction (for simplicity of illustration, only one is shown in the drawing). At the position corresponding to the image sampled in the depth direction in the vicinity of the shutter element during a period when the phantom three-dimensional image 203 behind of the shutter element 202A (as viewed from the eyes 204 of the observer) is reproduced, the function to block, scatter or reflect the light beam is made effective for maintaining a transparent condition at other positions for other periods. Thus, the light beam coming from behind of the shutter element (as viewed from the eyes 204 of the observer) can be blocked or attenuated. This means that the frontal portion of the object blocks the light beam from the back portion, and the condition where the backside of the object cannot be seen can be simulated.

Accordingly, the phantom portion of the phantom three-dimensional image 203 can be made invisible by arranging the shutter elements 202A in the vicinity of the necessary sampling position in the depth direction. Therefore, it is possible to obtain a natural three-dimensional reproduced image without any phantom image.

Since the images sampled in the depth direction to be supplied to the phantom three-dimensional display device 201 can be also used as information to the shutter device 202, an information amount required for displaying the three-dimensional image excluding the phantom image is equal to that required for phantom three-dimensional display device 201, thus preventing any increase in information amount.

Furthermore, the information amount is mainly determined by the number of images sampled in the depth direction. Here, it has been known that the resolution of the human being in the depth direction is lower than that in the vertical and horizontal direction. Therefore, the number of images sampled in the depth direction can be remarkably reduced in comparison with that in the vertical and horizontal direction.

Accordingly, the fourth embodiment is advantageous in that the required information amount can be markedly reduced in comparison with that required for holography and so forth. Therefore, the three-dimensional display device in the fourth embodiment can be satisfactorily applied to the case where, for example, a moving picture must be displayed at a high speed.

Moreover, since the fourth embodiment requires only addition of the shutter device 202, an influence by a color difference of the displayed image can be reduced to facilitate displaying in color. Further, since the fourth embodiment does not include mechanical driving portions, it is suitable for reduction of a weight and improvement of reliability.

Although the fourth embodiment uses an example in which most of the light beam from the backside is blocked by the shutter device 202, a light blocking ratio of the shutter device 202 can be set to a desired value so as to easily express a semi-transparent or transparent three-dimensional object (such as glass or transparent plastic).

(Fifth Embodiment of Three-Dimensional Display Device)

The fourth embodiment as set forth above uses one example according to the present invention, in which the three-dimensional image is a real image. It is also possible to avoid the phantom phenomenon even if the three-dimensional image is a virtual image. In the fifth embodiment, a description will be given on a varifocal lens type device as a phantom three-dimensional display device in which a phantom three-dimensional image is reproduced as a virtual image. The fifth embodiment of the three-dimensional display device will be discussed hereinafter with reference to FIGS. 51 and 52.

Figure 51:
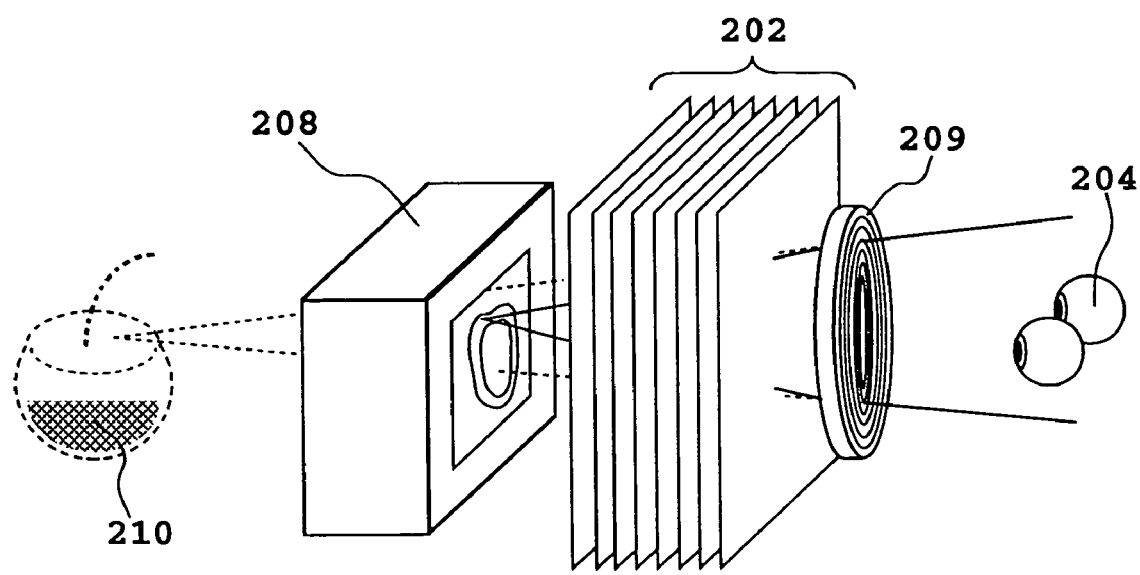
FIG. 51 is a view schematically showing the construction of a fifth embodiment of the three-dimensional display device according to the present invention.
Figure 52:
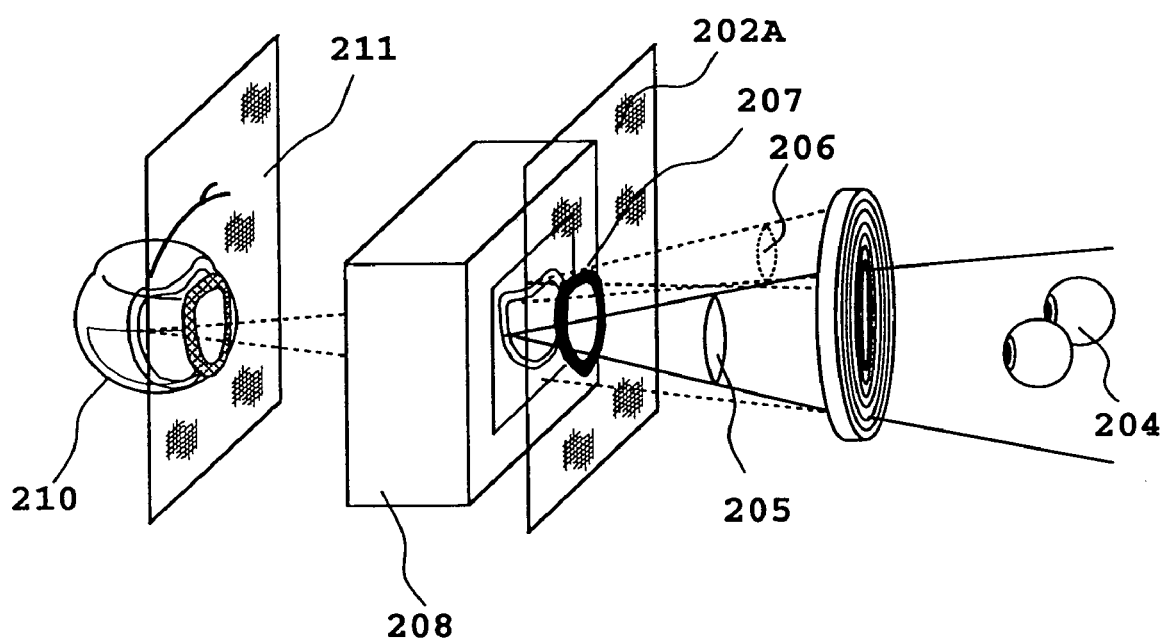
FIG. 52 is an illustration showing the basic operation of the fifth embodiment of the three-dimensional display device.

FIG. 51 is a view showing a schematic construction of the fifth embodiment of the three-dimensional display device according to the present invention, and FIG. 52 is an illustration for explaining basic operation of the fifth embodiment of the three-dimensional display device for avoiding a phantom phenomenon.

In FIGS. 51 and 52, reference numeral 202 denotes a shutter device; 202A a shutter element of the shutter device 202; 204, the eyes of an observer; 205, a transmitted light beam; 206, the blocked light beam; 207, a portion where blocking, scattering and reflecting functions are effected; 208, a two-dimensional display device; 209, the varifocal lens; 210, a phantom three-dimensional image (virtual image); and 211, a virtual image of the shutter element 202A.

As shown in FIG. 51, the fifth embodiment of the three-dimensional display device comprises the two-dimensional display device 208, a varifocal lens type phantom three-dimensional display device constructed of the varifocal lens 209, and the shutter device 202 interposed between the varifocal lens 209 and the two-dimensional display device 208.

The two-dimensional display device 208 is, for example, a CRT, a liquid crystal display, an LED display, a plasma display, a projection type display, a line depiction type display and the like. For example, a laser scan depiction device, a CRT (electron beam scan depiction device) and the like can be employed.

The varifocal lens 209 comprises a fixed focus lens, a variable refractive index material, and electrodes sandwiching the lens and the material there between.

Here, the two-dimensional display device 208 is arranged within the focal length of the varifocal lens 209. Therefore, the image to be viewed becomes a virtual image.

The phantom three-dimensional display device reproduces the virtual image by displaying the sampled images in the depth direction in a time division manner, for example. The phantom three-dimensional display device uses an example shown in FIG. 40.

Next, the basic operation for avoiding the phantom phenomenon in the fifth embodiment of the three-dimensional display device will be discussed with reference to FIG. 52.

Unlike the fourth embodiment, in the fifth embodiment, it is meaningless to place the shutter device 202 at the virtual image position since the functions of blocking, scattering and reflecting of the light beam cannot be effected. The light beams are actually converged at the real imaging point. In contrast, the light beams look like coming from the virtual image, and are not converged actually.

Therefore, the shutter elements 202A (only one is shown for simplification of illustration) of the shutter device 202 is placed at a position between the two-dimensional display device 208 and the varifocal lens 209, which position is optically equivalent to the virtual image position and the light beam actually passes. By this arrangement, the shutter device 202 is also projected at the virtual image position by the effect of the varifocal lens 209. Thus, it is possible to produce the same advantageous result as that of the fourth embodiment.

Namely, at the position corresponding to the sample images in the depth direction during a period when the phantom three-dimensional image 210 behind the virtual image (211) of the shutter elements 202A (as viewed from the observer 204) is reproduced, the function for blocking, scattering or reflecting the light beam is made effective, and a transparent condition is maintained at other timings and other positions. Thus, the light beam coming from behind of the shutter element 202A (as viewed from the observer 204) is blocked or attenuated for the observer. This means that the front portion of the object blocks the light beam from the rear portion, and the condition where the backside of the object is invisible, can be simulated.

Accordingly, by this embodiment, similarly to the fourth embodiment even the pseudo of phantom three-dimensional image 210, the phantom portion can be made invisible. Thus, it is possible to obtain a natural three-dimensional reproduced image excluding any phantom image.

(Sixth Embodiment of Three-Dimensional Display Device)

In the foregoing fifth embodiment, the shutter device is arranged at a position which is optically equivalent to the phantom three-dimensional image of the virtual image and in which the light beam actually passes. The advantageous result of the present invention can be achieved by arranging the shutter device at a position which is optically equivalent to the phantom three-dimensional image of the image and in which the light beam actually passes, irrespective of a real image or a virtual image of the phantom three-dimensional image.

The sixth embodiment uses an example in which a varifocal lens type device is employed as the phantom three-dimensional display device and the phantom three-dimensional image is reproduced as a real image. Discussion will be given on the sixth embodiment of the three-dimensional display device with reference to FIGS. 53 and 54.

Figure 53:
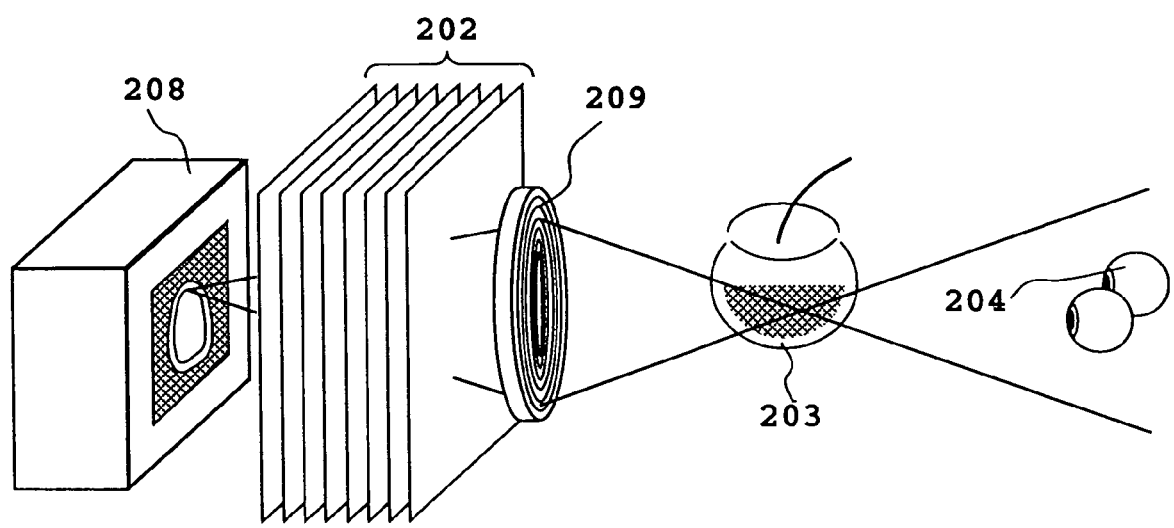
FIG. 53 is a view schematically showing the construction of a sixth embodiment of the three-dimensional display device according to the present invention.
Figure 54:
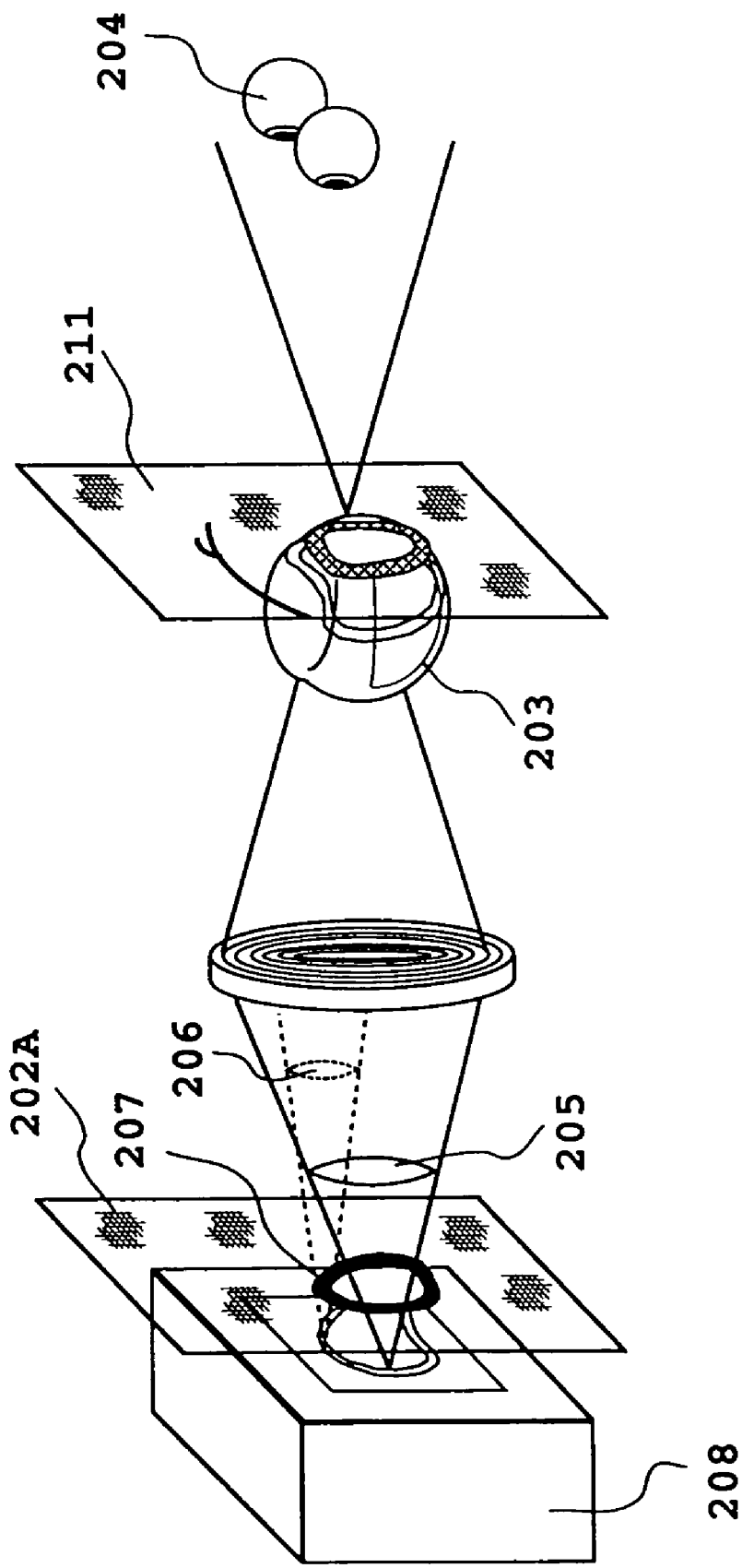
FIG. 54 is an illustration showing the basic operation of the sixth embodiment of the three-dimensional display device.

FIG. 53 is a view showing a schematic construction of the sixth embodiment of the three-dimensional display device, and FIG. 54 is an illustration for explaining the basic operation for avoiding a phantom phenomenon in the sixth embodiment of the three-dimensional display device.

In FIGS. 53 and 54, reference numeral 202 denotes a shutter device; 202A, a shutter element of the shutter device 202; 203, a phantom three-dimensional image (real image); 204, an observer; 205, a transmitted light beam; 206, a blocked light beam; 207, a portion where blocking, scattering and reflecting functions are effected; 208, a two-dimensional display device; and 209, a varifocal lens.

Like the fifth embodiment, the sixth embodiment of the three-dimensional display device comprises the varifocal lens type phantom three-dimensional display device including the two-dimensional display device 208 and the varifocal lens 209, and the shutter device 202 interposed between the two-dimensional display device 208 and the varifocal lens 209, as shown in FIG. 53. Here, the two-dimensional display device 208 and the varifocal lens 209 are arranged outside of the focal length of the varifocal lens 209 so that an image to be viewed becomes a real image, i.e., a phantom three-dimensional image 203.

Although like the fifth embodiment, the shutter device 202 may be arranged at a position of the phantom three-dimensional image 203, it can be arranged at a position which is optically equivalent to the phantom three-dimensional image of the virtual image and in which the light beam actually passes, as shown in FIGS. 53 and 54 (only one is shown for simplification of illustration). With this arrangement, the shutter device 202 is also projected on the real image position by the effect of the varifocal lens 209. Thus, it is possible to produce the same advantageous result as that of the fourth embodiment.

Namely, at the position corresponding to the sample images in the depth direction, during a period when the phantom three-dimensional image 203 behind the position of the real image of the shutter elements 202A (as viewed from the observer 204) is reproduced, the function for blocking, scattering or reflecting the light beam is made effective, and a transparent condition is maintained at other timings and other positions. Thus, the light beam coming from behind of the shutter element 202A (as viewed from the observer 204) is blocked or attenuated for the observer. This means that the front portion of the object blocks the light beam from the rear portion, and the condition where the backside of the object is invisible can be simulated.

Thus, in the sixth embodiment, the advantageous result of the present invention can be achieved by arranging the shutter device at the position which is optically equivalent to the phantom three-dimensional image of the virtual image and in which the light beam actually passes, and the natural three-dimensional image without any phantom image can be obtained.

Figure 55:
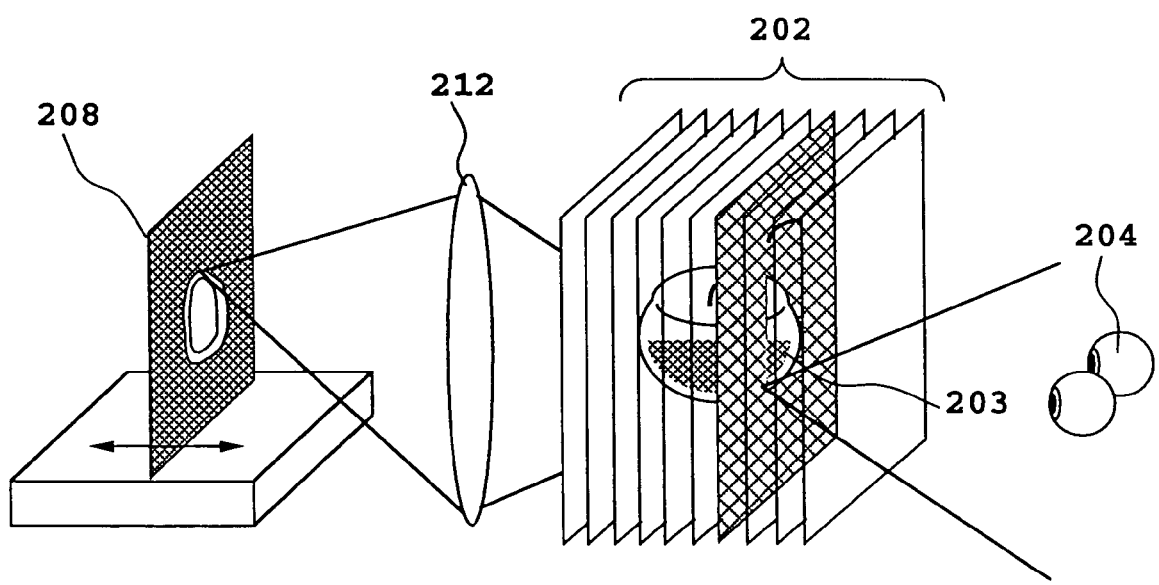
FIG. 55 is a view schematically showing the construction of the sixth embodiment of the three-dimensional display device employing an optical system such as a lens or a mirror.

For example, by the use of the depth sample type phantom three-dimensional display device, when a part of the display device moves to the phantom image position, it is physically difficult to arrange the shutter device 202 at that position. Therefore, it may be possible to optically shift the position of the phantom three-dimensional image by employing an optical system such as a lens or a mirror, and to arrange the shutter device 202 at the shifted position, as shown in FIG. 55, for example. Even in this case, it is obvious from the sixth embodiment that the advantageous result of the present invention can be sufficiently achieved.

In this embodiment, like the three-dimensional image 203 shown in FIG. 53, a region where the three-dimensional image 203 is reproduced can be set in a space where no object such as the device exists, thereby offering an advantage of reducing a frame canceling and the like. Here, the frame canceling means a phenomenon that if an object exists within the region where the three-dimensional image is reproduced, the configuration and the like of the object may influence on the recognition process of a three-dimensional image by the human being such that the position of the three-dimensional image is shifted by the influence of presence of the object, or the three-dimensional image sticks on the object to be viewed as the two-dimensional image; or the observer feels a strange feeling that the three-dimensional image moves in the opposite direction, when he moves his head. Further, in this embodiment, since the region where the three-dimensional image 203 is reproduced is a mere space, it is possible to advantageously arrange an object over, under or beside the three-dimensional image so as to reduce the frame canceling.

(Embodiment of Shutter Device to be Employed in Fourth to Sixth Embodiments)

An embodiment of the shutter device to be employed in the present invention will be illustrated in FIGS. 56A to 58.

Figure 56A:
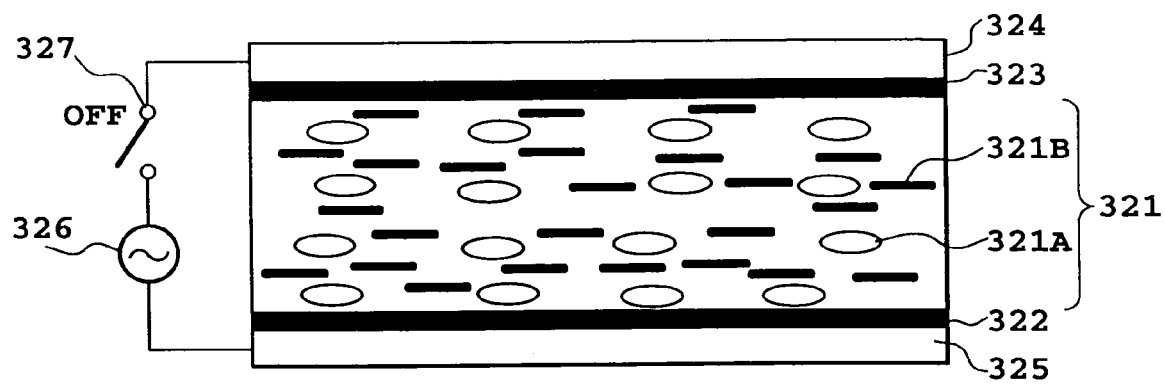
FIGS. 56A to 58 are sections showing embodiments of shutter devices in the three-dimensional display device.
Figure 56B:
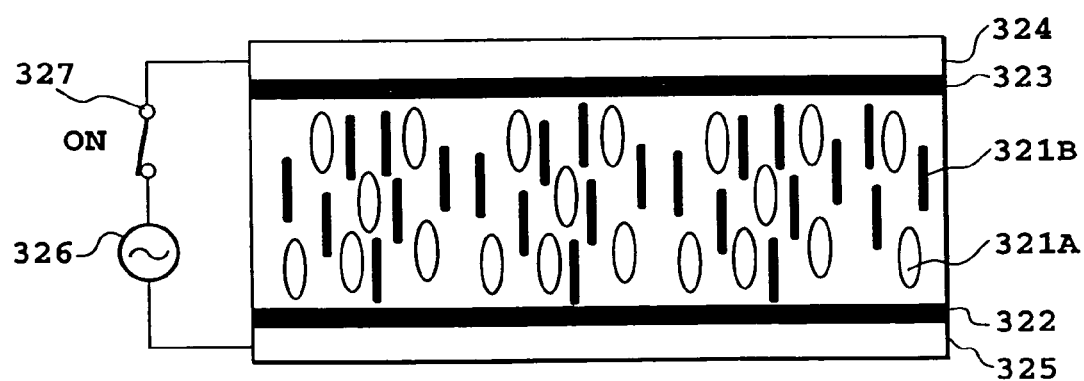

One example of the guest-host liquid crystal element to be employed in the shutter device is shown in FIGS. 56A and 56B. In FIG. 56A, reference numeral 321 denotes a guest-host liquid crystal layer; 321A, a liquid crystal; 321B, a dichroic dye; 322 and 323, alignment layers; 324 and 325, electrodes; 326, a power source (applied voltage); and 327, a power switch.

As shown in FIG. 56A, the guest-host liquid crystal element comprises the guest-host liquid crystal layer 321 composed of a mixture of the dichroic dye (e.g., anthraquinone type dichroic dye or azo type dichroic dye), the liquid crystal (e.g., nematic liquid crystal), the alignment layers 322 and 323 and the electrodes 324 and 325 sandwiching the guest-host liquid crystal.

When no voltage is applied between the electrodes 324 and 325, the liquid crystal 321A is aligned in parallel to the alignment layers 322 and 323 by anchoring force of the alignment layer 322 and 323. Accordingly, the dichroic dye 321B is also aligned in parallel to the alignment layers, to become, e.g., black and absorb the light beam. Therefore, the light beam coming from the backside is absorbed by the dye so that the intensity of the light beam to be transmitted forward can be reduced remarkably.

As shown in FIG. 56B, when a voltage higher than or equal to a threshold voltage of the liquid crystal 321A is applied between the electrodes 324 and 325, the liquid crystal 321A is aligned perpendicularly to the alignment layers due to its own dielectric constant anisotropy. Accordingly, the dichroic dye 321B is also aligned perpendicularly to the alignment layers, to thus become transparent, for example. Thus, in this guest-host liquid crystal element, transmitting and blocking of the light beam can be switched by the voltage, and therefore, the shutter function required in the present invention can be realized.

Since the present invention required only to transmit and block the light beam by the voltage, a similar effect can be produced by a polymer dispersed guest-host liquid crystal element, in which the guest-host liquid crystal is dropwise dispersed in the polymer.

Figure 57:
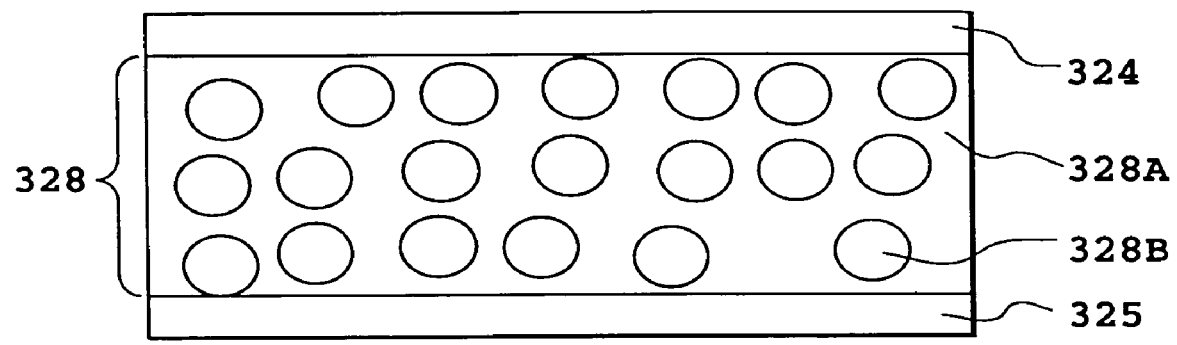

FIG. 57 shows one embodiment of the polymer dispersed liquid crystal element to be employed in the shutter device. The polymer dispersed liquid crystal element comprises a polymer dispersed liquid crystal layer 328, in which the liquid crystal (e.g., nematic liquid crystal) droplets 328B are dispersed in a transparent polymer (e.g., acryl type polymer) 328A, and electrodes 324 and 325 sandwiching the layer 328.

When no voltage is applied between the electrodes 324 and 325, the liquid crystal droplets 328A are oriented randomly by the anchoring force of alignment of the polymer around the droplets 328B so that the light beam is scattered by birefringence of the liquid crystal droplets 328B. Therefore, the light beam coming from the backside is scattered by the polymer dispersed liquid crystal, and then, its intensity is reduced. Next, when a sufficient voltage is applied between the electrodes 324 and 325, the liquid crystal is aligned perpendicularly to the electrodes 324 and 325 due to its own dielectric constant anisotropy so that its refractive index becomes substantially equal to that of the polymer 328A thus to become transparent. Thus, in this polymer dispersed liquid crystal element, transmitting and scattering of the light beam can be switched by the voltage. Therefore, the shutter function required in the present invention can be realized.

Since the present invention requires only to control transmitting and scattering of the light beam by the voltage, the similar effect may be produced by employing a polymer dispersed liquid crystal, in which the polymer is dispersed within the liquid crystal in a network fashion.

Figure 58:
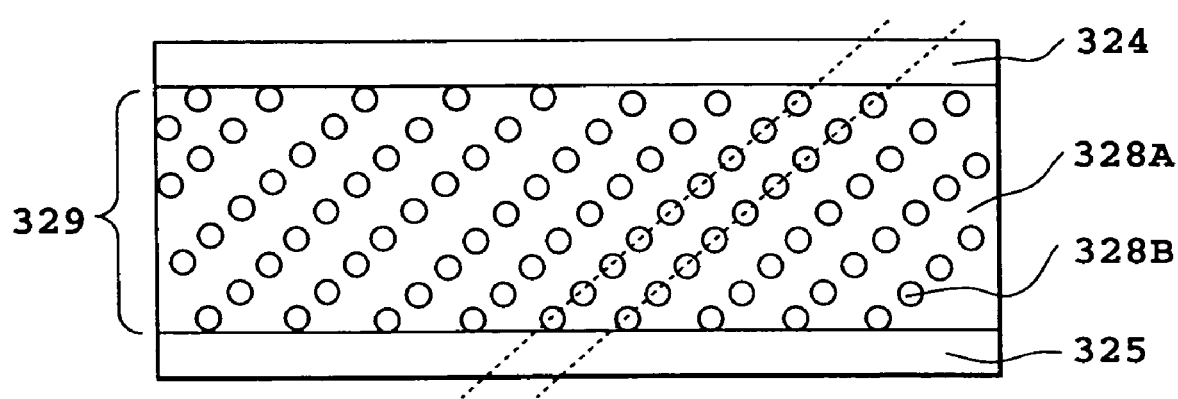

FIG. 58 shows one embodiment of a holographic polymer dispersed liquid crystal element to be employed in the shutter device. The holographic polymer dispersed liquid crystal element comprises a holographic polymer dispersed liquid crystal layer 329, in which the liquid crystal (e.g., nematic liquid crystal) droplets 328B are dispersed in a laminated manner in the transparent polymer (e.g., acryl type polymer) 328A, as shown in FIG. 58, and the electrodes 324 and 325 sandwiching the layer 329.

When no voltage is applied between the electrodes 324 and 325, the liquid crystal droplets 328A are oriented randomly by the anchoring force of alignment of the polymer around the droplets 328B so that the light beam is scattered by birefringence of the liquid crystal droplets 3288, and reflected by Bragg reflection of mufti-layer structure of the polymer layer 328A and the layer of the liquid crystal droplets 328B. Therefore, the light beam coming from the backside is refracted to, e.g., the back side by the holographic polymer dispersed liquid crystal element 329, and the intensity of the light beam transmitted forward is markedly reduced.

Next, when a sufficient voltage is applied between the electrodes 324 and 325, the liquid crystal is aligned perpendicularly to the electrodes 324 and 325 due to its own dielectric constant anisotropy so that its refractive index becomes substantially equal to that of the polymer 328A to thus become transparent.

Thus, in this polymer dispersed liquid crystal element, transmission and reflection of the light beam can be switched by the voltage. Therefore, the shutter function required in the present invention can be realized. Here, it is important for the present invention to attenuate the light beam intensity to the observer at the front side. Therefore, in this element, it is not essential to cause mirror surface reflection, but reflection containing scattering factor or deflection to a region where the observer is not present may be sufficiently satisfactory. It is also clear that the light intensity to the observer can be reduced owing to a change in Bragg reflection angle by varying an angle of the multilayer structure of the layer 328A polymer and the liquid crystal droplets layer 328B in the holographic high polymer dispersed liquid crystal element 329.

It is also clearly effective to employ the guest-host liquid crystal shown in FIG. 56A as the liquid crystal portion of the high polymer dispersed liquid crystal and the holographic polymer dispersed liquid crystal respectively shown in FIGS. 57 and 58.

(Seventh Embodiment of Three-Dimensional Display Device)

The seventh embodiment of the three-dimensional display device is substantially constructed similarly to the foregoing fourth embodiment shown in FIG. 49, and comprises the phantom three-dimensional display device for reproducing the real image of the phantom three-dimensional image 203 and the shutter device 202 arranged at the positions including the phantom three-dimensional image 203. Here, the shutter device 202 includes a light beam reactive element (e.g., a photochromic material, a material causing a photostructural change and a material containing a liquid crystal, or an element containing a liquid crystal in which nematic-isotropic phase transition temperature is varied by a photostructural change), in which a converged light beam at an imaging point of a real image brings the imaging point into a beam shuttering, scattering or reflecting state.

Figure 59:
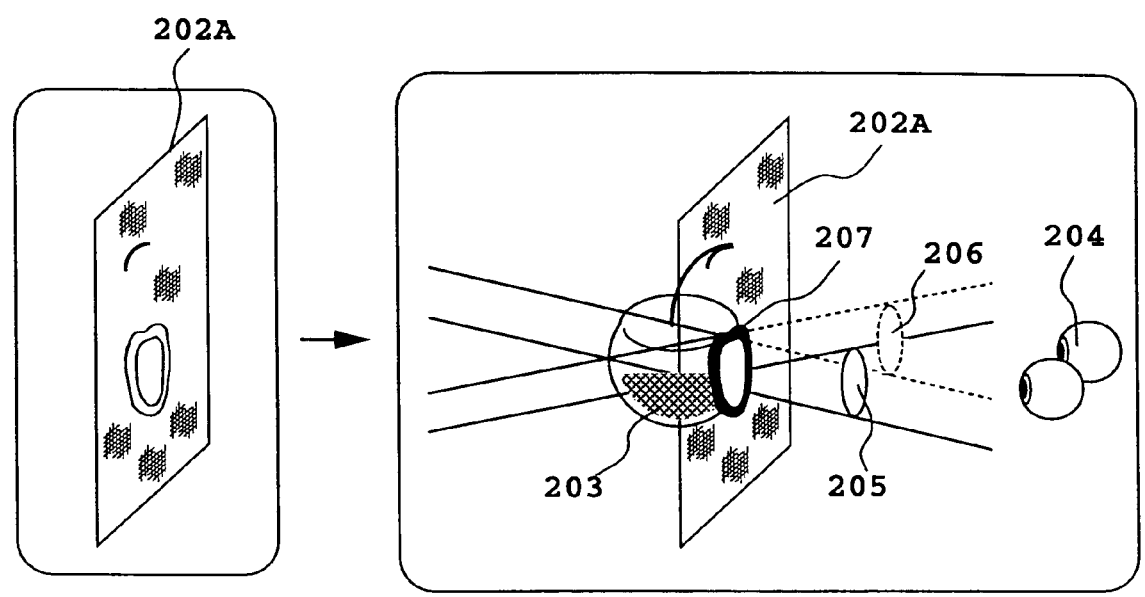
FIG. 59 is an illustration showing the basic operation of a seventh embodiment of the three-dimensional display device.

FIG. 59 is an illustration showing the basic operation of the seventh embodiment of the three-dimensional display device. As shown in FIG. 59, a phantom three-dimensional display device 201 reproduces the phantom three-dimensional image 203 of the real image by displaying depth sample images in a time division manner. The shutter elements 202A forming the shutter device 202 are arranged at the positions including the phantom three-dimensional image 203. When the three-dimensional image is reproduced from the front side as viewed from the observer, once the phantom image is reproduced (left of FIG. 59), at the imaging point of the real image in the shutter device 202, the point is brought into a light beam blocking, light beam scattering or light beam reflecting state by the action of the light beam reactive element (right in FIG. 59). By this, for a predetermined period when the phantom three-dimensional image 203 of the backside (as viewed from the observer) portion is reproduced, the light beam coming from the phantom three-dimensional image of the backside (as viewed from the eyes 204 of the observer) is blocked or attenuated. This is equivalent to the fact that the front portion of the object blocks the light beam from the rear portion. Further, the condition where the backside of the object is invisible can be successfully simulated.

Accordingly, the seventh embodiment of the three-dimensional display device can make the phantom portion invisible so as to obtain the natural three-dimensional image without any phantom image.

In the seventh embodiment of the three-dimensional display device, it is not required to input particular information into the shutter device, thus preventing an increase in required information amount. Furthermore, it becomes unnecessary to drive the liquid crystal by the voltage.

Discussion will be given on one embodiment of the light beam reactive element. At first, there is a photochromic material which is brought into a light beam blocking state by irradiation of light beam. This utilizes a phenomenon to cause isolation of, for example, sliver fine particles by irradiation of light beam and return to become a transparent compound when the light beam is blocked.

It is possible to switch transmission/scattering and transmission/reflection of light beam by dropwise dispersing in the polymer a mixture of a material such as azobenzene type polymer causing a photostructural change such as cis-trans structure variation by irradiation of light beam and the liquid crystal. Namely, the shape of the material is varied due to the photostructural change, to vary the alignment condition of the liquid crystal and vary a difference in refractive index between the liquid crystal and the polymer for switching transmission and scattering. Furthermore, it is also clear that reflection and transmission by Bragg reflection can be switched by forming the liquid crystal mixture layer and the polymer layer in a laminated manner.

It is also effective to dropwise disperse, in the polymer, a material containing a liquid crystal, nematic-isotropic phase transition temperature of which is varied due to structural variation or temperature variation by irradiation of light beam. In the nematic phase, the light beam is scattered due to birefringence of the material. On the other hand, in the isotropic phase, birefringence is eliminated so that the light beam becomes transparent. Furthermore, it is also clear that reflection and transmission by Bragg reflection can be switched by forming the liquid crystal mixture layer and the polymer layer in a laminated manner.

Although the present invention has been illustrated and described with respect to the preferred embodiments thereof, it should be understood by those skilled in the art that the present invention is not limited to the specific embodiments set out above, and that various modifications and alternations can be added thereto without departing from the spirit and scope of the present invention.

(First Embodiment of Head-Mount Display Device)

Figure 60:
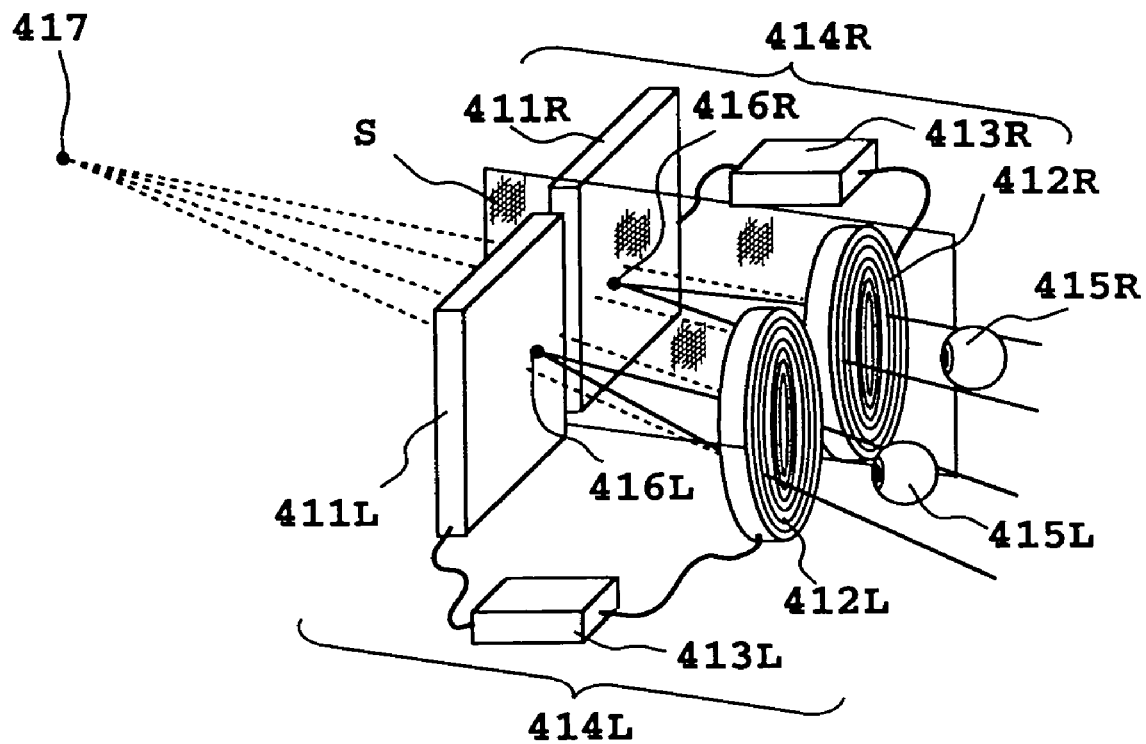
FIG. 60 is a perspective view showing a first embodiment of a head-mount display device.
Figure 61:
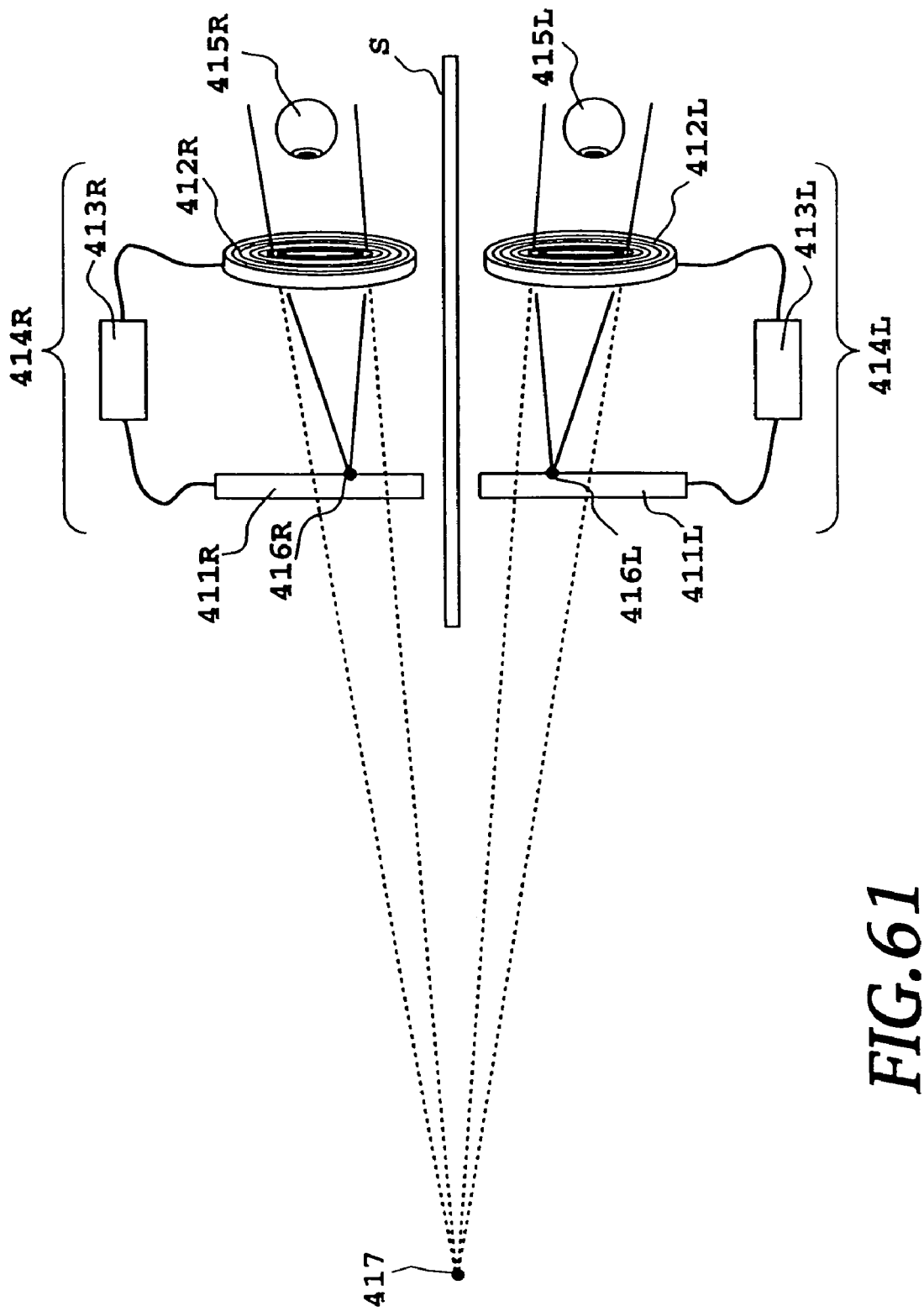
FIG. 61 is a plan view of the device of FIG. 60, on a plane including the eyes of an observer.

FIG. 60 is a perspective view showing a schematic construction of a first embodiment of a head-mount display device according to the present invention, and FIG. 61 is a plan view of the device of FIG. 60, on a plane including eyes of an observer.

In FIGS. 60 and 61, reference numerals 411R and 411L denote two-dimensional display devices such as a CRT device, a liquid crystal display device, an EL display device, a plasma display device, a laser scanning type depiction device and a projection type display device. Reference numerals 412R and 412L denote varifocal lenses such as liquid crystal lens. Reference numerals 413R and 413L are control devices which controls the two-dimensional display devices 411R and 411L and the varifocal lenses 412R and 412L. Reference numerals 414R is a right eye head-mount display device which comprises the two dimensional-display device 411R, the varifocal lens 412R and the control device 413R. Reference numeral 414L is a left eye head-mount display device which comprises the two-dimensional display device 411L, the varifocal lens 412L and the control device 413L. Reference numeral 415R denotes right eye; 415L, a left eye; 416R and 416L, display images; 417, a virtual image; and S, a partition.

The varifocal lens in the head-mount display device is the optical device set forth above in detail.

As shown in FIGS. 60 and 61, the first embodiment of the head-mount display device comprises the right eye head-mount display device 414R including the two-dimensional display device 411R, the varifocal lens 412R and the control device 413R; and the left eye head-mount display device 414L including the two-dimensional display device 411L, the varifocal lens 412L and the control device 413L, similarly to the right eye head-mount display device 414R. The right eye head-mount display device 414R is worn on the right eye 415R and the left eye headmount display device 414L is worn on the left eye 415L, respectively.

Figure 62:
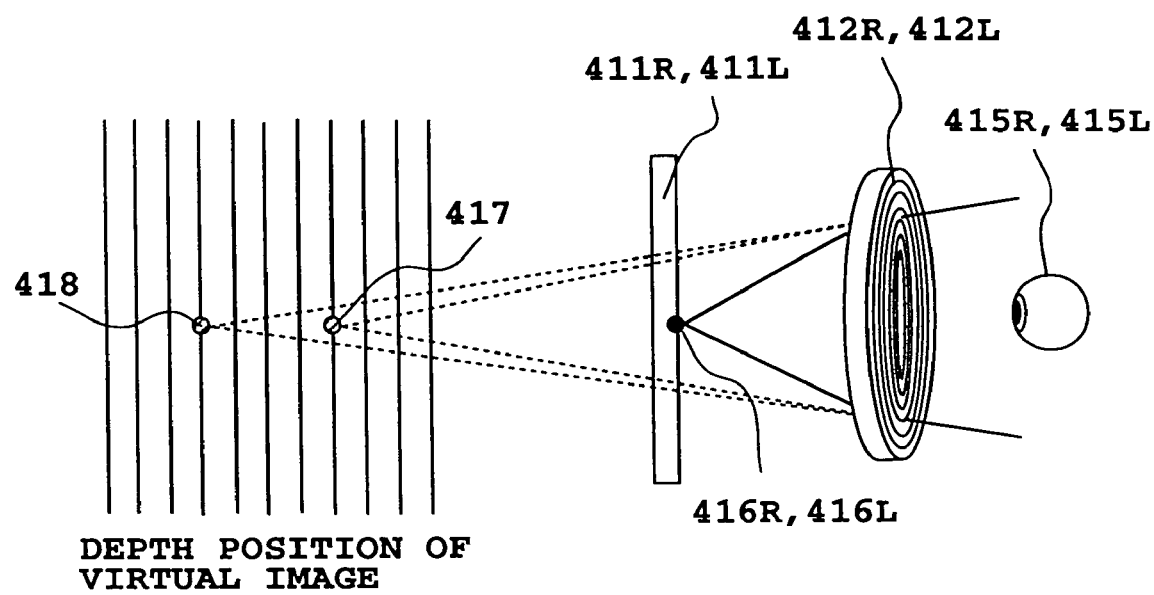
FIGS. 62 and 63 are views showing the basic operation of the first embodiment of the head-mount display device.
Figure 63:
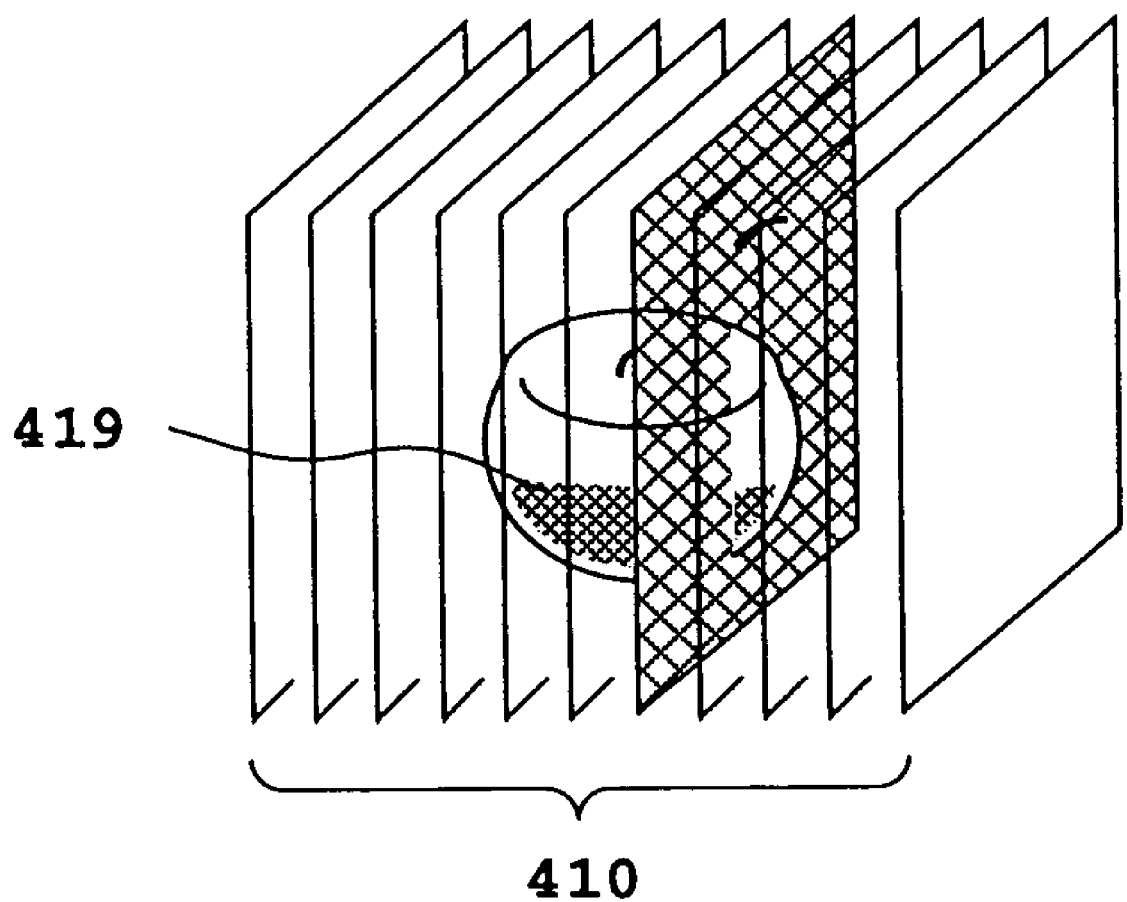

With the construction set forth above, when a display image 416R of the two-dimensional display device 411R is viewed by the right eye 415R through the varifocal lens 412R and a display image 416L of the two-dimensional display device 411L is viewed by the left eye 415L through the varifocal lens 412R, a virtual image 417 is formed. If the focal lengths of the varifocal lenses 412R and 412L are varied, the depth position of the virtual image is varied as shown in FIG. 62, to thus form another virtual image 418. As shown in FIG. 63, a three-dimensional image can be expressed as an aggregate of two-dimensional images sampled in the depth direction (hereinafter referred to as "depth sampled image").

The depth sampled images are displayed in sequence on the two-dimensional display devices 416R and 416L, and then, the control devices 413R and 413L varies the focal lengths of the varifocal lenses 412R and 412L in conformity to the displayed images. Thus, the three-dimensional image can be expressed as an aggregate of the sampled images to realize a varifocal type three-dimensional display device.

In the first embodiment set forth above, the virtual image is varied in the depth direction, in practice. Therefore, discrepancy between accommodation and the binocular disparity or convergence, which has been caused in the conventional method, can be avoided. Accordingly, it is possible to satisfy accommodation, binocular disparity, convergence as visual cues to depth perception in three-dimensional view, to thus realize a natural three-dimensional view.

In the first embodiment, as the focal lengths (including positive and negative) of the varifocal lenses 412R and 412L are made smaller, the position of the virtual image in the depth direction is more distant from the eyes, and the images displaced on the two-dimensional display devices 416R and 416L are enlarged accordingly. In order to make the size of the virtual image constant, the size of the displayed image of the two-dimensional display devices 416R and 416L has to be varied corresponding to motion of the focal lengths of the varifocal lenses 412R and 412L.

Since, with this nature, the visual field covered by the two-dimensional display device becomes greater as the length from the eyes becomes longer, it becomes possible to realize a natural condition similar to the visual field of the human being.

Furthermore, since the number of, for example, pixels or display lines of the two-dimensional display devices 416R and 416L are not varied, a size of the pixel or a width of the display line becomes greater as a distance of the virtual image from the eyes becomes longer. However, since the visual angle from the eye is not changed, definition of the image which the human being feels, will be held unchanged.

Figure 64:
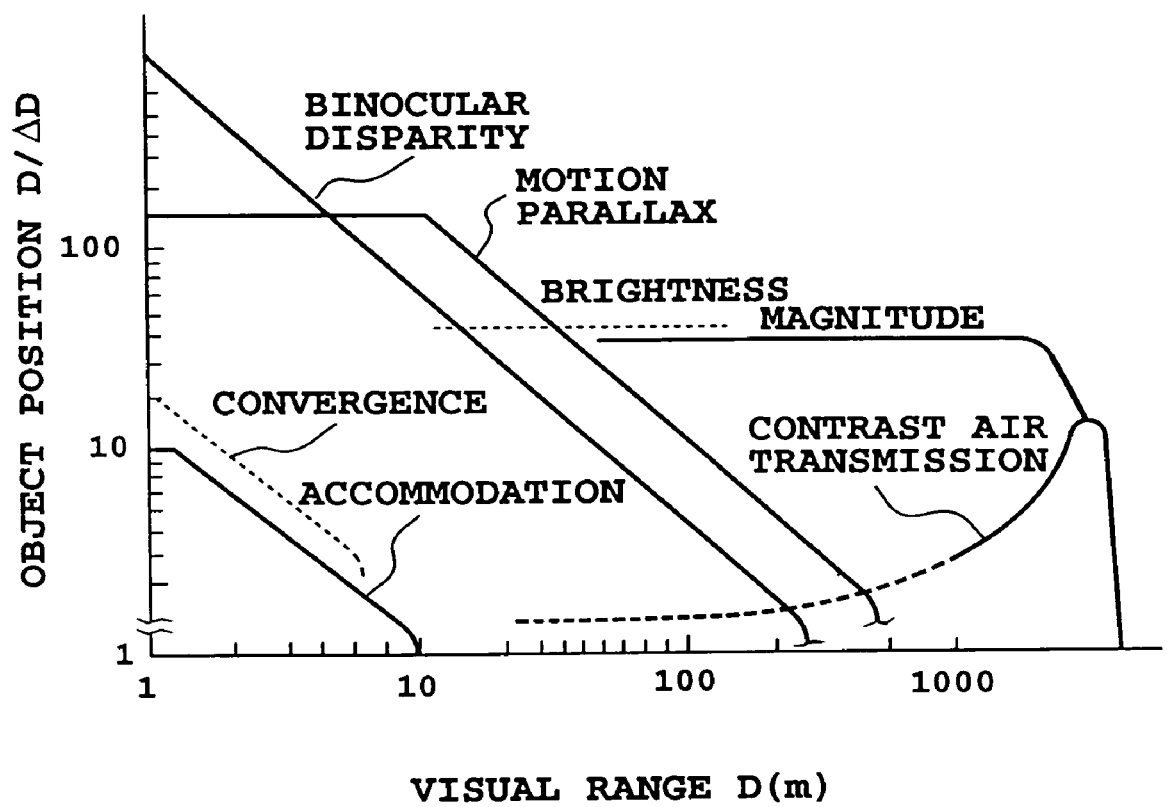
FIG. 64 is a graph illustrating visual cues to depth perception.

FIG. 64 is a graph illustrating a relationship between visual cues of depth perception and depth perceptivity, and shows depth perceptivity approximated from measured and calculated values with respect to respective three-dimensional sense factors.

Figure 65:
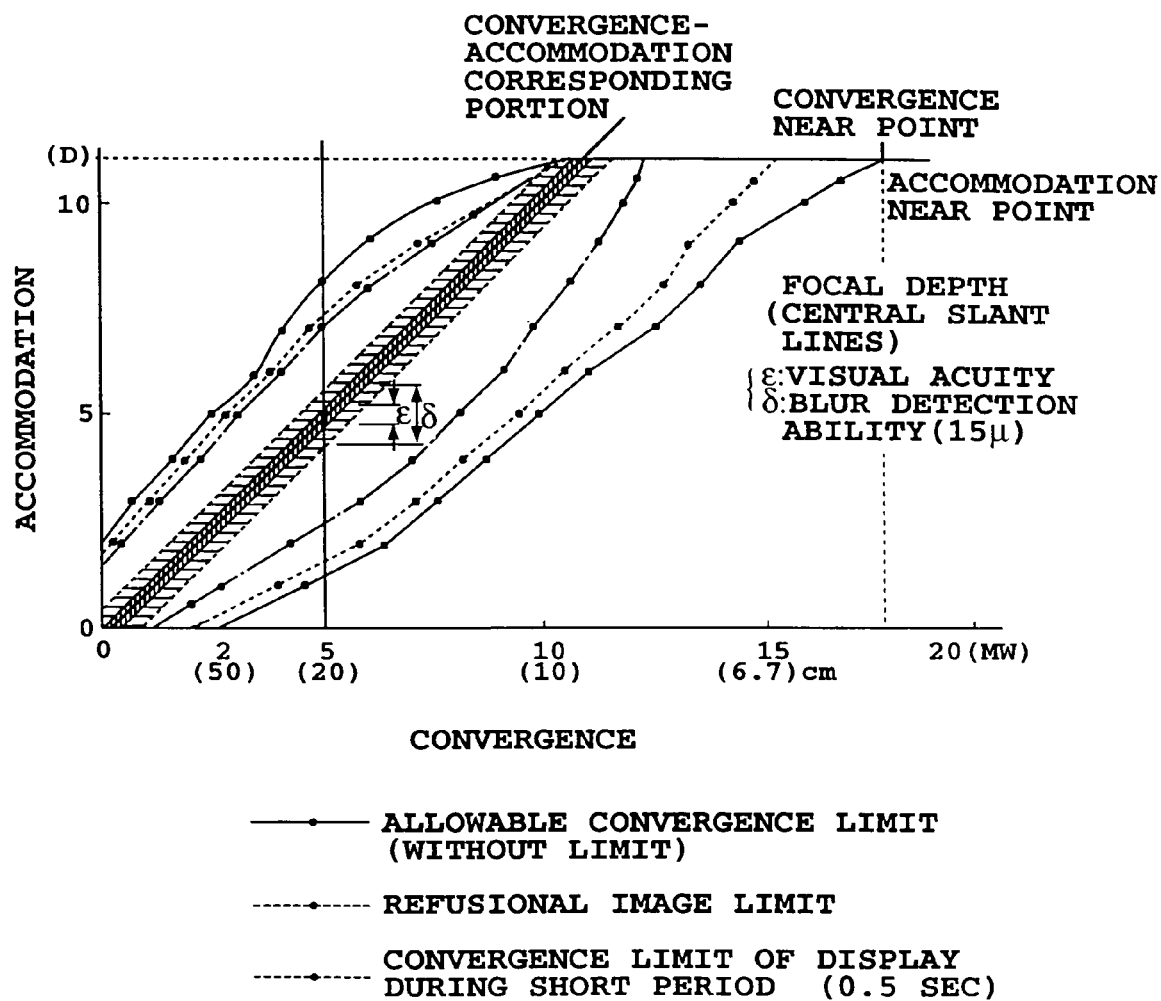
FIG. 65 is a graph illustrating the correspondence and allowable range of convergence and accommodation.

FIG. 65 is a graph illustrating the correspondence and allowable range of convergence and accommodation. A central solid line at 45° represents that the convergence and accommodation are completely corresponded. The region in the vicinity of the 45° solid line is a range allowable at certain focal depth. Although the range is slightly different since visual acuity (0) and blur detection ability (δ) are employed as allowable levels, it is quite narrower than a binocular fusional area of stereoscopy. The outer curve shows a sort of binocular fusion limits; the solid line with black dots represents maximum binocular fusion image limit (allowable convergence limit); the dotted line shows a range in which a fusion image condition is established from twin image condition (fusion limit); and the broken line represents binocular fusion limit at an image display time of 0.5 sec. (convergence limit of display at a short period of 0.5 sec.). With respect to the moving picture, long-period observation may cause considerable fatigue by the three-dimensional effect out of the range indicated by the broken line. Reference symbol MW represents or convergence angle; and D, a diopter.

According to the present invention, when the depth sampling is employed, it becomes necessary to define the number of sampling. Here, the accommodation of human eyes is effective only when the visual range is short (less than or equal to 2 m), as shown in FIG. 64. Moreover, resolution in the depth direction is relatively as low as ¹⁄₁₀ or more of the visual range. There is also an allowable range of the convergence angle, as illustrated in FIG. 65. Therefore, in practice, a natural three-dimensional image can be realized if the number of the depth sampling ranges from 20 to 40.

Although, in the first embodiment, the three-dimensional image is realized as an aggregate of the depth sampled images. It is clear that the three-dimensional image can be realized in various other ways, e.g., an aggregate of lines.

It should be noted that the construction shown in FIGS. 60 and 61 is one example which makes the device compact by bending the optical path employing a mirror, lens, prism or the like.

(Second Embodiment of Head-Mount Display Device)

Figure 66:
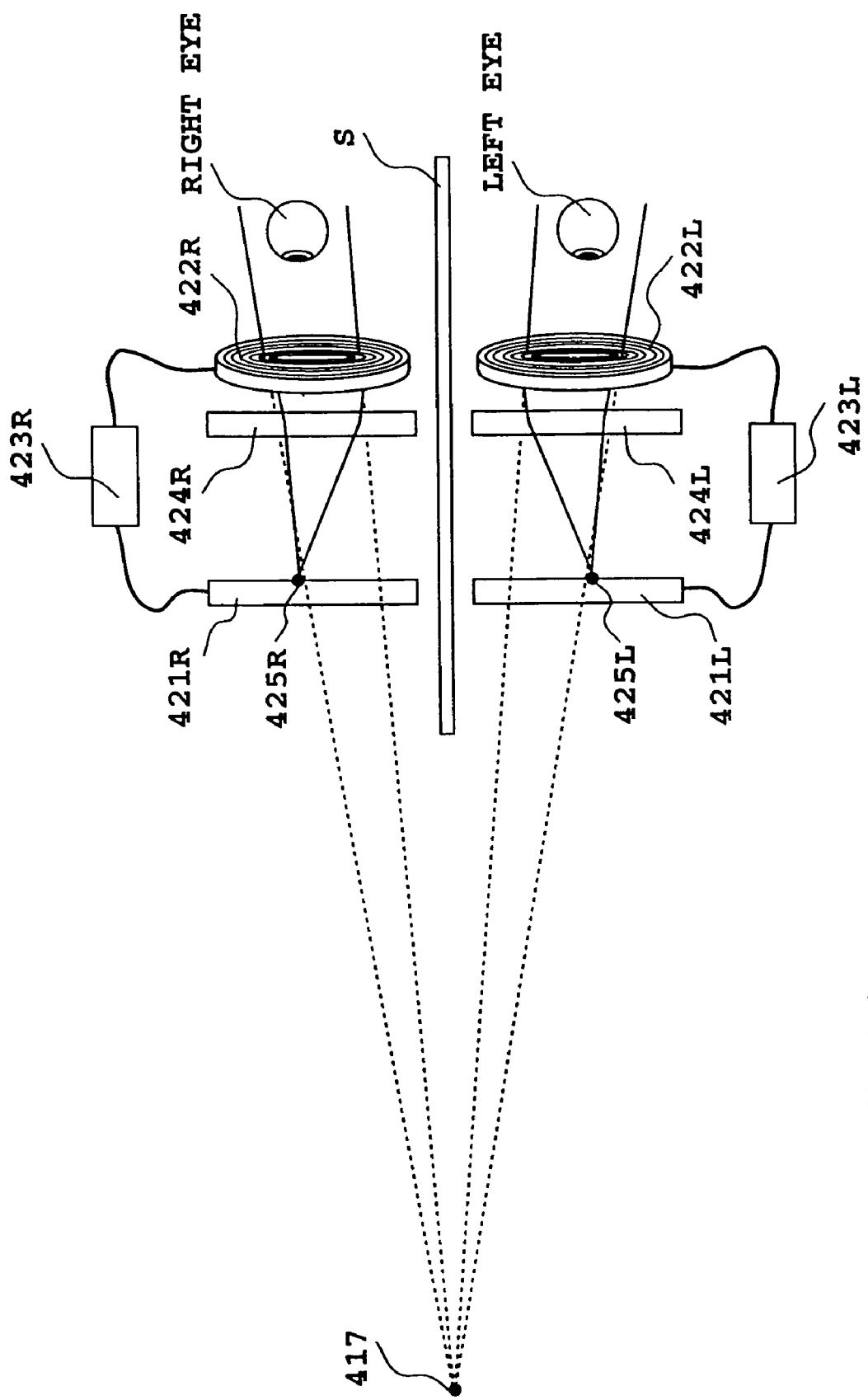
FIG. 66 is a view schematically showing the construction of a second embodiment of the headmount display device.

FIG. 66 shows a schematic construction of a second embodiment of the head-mount display device according to the present invention. In FIG. 66, reference numerals 421R and 421L denote two-dimensional display devices; 422R and 422L, varifocal lenses, 423R and 423L, control devices; 424R and 424L, deflection devices; 425R and 425L, display images; and 417, a virtual image. Examples of the deflection devices 424R and 424L are a liquid crystal prism, a movable mirror, a liquid prism and the like. The second embodiment is adapted to easily establish the natural correspondence between the convergence angle and accommodation.

The second embodiment of the head-mount display device comprises the two-dimensional display devices 421R and 421L, the varifocal lenses 422R and 422L and the control devices 423R and 423L for controlling the devices 421R and 421L and the lenses 422R and 422L, as shown in FIG. 66.

In the head-mount display device, in order to generate a large convergence angle as the depth position of a three-dimensional image approaches eyes, it is necessary to make the right and left images observed by the right and left eyes closer to the midpoint between both the eyes. Since, in the first embodiment of the head-mount display device, this operation is performed by fusing the two-dimensional display devices 421R and 421L, the display images are displayed closer toward the midpoint between the right and left eyes. Therefore, control of the display images of the two-dimensional display devices 421R and 421L becomes quite complicated. Additionally, if the convergence angle is varied significantly, it becomes necessary to make the two-dimensional display device greater in the lateral direction beyond the visual field.

To the contrary, in the second embodiment, the right and left images in the lateral direction for forming the convergence angle are moved by the deflection devices 424R and 424L. Namely, the operations of the two-dimensional display devices 421R and 421L and the varifocal lens 422R and 422L are similar to those of the first embodiment. However, as the focal lengths of the varifocal lenses 422R and 422L become longer and the virtual images of the display images 425R and 425L of the two-dimensional display devices 421R and 421L approach closer to the right and left eyes in the depth direction, the display images of the two-dimensional display devices 421R and 421L approach toward the center position midpoint between the right and left eyes by the deflection devices 424R and 424L.

Consequently, in the second embodiment of the head-mount display device, the two-dimensional display and the convergence angle control can be independently controlled with ease. Further, the entire screen surfaces of the two-dimensional display devices 421R and 421L can be effectively used. Namely, the convergence angle becomes small when the virtual image 417 is farther from the right and left eyes, while the convergence angle becomes greater when the virtual image 417 is closer to the right and left eyes. Thus, the convergence angle and accommodation can be easily satisfied.

Although in the second embodiment, the deflection devices 424R and 424L are located closer to the two-dimensional display devices 421R and 421L than the varifocal lens 422R and 422L. However, it is clear that the same advantageous result can be achieved even in the case where the deflection devices 424R and 424L are located closer to the right and left eyes than the varifocal lenses 422R and 422L.

Figure 67:
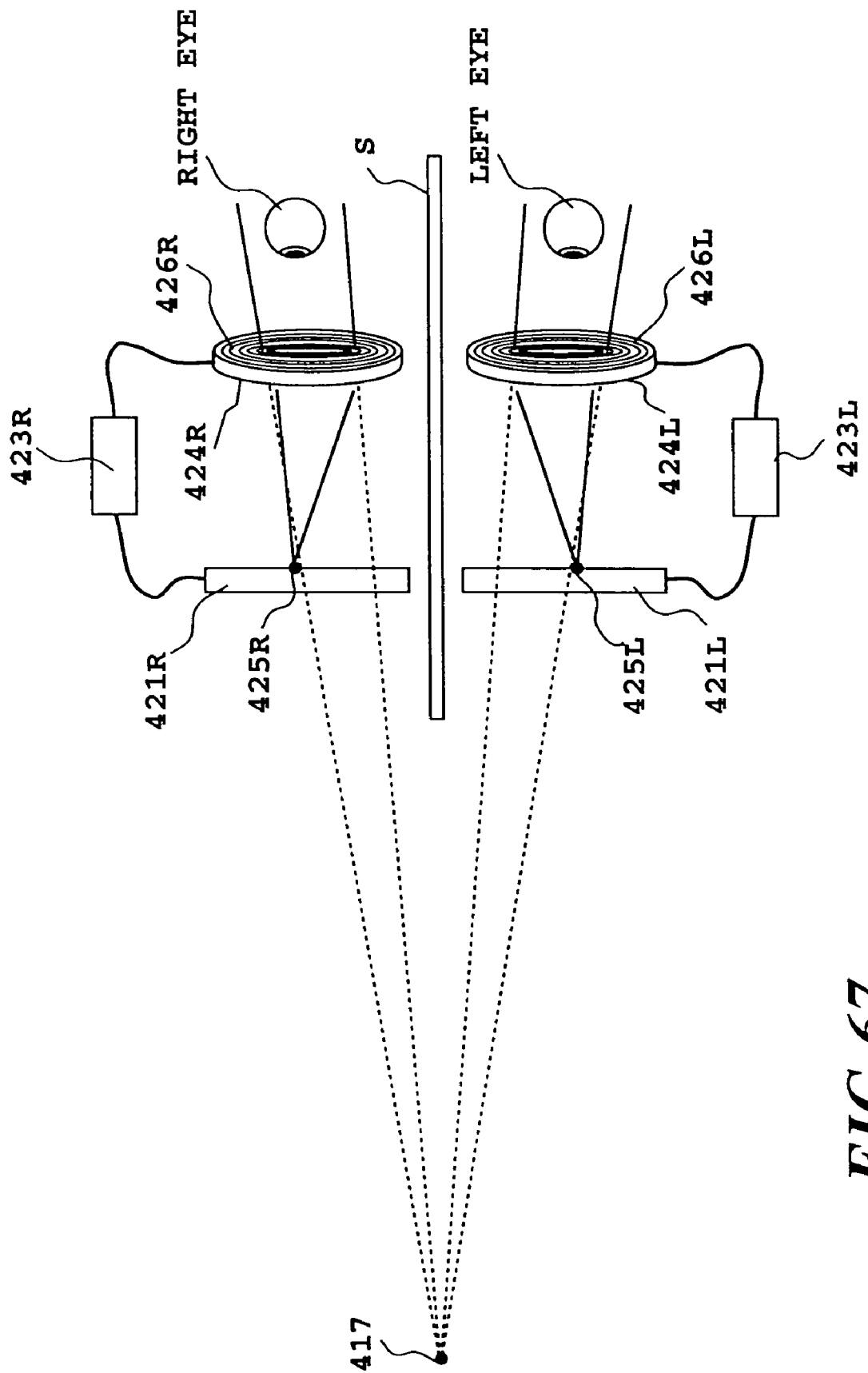
FIG. 67 is a view schematically showing the construction of a modification of the second embodiment of the head-mount display device.

Moreover, although in the second embodiment as shown as FIG. 66, the deflection devices 424R and 424L and the varifocal lenses are provided separately, the same advantageous result can be, achieved even in the case of variable optical devices 426R and 426L in which the deflection devices 424R and 424L and the varifocal lenses are integrated, as shown in FIG. 67. Thus, such construction is quite effective in making the device compact.

INDUSTRIAL APPLICABILITY

As set forth above, the optical device according to the present invention enables high speed operation by varying the frequency of the voltage to be applied to the variable refractive index material so as to vary its refractive index and by varying the optical property of the device formed together with the transparent material having the desired curved surface configuration. Furthermore, since the force of exerted by the electric field can be used constantly, the operating speed can be made higher by increasing the strength of the electric field.

In the optical device according to the present invention, the force exerted by the electric field can vary the refractive index of the variable refractive index material. Moreover, since the transparent electrodes are not provided on the transparent material layer on the side of the variable refractive index material, the influence of the surface configuration of the transparent material layer becomes small, to easily achieve uniformity of the variation in optical property.

Since the transparent electrodes are not provided on the transparent material layer on the side of the variable refractive index material in the optical device according to the present invention, it becomes unnecessary to form a film on a portion having a complex configuration, to thus facilitate fabrication. Furthermore, since the transparent electrodes are not provided on the transparent material layer on the side of the variable refractive index material, the distance between the electrodes can be maintained substantially equal. Additionally, since the transparent material layer is constantly present between the transparent electrodes, degradation in insulating, property or short-circuiting can be successfully avoided.

Further, in the optical device according to the present invention, the refractive index of the variable refractive index material is periodically varied according to the frequency of each voltage to select the intermediate value, thereby achieving sequential variation of the optical property.

The optical device according to the present invention can maintain the desired refractive index by utilizing the state maintaining characteristics of the variable refractive index material while the voltage supply is stopped. Therefore, it becomes possible to vary the refractive index at a high speed but in a non-periodic manner.

The optical device according to the present invention sequentially varies the refractive index according to a voltage ratio of the voltages having different frequencies in superimposing manner and to be applied to the variable refractive index material, so as to vary the optical property of the device sequentially, enabling high-speed driving with sequential variation, unlike the conventional device which cannot be driven at a high speed. Furthermore, since the force exerted by the electric field can be constantly used, the further speeding-up can be achieved by increasing the strength of the electric field.

The optical device according to the present invention can maintain the desired refractive index by utilizing the state maintaining characteristics of the variable refractive index material while the voltage supply is stopped. Therefore, it becomes possible to vary the refractive index at a high speed but in a non-periodic manner.

The optical device according to the present invention can achieve a uniform alignment condition in a wide domain region under the driving condition where the liquid crystal is aligned in parallel to the alignment layer. Thus, variation of the refractive index of the liquid crystal can be efficiently transferred to the incident light beam. In addition, scattering of the light beam caused by the random orientation of the liquid crystal and the resultant cloudiness can be successfully avoided.

Furthermore, the optical device according to the present invention is constructed in such a manner as to reflect the light beam, efficiently transferring the variation of the refractive index of the variable refractive index material to the incident light beam. Further, various functions can be realized irrespective of the polarizing condition of the incident light beam. Therefore, various optical devices, such as an active mirror and a half mirror capable of varying the optical property can be realized.

In addition, the optical device according to the present invention has the driving device which can constantly supply the voltage having the amplitude greater than or equal to the voltage amplitude, at which the liquid crystal is effectively and statistically aligned in the frequency of the voltage, to thus generate an electrically hydrodynamic motion in the molecules of the liquid crystal. Consequently, the direction of the molecules of the liquid crystal is oscillated between the state where the molecules of the liquid crystal are aligned perpendicularly or in parallel to the electrode and the state where the molecules of the liquid crystal are slightly inclined in synchronism with a frequency twice as high as that of the applied voltage. Therefore, the optical device according to the present invention can vary the optical property at a high speed, sequentially, periodically and uniformly. Furthermore, since it becomes unnecessary to form the film into complicated surface configuration, production can be facilitated.

The three-dimensional display device according to the present invention drives the imaging point shifting portion on the bases of the driving signal generated by the driving portion, and the synchronizing portion updates the two-dimensional images to be displayed on the display portion sequentially in a predetermined order on the basis of the output from the driving portion. Therefore, position of the two-dimensional image to be the displayed on the display portion can be varied in the direction of the eyes of the observer so that the observer may three-dimensionally view the two-dimensional images on the two-dimensional plane displayed on the display means.

The three-dimensional display device according to the present invention can satisfy the visual cues to depth perception in three-dimensional view such as binocular disparity, convergence, accommodation and movement parallax without using any eyeglasses and display the moving picture which can be re-written electrically.

Otherwise, the phantom three-dimensional display device according to the present invention is additionally provided with the shutter device which can switch in timewise and/or spacewise among the light beam transmitting state, light beam scattering state and light beam reflecting state. In the phantom three-dimensional display device, the shutter device is disposed at the position including the position where the phantom three-dimensional image is reproduced. This three-dimensional display device activates the function for blocking or scattering the light beam of the shutter elements of the shutter device when the phantom three-dimensional image at the backside as viewed from the observer is reproduced. As a result, many of the visual cues to depth perception in three-dimensional view can be satisfied and the natural three-dimensional image without any phantom phenomenon can be electrically reproduced in the form of the moving picture.

The head-mount display device according to the present invention, comprising the two-dimensional devices and the varifocal lenses are worn on the right and left eyes of the human being so that the display images of the two-dimensional display devices are observed through the varifocal lenses, and the focal lengths of the varifocal lens are varied for varying the position of the virtual image of the display image of the two-dimensional display device in the depth direction. As a result, it is possible to reproduce the three-dimensional image without any discrepancy in visual cues to depth perception in three-dimensional view such as binocular disparity, convergence and accommodation at a high speed in an electrically rewriteable manner.

What is claimed is:

1. A three-dimensional display device comprising:
    a phantom three-dimensional display device for displaying a phantom three-dimensional image comprised of an aggregation of depth sampled images in a depth direction; and
    a shutter device having a plurality of shutter elements for controlling a light transmittance of the displayed phantom three-dimensional image and having control means for controlling selection of the shutter elements,
    wherein the shutter elements are arranged such that a position of each shutter element is consistent with a position at a portion of the phantom image in the depth direction;
    wherein a plurality of the shutter elements are controlled at the same time such that each shutter element is set to an opening state or a closing state partially at one moment, and wherein one portion of the phantom image according to a position of the shutter element in the depth direction becomes a transparent state partially when the shutter element is set to the opening state partially and another portion of the phantom image according to a position of the shutter element in the depth direction becomes a non-transparent state partially when the shutter element is set to the closing state partially.

2. A three-dimensional display device as set forth in claim 1, wherein said shutter elements are two-dimensionally divided in a plane perpendicular to the depth direction of the displayed phantom three-dimensional image, and each of divided regions is controlled independently by the control means.

3. A three-dimensional display device as set forth in claim 1, wherein a predetermined shutter element lowers a light transmittance in a region of the displayed phantom three-dimensional image at each position of the shutter elements controlled by the control means when the displayed phantom three-dimensional image is located in the depth direction in a time division manner.

4. A three-dimensional display device comprising:
- a phantom three-dimensional display device for displaying a phantom three-dimensional image comprised of an aggregation of depth sampled images; and
- a shutter device having a plurality of shutter elements for controlling a light transmittance,
- wherein the shutter elements are arranged at positions where the depth sampled images are displayed in a depth direction, and each of the shutter elements are controlled in a time division manner respectively so as to vary the light transmittance, and
- wherein the material of said shutter element is one or combination of guest-host type liquid crystal containing diachronic dye having a different light beam absorption depending upon an orientation of molecules and liquid crystal having dielectric constant anisotropy, polymer dispersion type liquid crystal containing droplet-like liquid crystal in polymer, polymer dispersed liquid crystal containing a polymer network in liquid crystal, a holographic polymer dispersed liquid crystal having a layer structure of polymer dispersed liquid crystal containing droplet like liquid crystal in polymer and polymer, a holographic polymer dispersed liquid crystal having a layer structure of said polymer dispersed liquid crystal containing a polymer network in the liquid crystal and polymer, and a polymer dispersed liquid crystal wherein said liquid crystal in said polymer dispersed liquid crystal is said guest-host type liquid crystal.

5. A three-dimensional display device comprising:
- a phantom three-dimensional display device for displaying a phantom three-dimensional image comprised of an aggregation of depth sampled images; and
- a shutter device having a plurality of shutter elements for controlling a light transmittance,
- wherein the shutter elements are arranged at positions where the depth sampled images are displayed in a depth direction, and each of the shutter elements are controlled in a time division manner respectively so as to vary the light transmittance, and wherein said phantom three-dimensional display device is constructed with a two-dimensional image display device and a varifocal optical device.

6. A three-dimensional display device comprising:
- a phantom three-dimensional display device for displaying a phantom three-dimensional image comprised of an aggregation of depth sampled images; and
- a shutter device having a plurality of shutter elements for controlling a light transmittance,
- wherein the shutter elements are arranged at real positions according to depth positions where the depth sampled images are displayed as optical real images, and the shutter elements are photoreactive elements for lowing a light transmittance in a region of the depth sampled images at the positions of the shutter elements according to the real positions.

7. A three-dimensional display device as set forth in claim 6, wherein a material of said photoreactive element is one of a photochromic material, a material consisting of a material causing a photostructural change and liquid crystal, and a material having a nematic-anisotropic phase transition temperature to be varied by photostructural change.

8. A three-dimensional display device as set forth in claim 6, wherein said phantom three-dimensional display device includes a two-dimensional image display device and a varifocal optical device.

9. A head-mount display device comprising:
- two display devices corresponding to left and right eyes wherein each device includes a two-dimensional display device and an optical device having a variable focal length; and
- a control device for controlling said two-dimensional display device, said optical device having a variable focal length and a deflection device for varying a direction of a light incident to said optical device,
- wherein the control device controls the display and optical devices so that the focal lengths of the optical device are focused on the positions of the depth sampled images, and controls said optical device in such a way that when the image is moving closer to the eyes according to a change of the focal length, the overall display image of said two-dimensional display device is deflected to be closer toward the center between the left and right eyes.

10. A head-mount display device comprising:
- two display devices corresponding to left and right eyes wherein each device includes a two-dimensional display device and an optical device having a variable focal length; and
- a control device for controlling said two-dimensional display device and said optical device having a variable focal length,
wherein the control device controls the display and optical devices so that the focal lengths of the optical device are focused on the positions of the depth sampled images,
- wherein said optical device has a transparent material, a layer including a variable refractive index material, and at least a pair of transparent electrodes for sandwiching said layer, and
- wherein the transparent material is comprised of one of forms of a fixed focus lens shape, a fixed prism shape, and a shape where the fixed deflection mechanism is incorporated into the fixed focus lens.

11. A head-mount display device as set forth in claim 10, wherein said variable refractive index material is liquid crystal having dielectric constant anisotropy and refractive index anisotropy.

12. A head-mount display device as set forth in claim 11, wherein said variable refractive index material is liquid crystal having dielectric constant anisotropy and refractive index anisotropy, and being dual-frequency liquid crystal having a different physical property having a different sign of a difference in a dielectric constant corresponding to orientation of the liquid crystal molecules between different frequencies f1 and f2.

13. A head-mount display device as set forth in claim 10, wherein said variable refractive index material is polymer dispersed liquid crystal, and the droplet size of the liquid crystal, or the droplet size of the polymer is smaller than a wavelength of visible light.

14. A head-mount display device as set forth in claim 10, wherein said fixed focus lens is spherical or non-spherical single lens or fresnel lens.

15. A head-mount display device as set forth in claim 10, wherein said fixed prism is simple prism or a multi-prism having an array of a plurality of fine prisms.

16. A head-mount display device as set forth in claim 10, the form where said fixed deflection mechanism is incorporated in to said fixed focus lens is in the form of increasing or decreasing an angle formed by a spherical or non-spherical simple lens or a fresnel lens and an optical axis.

17. A head-mount display device, comprising:
two display devices corresponding to left and right eyes wherein each device includes a two-dimensional display device and an optical device having a variable focal length; and
a control device for controlling said two-dimensional display device and said optical device having a variable focal length,
wherein the control device controls the display and optical devices so that the focal lengths of the optical device are focused on the positions of the depth sampled images,
said display devices are mounted to left and right eyes, and said control device synchronously drives said two-dimensional display device and said optical device to perform three-dimensional display, and wherein said optical device has a transparent material, a layer including a variable refractive index material, and at least a pair of transparent electrodes for sandwiching said layer, and
wherein said control device sequentially applies voltages V1 to VN having primary frequencies f1 to fN ($N \geq 2$) to said transparent electrodes for a predetermined period of time and at a predetermined interval.

* * * * *